(12) United States Patent
Isojima et al.

(10) Patent No.: US 12,555,820 B2
(45) Date of Patent: Feb. 17, 2026

(54) INORGANIC SOLID ELECTROLYTE-CONTAINING COMPOSITION, SHEET FOR ALL-SOLID STATE SECONDARY BATTERY, AND ALL-SOLID STATE SECONDARY BATTERY, AND MANUFACTURING METHODS FOR SHEET FOR ALL-SOLID STATE SECONDARY BATTERY AND ALL-SOLID STATE SECONDARY BATTERY

(71) Applicant: FUJIFILM Corporation, Tokyo (JP)

(72) Inventors: Hiroshi Isojima, Kanagawa (JP); Hideyuki Suzuki, Kanagawa (JP); Koji Yasuda, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 818 days.

(21) Appl. No.: 17/679,048

(22) Filed: Feb. 23, 2022

(65) Prior Publication Data

US 2022/0181681 A1    Jun. 9, 2022

Related U.S. Application Data

(63) Continuation of application No. PCT/JP2020/032527, filed on Aug. 28, 2020.

(30) Foreign Application Priority Data

Aug. 30, 2019 (JP) .................... 2019-157944
Oct. 24, 2019 (JP) .................... 2019-193350
May 21, 2020 (JP) .................... 2020-088767

(51) Int. Cl.
*H01M 10/0562* (2010.01)
*H01B 1/10* (2006.01)
(Continued)

(52) U.S. Cl.
CPC .......... *H01M 10/0562* (2013.01); *H01B 1/10* (2013.01); *H01M 4/13* (2013.01);
(Continued)

(58) Field of Classification Search
None
See application file for complete search history.

(56) References Cited

U.S. PATENT DOCUMENTS 9,236,158 B2 * 1/2016 Kubo .................... H01M 4/621
10,892,515 B2   1/2021 Mimura et al.
(Continued)

FOREIGN PATENT DOCUMENTS

CN    108370061    8/2018
EP    4002514      5/2022
(Continued)

OTHER PUBLICATIONS

AMCO Polymers, Molecular Weight and the Effect on Polymer Properties, Jan. 29, 2018 (Year: 2018).*
(Continued)

*Primary Examiner* — Ula C Ruddock
*Assistant Examiner* — Mary Grace Byram
(74) *Attorney, Agent, or Firm* — JCIPRNET

(57) ABSTRACT

There is provided an inorganic solid electrolyte-containing composition containing an inorganic solid electrolyte, a polymer binder, and a dispersion medium, in which the polymer binder includes a polymer binder consisting of a fluorine-based copolymer which contains a vinylidene fluoride constitutional component and a hexafluoropropylene constitutional component of 21% to 65% by mole and in which a tensile fracture strain is 500% or more, and the adsorption rate of this polymer binder with respect to the inorganic solid electrolyte is less than 60%. There are also provided a sheet for an all-solid state secondary battery and (Continued)

an all-solid state secondary battery, in which this inorganic solid electrolyte-containing composition is used, and manufacturing methods for a sheet for an all-solid state secondary battery, and an all-solid state secondary battery.

22 Claims, 1 Drawing Sheet

(51) Int. Cl.
  *H01M 4/13* (2010.01)
  *H01M 4/139* (2010.01)
  *H01M 4/62* (2006.01)
  *H01M 10/052* (2010.01)
  *H01M 10/0525* (2010.01)
  *H01M 10/0585* (2010.01)

(52) U.S. Cl.
  CPC ............. *H01M 4/139* (2013.01); *H01M 4/62* (2013.01); *H01M 4/623* (2013.01); *H01M 10/052* (2013.01); *H01M 10/0525* (2013.01); *H01M 10/0585* (2013.01); *H01M 2300/0068* (2013.01)

(56) References Cited

U.S. PATENT DOCUMENTS

| | | | | |
|---|---|---|---|---|
| 11,456,482 | B2 | 9/2022 | Mimura et al. | |
| 2004/0131945 | A1* | 7/2004 | Zushi | H01M 10/0587 429/231.1 |
| 2005/0191558 | A1* | 9/2005 | Sannier | H01M 10/0565 29/623.5 |
| 2010/0057189 | A1* | 3/2010 | Kangas | A61L 31/10 623/1.15 |
| 2011/0136010 | A1 | 6/2011 | Muraoka et al. | |
| 2015/0104692 | A1 | 4/2015 | Nakamura et al. | |
| 2018/0076481 | A1* | 3/2018 | Makino | C08L 75/02 |
| 2019/0085108 | A1* | 3/2019 | Herring | C08F 214/22 |
| 2019/0238232 | A1 | 8/2019 | Tanaka et al. | |
| 2019/0319303 | A1 | 10/2019 | Kushida et al. | |
| 2021/0102056 | A1 | 4/2021 | Komurasaki et al. | |

FOREIGN PATENT DOCUMENTS

| | | |
|---|---|---|
| JP | 2009277562 | 11/2009 |
| JP | 2011065841 | 3/2011 |
| JP | 2014078400 | 5/2014 |
| JP | 2015076350 | 4/2015 |
| JP | 2016139512 | 8/2016 |
| WO | 2010029676 | 3/2010 |
| WO | 2018151119 | 8/2018 |
| WO | 2018230336 | 12/2018 |

OTHER PUBLICATIONS

"International Search Report (Form PCT/ISA/210) of PCT/JP2020/032527," mailed on Nov. 17, 2020, with English translation thereof, pp. 1-5.

"Written Opinion of the International Searching Authority (Form PCT/ISA/237)" of PCT/JP2020/032527, mailed on Nov. 17, 2020, with English translation thereof, pp. 1-6.

Office Action of China Counterpart Application, with English translation thereof, issued on Jan. 27, 2024, pp. 1-16.

"Office Action of China Counterpart Application", issued on Sep. 27, 2024, with English translation thereof, p. 1-p. 13.

"Search Report of Europe Counterpart Application", issued on Jan. 23, 2023, p. 1-p. 7.

"Office Action of China Counterpart Application", issued on Feb. 28, 2025, with English translation thereof, p. 1-p. 12.

* cited by examiner

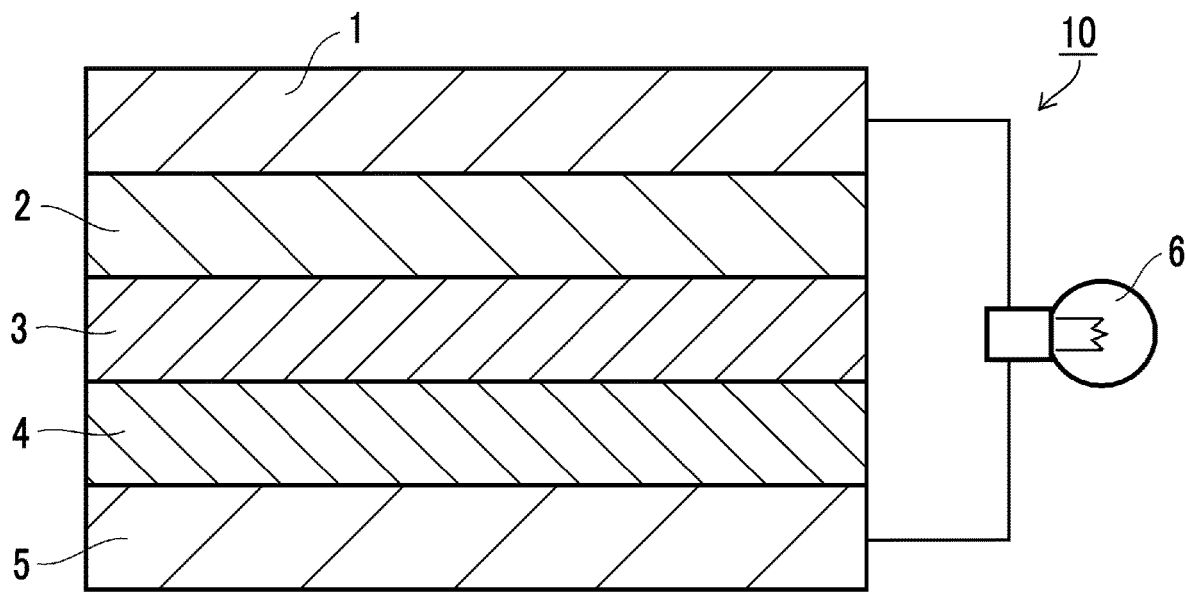

INORGANIC SOLID ELECTROLYTE-CONTAINING COMPOSITION, SHEET FOR ALL-SOLID STATE SECONDARY BATTERY, AND ALL-SOLID STATE SECONDARY BATTERY, AND MANUFACTURING METHODS FOR SHEET FOR ALL-SOLID STATE SECONDARY BATTERY AND ALL-SOLID STATE SECONDARY BATTERY

This application is a Continuation of PCT International Application No. PCT/JP2020/032527 filed on Aug. 28, 2020, which claims priority under 35 U.S.C. § 119 (a) to Japanese Patent Application No. 2019-157944 filed in Japan on Aug. 30, 2019, Japanese Patent Application No. 2019-193350 filed in Japan on Oct. 24, 2019, and Japanese Patent Application No. 2020-088767 filed in Japan on May 21, 2020. Each of the above applications is hereby expressly incorporated by reference, in its entirety, into the present application.

BACKGROUND OF THE INVENTION

1. Field of the Invention

The present invention relates to an inorganic solid electrolyte-containing composition, a sheet for an all-solid state secondary battery, and an all-solid state secondary battery, and manufacturing methods for a sheet for an all-solid state secondary battery and an all-solid state secondary battery.

2. Description of the Background Art

In an all-solid state secondary battery, all of a negative electrode, an electrolyte, and a positive electrode consist of solid, and the all-solid state secondary can improve safety and reliability, which are said to be problems to be solved in a battery in which an organic electrolytic solution is used. It is also said to be capable of extending the battery life. Furthermore, all-solid state secondary batteries can be provided with a structure in which the electrodes and the electrolyte are directly disposed in series. As a result, it becomes possible to increase the energy density to be high as compared with a secondary battery in which an organic electrolytic solution is used, and thus the application to electric vehicles, large-sized storage batteries, and the like is anticipated.

In such an all-solid state secondary battery, examples of substances that form constitutional layers (a solid electrolyte layer, a negative electrode active material layer, a positive electrode active material layer, and the like) include an inorganic solid electrolyte and an active material. In recent years, this inorganic solid electrolyte, particularly an oxide-based inorganic solid electrolyte or a sulfide-based inorganic solid electrolyte is expected as an electrolyte material having a high ion conductivity comparable to that of the organic electrolytic solution.

As the material for forming a constitutional layer (a constitutional layer forming material) of an all-solid state secondary battery, a material containing the above-described inorganic solid electrolyte and the like has been proposed. For example, JP2014-078400A discloses a slurry for a negative electrode for a sulfide-based solid-state battery, containing at least a fluorine-based copolymer containing a vinylidene fluoride monomer unit, a negative electrode active material, and a solvent or dispersion medium, in which in a case where the dry volume is set to 100% by volume, the content proportion of the fluorine-based copolymer is 1.4% to 2.2% by volume.

SUMMARY OF THE INVENTION

In a case of forming a constitutional layer of an all-solid state secondary battery with solid particle materials (an inorganic solid electrolyte, an active material, conductive auxiliary agent, and the like), a constitutional layer forming material is required to have a property (dispersion stability) by which the excellent dispersibility of the solid particle material (also referred to as solid particles) immediately after preparation is stably maintained, and a property (handleability) by which dispersion characteristics having high fluidity with a proper viscosity and a good surface property are maintained, from the viewpoint of improving the battery performance (for example, cycle characteristics) of the all-solid state secondary battery having a constitutional layer formed from the constitutional layer forming material. The relationship between the inorganic solid electrolyte or the like and the binder is conceived to be one of the important factors for dispersion stability and handleability. However, the solid electrolyte composition disclosed in JP2014-078400A does not describe this viewpoint.

By the way, in recent years, research and development for improving the performance and the practical application of electric vehicles have progressed rapidly, and the demand for battery performance (for example, cycle characteristics) required for all-solid state secondary batteries has become higher. In order to respond to such demands in recent years, it is required to develop a constitutional layer forming material that has both dispersion stability and handleability (fluidity or a surface property of a coated surface) at a higher level.

An object of the present invention is to provide an inorganic solid electrolyte-containing composition excellent in dispersion stability and handleability. In addition, another object of the present invention is to provide a sheet for an all-solid state secondary battery and an all-solid state secondary battery, and manufacturing methods for a sheet for an all-solid state secondary battery and an all-solid state secondary battery, in which the above inorganic solid electrolyte-containing composition is used.

As a result of repeating various studies, the inventors of the present invention have found that in a case where an inorganic solid electrolyte and a specific polymer binder which is a polymer binder formed by containing a specific fluorine-based copolymer, where the specific polymer binder exhibits an adsorption rate of less than 60% with respect to the inorganic solid electrolyte, are used in combination, t is possible to suppress chronological reaggregation, sedimentation, or the like of the inorganic solid electrolyte and an excessive increase in viscosity (thickening). Further, it has been found that in a case where this inorganic solid electrolyte-containing composition is used as a constitutional layer forming material, it is possible to realize a sheet for an all-solid state secondary battery, having a low-resistance constitutional layer the coated surface of which is flat and thus the surface property of which is good, and furthermore, an all-solid state secondary battery which is excellent cycle characteristics. The present invention has been completed through further studies based on these findings.

That is, the above problems have been solved by the following means.

<1> An inorganic solid electrolyte-containing composition comprising an inorganic solid electrolyte having an ion conductivity of a metal belonging to Group 1 or Group 2 in the periodic table; a polymer binder; and a dispersion medium, in which the polymer binder includes a polymer binder consisting of a fluorine-based copolymer which contains a vinylidene fluoride constitutional component and a hexafluoropropylene constitutional component of 21% to 65% by mole and in which a tensile fracture strain is 500% or more, and in the dispersion medium, an adsorption rate of the polymer binder consisting of the fluorine-based copolymer with respect to the inorganic solid electrolyte is less than 60%.

<2> The inorganic solid electrolyte-containing composition according to <1>, in which the polymer binder consisting of the fluorine-based copolymer is dissolved in the dispersion medium.

<3> The inorganic solid electrolyte-containing composition according to <1> or <2>, in which a content of the hexafluoropropylene constitutional component in the fluorine-based copolymer is 30% to 50% by mole.

<4> The inorganic solid electrolyte-containing composition according to any one of <1> or <3>, in which the tensile fracture strain is 700% or more.

<5> The inorganic solid electrolyte-containing composition according to any one of <1> to <4>, in which a peel strength of the polymer binder consisting of the fluorine-based copolymer with respect to aluminum foil is 0.1 N/mm or more.

<6> The inorganic solid electrolyte-containing composition according to any one of <1> to <5>, in which a mass average molecular weight of the fluorine-based copolymer is 50,000 to 1,500,000.

<7> The inorganic solid electrolyte-containing composition according to any one of <1> to <6>, in which the fluorine-based copolymer contains a constitutional component having a functional group selected from the following Group (a) of functional groups.

<Group (a) of Functional Groups>
a hydroxy group, an amino group, a carboxy group, a sulfo group, a phosphate group, a phosphonate group, a sulfanyl group, an ether bond, an imino group, an ester bond, an amide bond, a urethane bond, a urea bond, a heterocyclic group, an aryl group, an anhydrous carboxylic acid group, an isocyanate group, an alkoxysilyl group, a fluoroalkyl group, and a siloxane group.

<8> The inorganic solid electrolyte-containing composition according to <7>, in which in the fluorine-based copolymer, a content of the constitutional component having the functional group selected from the Group (a) of functional groups is 0.01% to 10% by mole.

<9> The inorganic solid electrolyte-containing composition according to any one of <1> to <8>, in which the polymer binder includes a particulate binder having an average particle diameter of 1 to 1,000 nm.

<10> The inorganic solid electrolyte-containing composition according to any one of <1> to <9>, in which the polymer binder includes a binder consisting of a hydrocarbon-based polymer, a binder consisting of a (meth)acrylic polymer, or a polymer binder consisting of a vinyl polymer.

<11> The inorganic solid electrolyte-containing composition according to any one of <1> to <10>, further comprising an active material.

<12> The inorganic solid electrolyte-containing composition according to <11> The inorganic solid electrolyte-containing composition according to claim 11, in which an adsorption rate of the polymer binder consisting of the fluorine-based copolymer with respect to the active material is 90% or less.

<13> The inorganic solid electrolyte-containing composition according to any one of <1> to <12>, further comprising a conductive auxiliary agent.

<14> The inorganic solid electrolyte-containing composition according to any one of <1> to <13>, in which the inorganic solid electrolyte is a sulfide-based inorganic solid electrolyte.

<15> A sheet for an all-solid state secondary battery, comprising a layer formed of the inorganic solid electrolyte-containing composition according to any one of <1> to <14>.

<16> An all-solid state secondary battery comprising, in the following order, a positive electrode active material layer; a solid electrolyte layer; and a negative electrode active material layer, in which at least one of the positive electrode active material layer, the solid electrolyte layer, or the negative electrode active material layer is a layer formed of the inorganic solid electrolyte-containing composition according to any one of <1> to <14>.

<17> A manufacturing method for a sheet for an all-solid state secondary battery, the manufacturing method comprising forming a film of the inorganic solid electrolyte-containing composition according to any one of <1> to <14>.

<18> A manufacturing method for an all-solid state secondary battery, comprising manufacturing an all-solid state secondary battery through the manufacturing method according to <17>.

According to the present invention, it is possible to provide an inorganic solid electrolyte-containing composition excellent in dispersion characteristics such as dispersion stability, handleability (fluidity and surface property), and the like. In addition, according to the present invention, it is possible to provide a sheet for an all-solid state secondary battery and an all-solid state secondary battery, which have a layer formed of the above inorganic solid electrolyte-containing composition. Further, according to the present invention, it is possible to provide manufacturing methods for a sheet for an all-solid state secondary battery and an all-solid state secondary battery, in which the above inorganic solid electrolyte-containing composition is used.

The above-described and other characteristics and advantages of the present invention will be further clarified by the following description with appropriate reference to the accompanying drawing.

BRIEF DESCRIPTION OF THE DRAWINGS

FIG. 1 is a vertical cross-sectional view schematically illustrating an all-solid state secondary battery according to a preferred embodiment of the present invention.

DESCRIPTION OF THE PREFERRED EMBODIMENTS

In the present invention, numerical ranges indicated using "to" include numerical values before and after the "to" as the lower limit value and the upper limit value.

In the present invention, the expression of a compound (for example, in a case where a compound is represented by an expression in which "compound" is attached to the end) refers to not only the compound itself but also a salt or an ion thereof. In addition, this expression also refers to a derivative obtained by modifying a part of the compound, for example, by introducing a substituent into the compound within a range where the effects of the present invention are not impaired.

In the present invention, (meth)acryl means one or both of acryl and methacryl. The same applies to (meth)acrylate.

In the present invention, a substituent, a linking group, or the like (hereinafter, referred to as a substituent or the like), which is not specified regarding whether to be substituted or unsubstituted, may have an appropriate substituent. Accordingly, even in a case where a YYY group is simply described in the present invention, this YYY group includes not only an aspect having a substituent but also an aspect not having a substituent. The same shall be applied to a compound that is not specified in the present specification regarding whether to be substituted or unsubstituted. Examples of the preferred examples of the substituent include a substituent Z described below.

In the present invention, in a case where a plurality of substituents or the like represented by a specific reference numeral are present or a plurality of substituents or the like are simultaneously or alternatively defined, the respective substituents or the like may be the same or different from each other. In addition, unless specified otherwise, in a case where a plurality of substituents or the like are adjacent to each other, the substituents may be linked or fused to each other to form a ring.

In the present invention, the polymer means a polymer; however, it is synonymous with a so-called polymeric compound.

[Inorganic Solid Electrolyte-Containing Composition]

The inorganic solid electrolyte-containing composition according to the embodiment of the present invention contains an inorganic solid electrolyte having an ion conductivity of a metal belonging to Group 1 or Group 2 in the periodic table; a polymer binder; and a dispersion medium. The polymer binder contained in this inorganic solid electrolyte-containing composition is a fluorine-based copolymer containing a vinylidene fluoride constitutional component and a hexafluoropropylene constitutional component, where the polymer binder includes one or two or more kinds of polymer binders formed of a fluorine-based copolymer (simply may be referred to as a copolymer) in which the content of the hexafluoropropylene constitutional component in the fluorine-based copolymer is 21% to 65% by mole and the tensile fracture strain is 500% or more.

It suffices that the inorganic solid electrolyte-containing composition according to the embodiment of the present invention contains a polymer binder (may be referred to as a fluorine-containing binder) consisting of the above-described copolymer as a polymer binder, with respect to the inorganic solid electrolyte and the dispersion medium, and the content state and the like thereof are not particularly limited. For example, in the inorganic solid electrolyte-containing composition, the polymer binder may adsorb or may not adsorb to the inorganic solid electrolyte; however, in a case where it adsorbs thereto, the degree of the adsorption may be within the range of the adsorption rate described later.

This fluorine-containing binder functions, in a layer formed of at least an inorganic solid electrolyte-containing composition, as a binder that causes solid particles of an inorganic solid electrolyte (as well as a co-existable active material, conductive auxiliary agent, and the like) or the like to mutually binds therebetween (for example, between solid particles of an inorganic solid electrolyte, solid particles of an inorganic solid electrolyte and an active material, or solid particles of an active material). Further, it may function as a binder that causes a collector to bind to solid particles. In the inorganic solid electrolyte-containing composition, the polymer binder may have or may not have a function of causing solid particles to mutually bind therebetween.

The inorganic solid electrolyte-containing composition according to the embodiment of the present invention is preferably a slurry in which the inorganic solid electrolyte is dispersed in a dispersion medium. In this case, the fluorine-containing binder preferably has a function of dispersing solid particles in the dispersion medium. In addition, in a case where the fluorine-containing binder is dispersed in the dispersion medium (in the solid state), a part of the low adsorption binder may be dissolved in the dispersion medium within a range in which the effects of the present invention are not impaired.

The inorganic solid electrolyte-containing composition according to the embodiment of the present invention is excellent in dispersion stability and handleability (fluidity and surface property). In a case where this inorganic solid electrolyte-containing composition is used as a constitutional layer forming material, it is possible to realize a sheet for an all-solid state secondary battery, having a low-resistance constitutional layer the surface of which is flat and thus the surface property of which is good, as well as an all-solid state secondary battery which is excellent cycle characteristics.

In the aspect in which the active material layer formed on the collector is formed of the inorganic solid electrolyte-containing composition according to the embodiment of the present invention, it is also possible to realize strong adhesiveness between the collector and the active material layer and thus it is possible to achieve a further improvement of the cycle characteristics.

The above-described action and effect are realized in a case where in the inorganic solid electrolyte-containing composition according to the embodiment of the present invention, a fluorine-containing binder exhibiting a specific adsorption rate, which is formed of a fluorine-based copolymer exhibiting a specific tensile fracture strain by containing a specific proportion of the above constitutional component, is used in combination with a dispersion medium and an inorganic solid electrolyte. Although the details of the reason for the above are not yet clear, it is conceived to be due to the fact that a relationship between an inorganic solid electrolyte and the like and a binder can be improved in an inorganic solid electrolyte-containing composition and in a constitutional layer.

That is, it is conceived that the fluorine-containing binder that is formed of a fluorine-based copolymer (simply may be referred to as a copolymer) which contains a vinylidene fluoride constitutional component and a hexafluoropropylene constitutional component of 21% to 65% by mole and in which a tensile fracture strain is 500% or more and that exhibits an adsorption rate of less than 60% with respect to the inorganic solid electrolyte does not excessively adsorb to an inorganic solid electrolyte in the inorganic solid electrolyte-containing composition and can suppress the reaggregation, sedimentation, or the like of the inorganic solid electrolyte not only immediately after the preparation of the inorganic solid electrolyte-containing composition but also even after a lapse of time. In addition to this, the fluorine-based copolymer can easily maintain the interaction of the inorganic solid electrolyte in the composition, and furthermore, it can cause the repulsive force between the fluorine atoms in the copolymer to act. As a result, a high degree of dispersibility immediately after preparation can be stably maintained (dispersion stability is excellent), and an excessive increase in viscosity can also be suppressed, whereby good fluidity is exhibited (handleability is excellent).

In a case where a constitutional layer is formed using the inorganic solid electrolyte-containing composition according to the embodiment of the present invention, which exhibits such excellent dispersion characteristics, it is possible to suppress the generation of reaggregates, sediments, or the like of the inorganic solid electrolyte, even during the formation a film of a constitutional layer (for example, during the application and as well as during drying of the inorganic solid electrolyte-containing composition). This makes it is possible to suppress variations in the contact state between inorganic solid electrolytes in the constitutional layer. In particular, in a case where the inorganic solid electrolyte-containing composition contains an active material or the like, it is conceived that specific particles of the active material or the like are less likely to be unevenly distributed in the constitutional layer (solid particles are uniformly arranged in the constitutional layer). As a result, it is possible to suppress an increase in the interfacial resistance between the solid particles as well as the resistance of the constitutional layer. In addition to this, the inorganic solid electrolyte-containing composition becomes to have proper fluidity (leveling) during the film formation of the inorganic solid electrolyte-containing composition, particularly during coating, and thus the surface roughness of unevenness due to insufficient fluidity or excessive fluidity does not occur (the surface property of the coated surface is excellent), whereby the constitutional layer has a good surface property. In this manner, it is conceived that it is possible to realize a sheet for an all-solid state secondary battery, having a low-resistance constitutional layer the surface of which is flat.

In addition, in the all-solid state secondary battery having a constitutional layer in which an increase in resistance is suppressed and the surface is flat, the overcurrent during charging and discharging hardly occurs and the deterioration of solid particles can be prevented, and thus the interfacial contact state between the surface of the constitutional layer and adjacent another layer is good (highly adhesive). For this reason, it is conceived that it is possible to realize an all-solid state secondary battery which has excellent cycle characteristics without significantly deteriorating battery characteristics even after repeated charging and discharging.

In a case where an active material layer is formed of the inorganic solid electrolyte-containing composition according to the embodiment of the present invention, a constitutional layer is formed while a highly (homogeneously) dispersed state immediately after preparation is maintained as described above. For this reason, it is conceived that the contact (adhesion) of the fluorine-containing binder to the surface of the collector is not hindered by the solid particles that have been preferentially sedimented, and the fluorine-containing binder can come into contact with (adhesion to) the surface of the collector in a state of being dispersed together with the solid particles. Further, the fluorine-based copolymer precipitated during the formation of the active material can be elongated in the active material layer without being cut, whereby the molecular structure can be maintained. As a result, in the electrode sheet for an all-solid state secondary battery in which an active material layer is formed of the inorganic solid electrolyte-containing composition according to the embodiment of the present invention on a collector, it is possible to realize strong adhesiveness between the collector and the active material. Further, the all-solid state secondary battery in which the active material layer is formed on the collector with the inorganic solid electrolyte-containing composition according to the embodiment of the present invention exhibits strong adhesiveness between the collector and the active material, and it is possible to realize further improvement of the cycle characteristics.

The inorganic solid electrolyte-containing composition according to the embodiment of the present invention is preferably used a material (a constitutional layer forming material) for forming a solid electrolyte layer or an active material layer, where the material is for a sheet for an all-solid state secondary battery (including an electrode sheet for an all-solid state secondary battery) or an all-solid state secondary battery. In particular, it can be preferably used as a material for forming a negative electrode sheet for an all-solid state secondary battery or a material for forming a negative electrode active material layer, which contains a negative electrode active material having a large expansion and contraction due to charging and discharging, and high cycle characteristics can be achieved in this aspect as well.

The inorganic solid electrolyte-containing composition according to the embodiment of the present invention is preferably a non-aqueous composition. In the present invention, the non-aqueous composition includes not only an aspect including no moisture but also an aspect where the moisture content (also referred to as the "water content") is preferably 500 ppm or less. In the non-aqueous composition, the moisture content is more preferably 200 ppm or less, still more preferably 100 ppm or less, and particularly preferably 50 ppm or less. In a case where the inorganic solid electrolyte-containing composition is a non-aqueous composition, it is possible to suppress the deterioration of the inorganic solid electrolyte. The moisture content refers to the water amount (the mass proportion to the inorganic solid electrolyte-containing composition) in the inorganic solid electrolyte-containing composition, and specifically, it is a value determined by filtration through a 0.02 μm membrane filter and then by Karl Fischer titration.

The inorganic solid electrolyte-containing composition according to the embodiment of the present invention includes an aspect including not only an inorganic solid electrolyte but also an active material, as well as a conductive auxiliary agent or the like (the composition in this aspect may be referred to as the "composition for an electrode").

Hereinafter, components that are contained and components that can be contained in the inorganic solid electrolyte-containing composition according to the embodiment of the present invention will be described.

<Inorganic Solid Electrolyte>

The inorganic solid electrolyte-containing composition according to the embodiment of the present invention contains an inorganic solid electrolyte.

In the present invention, the inorganic solid electrolyte is an inorganic solid electrolyte, and the solid electrolyte refers to a solid-form electrolyte capable of migrating ions therein. The inorganic solid electrolyte is clearly distinguished from the organic solid electrolyte (the polymeric electrolyte such as polyethylene oxide (PEO) or the organic electrolyte salt such as lithium bis(trifluoromethanesulfonyl)imide (LiTFSI)) since the inorganic solid electrolyte does not include any organic substance as a principal ion-conductive material. In addition, the inorganic solid electrolyte is solid in a steady state and thus, typically, is not dissociated or liberated into cations and anions. Due to this fact, the inorganic solid electrolyte is also clearly distinguished from inorganic electrolyte salts of which cations and anions are dissociated or liberated in electrolytic solutions or polymers ($LiPF_6$, $LiBF_4$, lithium bis(fluorosulfonyl)imide (LiFSI), LiCl, and the like). The inorganic solid electrolyte is not particularly limited as long as it has an ion conductivity of a metal belonging to Group 1 or Group 2 in the periodic table and generally does not have electron conductivity. In a case where the all-solid state secondary battery according to the embodiment of the present invention is a lithium ion battery, the inorganic solid electrolyte preferably has an ion conductivity of a lithium ion.

As the inorganic solid electrolyte, a solid electrolyte material that is typically used for an all-solid state secondary battery can be appropriately selected and used. Examples of the inorganic solid electrolyte include (i) a sulfide-based inorganic solid electrolyte, (ii) an oxide-based inorganic solid electrolyte, (iii) a halide-based inorganic solid electrolyte, and (iv) a hydride-based inorganic solid electrolyte. The sulfide-based inorganic solid electrolytes are preferably used from the viewpoint that it is possible to form a more favorable interface between the active material and the inorganic solid electrolyte.

(i) Sulfide-Based Inorganic Solid Electrolyte

The sulfide-based inorganic solid electrolyte is preferably an electrolyte that contains a sulfur atom, has an ion conductivity of a metal belonging to Group 1 or Group 2 in the periodic table, and has electron-insulating properties. The sulfide-based inorganic solid electrolytes are preferably inorganic solid electrolytes which, as elements, contain at least Li, S, and P and have an ion conductivity of a lithium ion, but the sulfide-based inorganic solid electrolytes may also include elements other than Li, S, and P depending on the purposes or cases.

Examples of the sulfide-based inorganic solid electrolyte include a lithium ion-conductive inorganic solid electrolyte satisfying the composition represented by Formula (S1).

$$L_{a1}M_{b1}P_{c1}S_{d1}A_{e1} \quad \text{Formula (S1)}$$

In the formula, L represents an element selected from Li, Na, or K and is preferably Li. M represents an element selected from B, Zn, Sn, Si, Cu, Ga, Sb, Al, or Ge. A represents an element selected from I, Br, Cl, or F. a1 to e1 represent the compositional ratios between the respective elements, and a1:b1:c1:d1:e1 satisfies 1 to 12:0 to 5:1:2 to 12:0 to 10. a1 is preferably 1 to 9 and more preferably 1.5 to 7.5. b1 is preferably 0 to 3 and more preferably 0 to 1. d1 is preferably 2.5 to 10 and more preferably 3.0 to 8.5. e1 is preferably 0 to 5 and more preferably 0 to 3.

The compositional ratios between the respective elements can be controlled by adjusting the amounts of raw material compounds blended to manufacture the sulfide-based inorganic solid electrolyte as described below.

The sulfide-based inorganic solid electrolytes may be non-crystalline (glass) or crystallized (made into glass ceramic) or may be only partially crystallized. For example, it is possible to use Li—P—S-based glass containing Li, P, and S or Li—P—S-based glass ceramic containing Li, P, and S.

The sulfide-based inorganic solid electrolytes can be manufactured by a reaction of at least two raw materials of, for example, lithium sulfide ($Li_2S$), phosphorus sulfide (for example, diphosphorus pentasulfide ($P_2S_5$)), a phosphorus single body, a sulfur single body, sodium sulfide, hydrogen sulfide, lithium halides (for example, LiI, LiBr, and LiCl), or sulfides of an element represented by M (for example, $SiS_2$, SnS, and $GeS_2$).

The ratio of $Li_2S$ to $P_2S_5$ in Li—P—S-based glass and Li—P—S-based glass ceramic is preferably 60:40 to 90:10 and more preferably 68:32 to 78:22 in terms of the molar ratio, $Li_2S:P_2S_5$. In a case where the ratio between $Li_2S$ and $P_2S_5$ is set in the above-described range, it is possible to increase an ion conductivity of a lithium ion. Specifically, the ion conductivity of the lithium ion can be preferably set to $1\times10^{-4}$ S/cm or more and more preferably set to $1\times10^{-3}$ S/cm or more. The upper limit is not particularly limited but realistically $1\times10^{-1}$ S/cm or less.

As specific examples of the sulfide-based inorganic solid electrolytes, combination examples of raw materials will be described below. Examples thereof include $Li_2S$—$P_2S_5$, $Li_2S$—$P_2S_5$—LiCl, $Li_2S$—$P_2S_5$—$H_2S$, $Li_2S$—$P_2S_5$—$H_2S$—LiCl, $Li_2S$—LiI—$P_2S_5$, $Li_2S$—LiI—$Li_2O$—$P_2S_5$, $Li_2S$—LiBr—$P_2S_5$, $Li_2S$—$Li_2O$—$P_2S_5$, $Li_2S$—$Li_3PO_4$—$P_2S_5$, $Li_2S$—$P_2S_5$—$P_2O_5$, $Li_2S$—$P_2S_5$—$SiS_2$, $Li_2S$—$P_2S_5$—$SiS_2$—LiCl, $Li_2S$—$P_2S_5$—SnS, $Li_2S$—$P_2S_5$—$Al_2S_3$, $Li_2S$—$GeS_2$, $Li_2S$—$GeS_2$—ZnS, $Li_2S$—$Ga_2S_3$, $Li_2S$—$GeS_2$—$Ga_2S_3$, $Li_2S$—$GeS_2$—$P_2S_5$, $Li_2S$—$Ge_S2$-$Sb_2S_5$, $Li_2S$—$GeS_2$—$Al_2S_3$, $Li_2S$—$SiS_2$, $Li_2S$—$Al_2S_3$, $Li_2S$—$SiS_2$—$Al_2S_3$, $Li_2S$—$SiS_2$—$P_2S_5$, $Li_2S$—$Si_S2$-$P_2S_5$—LiI, $Li_2S$—$SiS_2$—LiI, $Li_2S$—$SiS_2$—$Li_4SiO_4$, $Li_2S$—$SiS_2$—$Li_3PO_4$, and $Li_{10}GeP_2S_{12}$. The mixing ratio between the individual raw materials does not matter. Examples of the method of synthesizing a sulfide-based inorganic solid electrolyte material using the above-described raw material compositions include an amorphization method. Examples of the amorphization method include a mechanical milling method, a solution method, and a melting quenching method. This because treatments at a normal temperature become possible, and it is possible to simplify manufacturing processes.

(ii) Oxide-Based Inorganic Solid Electrolytes

The oxide-based inorganic solid electrolyte is preferably an electrolyte that contains an oxygen atom, has an ion conductivity of a metal belonging to Group 1 or Group 2 in the periodic table, and has electron-insulating properties.

The ion conductivity of the oxide-based inorganic solid electrolyte is preferably $1\times10^{-6}$ S/cm or more, more preferably $5\times10^{-6}$ S/cm or more, and particularly preferably $1\times10^{-5}$ S/cm or more. The upper limit is not particularly limited; however, it is practically $1\times10^{-1}$ S/cm or less.

Specific examples of the compound include $Li_{xa}La_{ya}TiO_3$ (LLT) [xa satisfies $0.3 \leq xa \leq 0.7$, and ya satisfies $0.3 \leq ya \leq 0.7$]; $Li_{xb}La_{yb}Zr_{zb}M^{bb}_{mb}O_{nb}$ ($M^{bb}$ is one or more elements selected from Al, Mg, Ca, Sr, V, Nb, Ta, Ti, Ge, In, and Sn, xb satisfies $5 \leq xb \leq 10$, yb satisfies $1 \leq yb \leq 4$, zb satisfies $1 \leq zb \leq 4$, mb satisfies $0 \leq mb \leq 2$, and nb satisfies $5 \leq nb \leq 20$); $Li_{xc}B_{yc}M^{cc}_{zc}O_{nc}$ ($M^{cc}$ is one or more elements selected from C, S, Al, Si, Ga, Ge, In, and Sn, xc satisfies $0 < xc \leq 5$, yc satisfies $0 < yc \leq 1$, zc satisfies $0 < zc \leq 1$, and nc satisfies $0 < nc \leq 6$); $Li_{xd}(Al, Ga)_{yd}(Ti, Ge)_{zd}Si_{ad}P_{md}O_{nd}$ (xd satisfies $1 \leq xd \leq 3$, yd satisfies $0 \leq yd \leq 1$, zd satisfies $0 \leq zd \leq 2$, ad satisfies $0 \leq ad \leq 1$, md satisfies $1 \leq md \leq 7$, and nd satisfies $3 \leq nd \leq 13$); $Li_{(3-2xe)}M^{ee}_{xe}D^{ee}O$ (xe represents a number between 0 and 0.1, and $M^{ee}$ represents a divalent metal atom, $D^{ee}$ represents a halogen atom or a combination of two or more halogen atoms); $Li_{xf}Si_{yf}O_{zf}$ (xf satisfies $1 \leq xf \leq 5$, yf satisfies $0 \leq yf \leq 3$, zf satisfies $1 \leq zf \leq 10$); $Li_{xg}S_{yg}O_{zg}$ (xg satisfies $1 \leq xg \leq 3$, yg satisfies $0 \leq yg \leq 2$, zg satisfies $1 \leq zg \leq 10$); $Li_3BO_3$; $Li_3BO_3$—$Li_2SO_4$; $Li_2O$—$B_2O_3$—$P_2O_5$; $Li_2O$—$SiO_2$; $Li_6BaLa_2Ta_2O_{12}$; $Li_3PO_{(4-3/2w)}N_w$ (w satisfies w<1); $Li_{3.5}Zn_{0.25}GeO_4$ having a lithium super ionic conductor (LISICON)-type crystal structure; $La_{0.55}Li_{0.35}TiO_3$ having a perovskite-type crystal structure; $LiTi_2P_3O_{12}$ having a natrium super ionic conductor (NASICON)-type crystal structure; $Li_{1+xh+yh}(Al, Ga)_{xh}(Ti, Ge)_{2-xh}Si_{yh}P_{3-yh}O_{12}$ (xh satisfies $0 \leq xh \leq 1$, and yh satisfies $0 \leq yh \leq 1$); and $Li_7La_3Zr_2O_{12}$ (LLZ) having a garnet-type crystal structure.

In addition, a phosphorus compound containing Li, P, or O is also desirable. Examples thereof include lithium phosphate ($Li_3PO_4$); LiPON in which a part of oxygen in lithium phosphate are substituted with nitrogen; and $LiPOD^1$ ($D^1$ is preferably one or more elements selected from Ti, V, Cr, Mn, Fe, Co, Ni, Cu, Zr, Nb, Mo, Ru, Ag, Ta, W, Pt, and Au).

Further, It is also possible to preferably use $LiA^1ON$ ($A^1$ is one or more elements selected from Si, B, Ge, Al, C, and Ga).

(iii) Halide-Based Inorganic Solid Electrolyte

The halide-based inorganic solid electrolyte is preferably a compound that contains a halogen atom, has an ion conductivity of a metal belonging to Group 1 or Group 2 in the periodic table, and has electron-insulating properties.

The halide-based inorganic solid electrolyte is not particularly limited; however, examples thereof include LiCl, LiBr, LiI, and compounds such as $Li_3YBr_6$ or $Li_3YCl_6$ described in ADVANCED MATERIALS, 2018, 30, 1803075. In particular, $Li_3YBr_6$ or Li3YCl6 is preferable.

(iv) Hydride-Based Inorganic Solid Electrolyte

The hydride-based inorganic solid electrolyte is preferably a compound that contains a hydrogen atom, has an ion conductivity of a metal belonging to Group 1 or Group 2 in the periodic table, and has electron-insulating properties.

The hydride-based inorganic solid electrolyte is not particularly limited; however, examples thereof include $LiBH_4$, $Li_4(BH_4)_3I$, and $3LiBH_4$—LiCl.

The inorganic solid electrolyte is preferably particulate. In this case, the particle diameter (the volume average particle diameter) of the inorganic solid electrolyte is not particularly limited; however, it is preferably 0.01 μm or more and more preferably 0.1 μm or more. The upper limit is preferably 100 μm or less and more preferably 50 μm or less.

The particle diameter of the inorganic solid electrolyte is measured in the following order. The inorganic solid electrolyte particles are diluted and prepared using water (heptane in a case where the inorganic solid electrolyte is unstable in water) in a 20 mL sample bottle to prepare 1% by mass of a dispersion liquid. The diluted dispersion liquid sample is irradiated with 1 kHz ultrasonic waves for 10 minutes and is then immediately used for testing. Data collection is carried out 50 times using this dispersion liquid sample, a laser diffraction/scattering-type particle diameter distribution measurement instrument LA-920 (product name, manufactured by Horiba Ltd.), and a quartz cell for measurement at a temperature of 25° C. to obtain the volume average particle diameter. Other detailed conditions and the like can be found in Japanese Industrial Standards (JIS) Z8828: 2013 "particle diameter Analysis-Dynamic Light Scattering" as necessary. Five samples per level are produced and measured, and the average values thereof are employed.

One kind of inorganic solid electrolyte may be contained, or two or more kinds thereof may be contained.

In a case of forming a solid electrolyte layer, the mass (mg) (mass per unit area) of the inorganic solid electrolyte per unit area ($cm^2$) of the solid electrolyte layer is not particularly limited. It can be appropriately determined according to the designed battery capacity and can be set to, for example, 1 to 100 $mg/cm^2$.

However, in a case where the inorganic solid electrolyte-containing composition contains an active material described later, the mass per unit area of the inorganic solid electrolyte is preferably such that the total amount of the active material and the inorganic solid electrolyte is in the above range.

The content of the inorganic solid electrolyte in the inorganic solid electrolyte-containing composition is not particularly limited. However, in terms of the binding property as well as in terms of dispersibility, it is preferably 50% by mass or more, more preferably 70% by mass or more, and still more preferably 90% by mass or more, in the solid content of 100% by mass. From the same viewpoint, the upper limit thereof is preferably 99.9% by mass or less, more preferably 99.5% by mass or less, and particularly preferably 99% by mass or less.

However, in a case where the inorganic solid electrolyte-containing composition contains an active material described below, regarding the content of the inorganic solid electrolyte in the inorganic solid electrolyte-containing composition, the total content of the active material and the inorganic solid electrolyte is preferably in the above-described range.

In the present invention, the solid content (solid component) refers to components that neither volatilize nor evaporate and disappear in a case where the inorganic solid electrolyte-containing composition is subjected to drying treatment at 150° C. for 6 hours in a nitrogen atmosphere at a pressure of 1 mmHg. Typically, the solid content refers to a component other than a dispersion medium described below.

<Polymer Binder>

The inorganic solid electrolyte-containing composition according to the embodiment of the present invention contains a polymer binder (also simply referred to as a binder). In the present invention, the polymer binder means a binder formed by containing a polymer.

The polymer binder contained in this inorganic solid electrolyte-containing composition contains one or more kinds of fluorine-containing binders consisting of a fluorine-based copolymer satisfying (1) to (3) described later. In addition, the polymer binder contained in the inorganic solid electrolyte-containing composition preferably contains a polymer binder other than the fluorine-containing binder, for example, a particulate polymer binder described later (preferably, a particulate polymer binder of which the adsorption rate with respect to the inorganic solid electrolyte in the composition is 60%) or a chain polymerization type polymer binder (for example, a binder consisting of a hydrocarbon-based polymer, a binder consisting of a (meth)acrylic polymer, or a polymer binder consisting of a vinyl polymer). Further, in a case of focusing on the adsorption rate of the polymer binder with respect to the inorganic solid electrolyte in the composition, a polymer binder (a low adsorption binder) of which the adsorption rate is less than 60% or a polymer (a high adsorption binder) of which the adsorption rate is 60% or more may be contained in addition to the fluorine-containing binder.

(Fluorine-Containing Binder)

First, a fluorine-containing binder contained in the inorganic solid electrolyte-containing composition according to the embodiment of the present invention as a polymer binder will be described. This fluorine-containing binder is consisting of a fluorine-based copolymer satisfying the following (1) to (3).

(1) It contains a vinylidene fluoride constitutional component and a hexafluoropropylene constitutional component as the constitutional component.

(2) The content of the hexafluoropropylene constitutional component in the fluorine-based copolymer is 21% to 65% by mole.

(3) The tensile fracture strain is 500% or more.

In the dispersion medium contained in the composition, where the SP value will be described later, the adsorption rate of this fluorine-containing binder with respect to the inorganic solid electrolyte is less than 60%.

In a case where the fluorine-containing binder is used in combination with solid particles of the inorganic solid electrolyte or the like in the inorganic solid electrolyte-containing composition containing a dispersion medium, it is possible to improve the dispersion stability and the handleability of the inorganic solid electrolyte-containing composition (the slurry).

In the present invention, the adsorption rate of a binder is a value measured by using an inorganic solid electrolyte and a dispersion medium contained in the inorganic solid electrolyte-containing composition, and it is an indicator that indicates the degree of adsorption of a binder to an inorganic solid electrolyte in the dispersion medium. Here, the adsorption of the binder to the inorganic solid electrolyte includes not only physical adsorption but also chemical adsorption (adsorption by chemical bond formation, adsorption by transfer of electrons, or the like).

In a case where the inorganic solid electrolyte-containing composition contains a plurality of kinds of inorganic solid electrolytes, the adsorption rate is defined as an adsorption rate with respect to the inorganic solid electrolyte having the same composition (kind and content) as the composition of the inorganic solid electrolyte in the inorganic solid electrolyte-containing composition. Similarly, in a case where the inorganic solid electrolyte-containing composition contains a plurality of kinds of dispersion media, the adsorption rate is measured by using a dispersion medium having the same composition (the kind and the content) as the dispersion media in the inorganic solid electrolyte-containing composition. In addition, in a case where a plurality of kinds of each of the binders such as a fluorine-containing binder, a particulate binder, and a binder consisting of a chain polymerization type polymer are used, the adsorption rate of each of the binders is defined as the adsorption rate of the plurality of kinds of each binder in the same manner as in the case of the inorganic solid electrolyte-containing composition or the like.

In the present invention, the adsorption rate of the binder is a value calculated by the method described in Examples.

The adsorption rate of the fluorine-containing binder with respect to the inorganic solid electrolyte is less than 60%. In a case where the fluorine-containing binder exhibits the above adsorption rate, it is possible to suppress the excessive adsorption to the inorganic solid electrolyte and improve the dispersion stability and the handleability of the inorganic solid electrolyte-containing composition. The adsorption rate is preferably 50% or less, more preferably 40% or less, still more preferably 30% or less, particularly preferably 10% or less, and most preferably less than 5%, in that both dispersion stability and handleability can be achieved at a higher level. On the other hand, the lower limit of the adsorption rate is not particularly limited and may be 0%. The lower limit of the adsorption rate is preferably small from the viewpoint of dispersion stability and handleability; however, on the other hand, it is preferably more than 0%, more preferably 0.1% or more, and still more preferably 0.5% or more, from the viewpoint of improving the binding property of the inorganic solid electrolyte.

In the present invention, the adsorption rate with respect to the inorganic solid electrolyte can be appropriately set depending on the characteristics (for example, the content of the hexafluoropropylene constitutional component and the mass average molecular weight thereof) of the polymer (the fluorine-based copolymer) that forms the fluorine-containing binder, the kind or content of the functional group contained in the polymer, the configuration (the amount dissolved in the dispersion medium) of the fluorine-containing binder, and the like.

The fluorine-containing binder may be soluble (a soluble type binder) or insoluble in the dispersion medium contained in the inorganic solid electrolyte-containing composition; however, it is preferably a soluble type binder dissolved in the dispersion medium. In the present invention, the description that a binder is dissolved in a dispersion medium means that a fluorine-containing binder is dissolved in a dispersion medium of the inorganic solid electrolyte-containing composition, and for example, it means that the solubility is 80% by mass or more in the solubility measurement. The measuring method for solubility is as follows.

That is, a specified amount of a binder to be measured is weighed in a glass bottle, 100 g of the dispersion medium contained in the inorganic solid electrolyte-containing composition is added thereto, and stirring is carried out at a temperature of 25° C. on a mix rotor at a rotation speed of 80 rpm for 24 hours. After stirring for 24 hours, the obtained mixed solution is subjected to the transmittance measurement under the following conditions. This test (the transmittance measurement) is carried out by changing the amount of the binder dissolved (the above specified amount), and the upper limit concentration X (% by mass) at which the transmittance is 99.8% is defined as the solubility of the binder in the above dispersion medium.

<Transmittance Measurement Conditions>

Dynamic light scattering (DLS) measurement

Device: DLS measuring device DLS-8000 manufactured by Otsuka Electronics Co., Ltd.

Laser wavelength, output: 488 nm/100 mW

Sample cell: NMR tube

In a case where the inorganic solid electrolyte-containing composition according to the embodiment of the present invention contains an active material described later (in a case where an active material layer is formed of the inorganic solid electrolyte-containing composition), the adsorption rate of the polymer binder to the active material is not particularly limited; however, it is preferably 90% or less, more preferably 0.1% to 50%, and still more preferably 1% to 10% in terms of the dispersion stability and the handleability of the inorganic solid electrolyte-containing composition and the enhancement of the binding property of the solid particles. In the present invention, the adsorption rate of a binder with respect to an active material is a value measured by using an active material and a dispersion medium, which are contained in the inorganic solid electrolyte-containing composition, and it is an indicator that indicates the degree of adsorption of a binder to an active material in the dispersion medium. Here, the adsorption of the binder to the active material includes not only physical adsorption but also chemical adsorption (adsorption by chemical bond formation, adsorption by transfer of electrons, or the like). In the present invention, it is particularly preferable that the adsorption rate of the fluorine-containing binder with respect to the active material is within the above range.

As a result, in a case where the inorganic solid electrolyte-containing composition contains a plurality of kinds of active materials, the adsorption rate is the same as that of the binder with respect to the inorganic solid electrolyte, described above, in a case where a plurality of kinds of binders are used. In the present invention, the adsorption rate of the binder with respect to the active material is a value calculated by the method described in Examples. In the present invention, the adsorption rate with respect to the active material can be appropriately set in the same manner as the adsorption rate with respect to the inorganic solid electrolyte.

—Polymer that Forms Fluorine-Containing Binder—

The polymer that forms the fluorine-containing binder is a fluorine-based copolymer which contains a vinylidene fluoride constitutional component and a hexafluoropropylene constitutional component of a specific content and which exhibits a tensile fracture strain of 500% or more.

In the present invention, the fluorine-based copolymer means a copolymer having a vinylidene fluoride (VDF) constitutional component and a hexafluoropropylene (HFP) constitutional component, and it includes a copolymer (may be referred to as another constitutional component) further having a constitutional component derived from a polymerizable compound copolymerizable with VDF and HFP. For convenience, it is referred to as a "fluorine-based copolymer" in that it may have such another constitutional component.

The polymerizable compound copolymerizable with VDF and HFP is not particularly limited; however, examples thereof include a polymerizable compound having at least one carbon-carbon unsaturated bond. More specific examples thereof include a polymerizable compound containing a fluorine atom (a fluorine-containing polymerizable compound), a polymerizable compound which contains no fluorine atom, and a polymerizable compound having a functional group selected from the Group (a) of functional groups described later.

In addition to using a copolymerizable polymerizable compound, the Group (a) of functional groups, another component, or the like may be introduced by using a functional group that is present in the main chain, the side chain, and the terminal of the fluorine-based copolymer, as a reaction point. Specifically, it is possible to modify a fluorine-based copolymer by an ene reaction or ene-thiol reaction with a double bond which is generated by a dehydrofluorination reaction of a VDF constitutional component of a fluorine-based copolymer or by an atom transfer radical polymerization (ATRP) method using a copper catalyst.

The fluorine-based copolymer has a vinylidene fluoride (VDF) constitutional component and a hexafluoropropylene (HFP) constitutional component, and it includes both aspects of an aspect in which a constitutional component derived from a fluorine-containing polymerizable compound is included and an aspect in which a constitutional component derived from a fluorine-containing polymerizable compound is not included. In the present invention, an aspect in which a constitutional component derived from a fluorine-containing polymerizable compound is included is one of the preferred aspects, and in a case where a functional group (a) described later is introduced, an aspect, in which a constitutional component derived from a copolymerizable polymerizable compound, particularly among the fluorine-containing polymerizable compounds, a compound (for example, monofluoroethylene) having a hydrogen atom which is bonded to a carbon atom that forms a carbon-carbon unsaturated bond is included, is one of the preferred aspects.

The VDF constitutional component that forms the fluorine-based copolymer is a constitutional component derived from vinylidene fluoride, and it is represented by —CF$_2$—CH$_2$—. The HFP constitutional component is a constitutional component derived from hexafluoropropylene, and it is represented by, for example, —CF$_2$—CF(CF$_3$)—.

It suffices that the constitutional component derived from the fluorine-containing polymerizable compound which may form the fluorine-based copolymer is a constitutional component other than the VDF constitutional component and is a constitutional component derived from the fluorine-containing polymerizable compound other than the HFP constitutional component, and it is not particularly limited. The fluorine-containing polymerizable compound from which this constitutional component is derived is, for example, a compound having a fluorine atom that is directly bonded or indirectly (for example, via a linking group described later) bonded to a carbon-carbon unsaturated bond. The fluorine-containing polymerizable compound is not particularly limited; however, examples thereof include fluorinated vinyl compounds such as tetrafluoroethylene, trifluoroethylene, monofluoroethylene, and chlorotrifluoroethylene, and perfluoroalkyl ether compounds such as trifluoromethyl vinyl ether and pentafluoroethyl vinyl ether.

In addition, the fluorine-containing polymerizable compound includes a polymerizable compound (a macromonomer) having a polymeric chain that is directly or indirectly (for example, via a linking group described later) bonded to a carbon-carbon unsaturated bond. Examples thereof include a compound in which at least one hydrogen atom of the fluorine-containing polymerizable compound is substituted with a polymeric chain. The polymeric chain is not particularly limited, and a general polymer component can be applied. Examples thereof include a polymeric chain of a (meth)acrylic polymer, a polymeric chain of a vinyl polymer, a polymeric chain of polysiloxane, a polyalkylene ether chain, and a hydrocarbon chain. As the (meth)acrylic polymer and the vinyl polymer that constitute the polymeric chain, those described in the chain polymerization type polymer binder described later can be used without particular limitation.

An example of a fluorine-based copolymer having a constitutional component derived from a polymerizable compound having a polymeric chain is shown below and in Example. In the following copolymer, the number at the bottom right of each constitutional component indicates the content (% by mole) of the constitutional component in the copolymer.

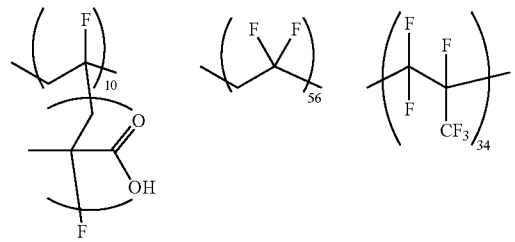

It suffices that the constitutional component derived from the polymerizable compound containing no fluorine atom is a constitutional component copolymerizable with vinylidene fluoride or hexafluoropropylene and it is a constitutional component derived from a compound that does not have a functional group selected from the Group (a) of functional groups described later, which is not particularly limited. Examples of the polymerizable compound which contains no fluorine atom, from which this constitutional component is derived, include a polymerizable compound that is generally used for chain polymerization, and specific examples thereof include a vinyl compound (M2) described later and a diene compound.

It suffices that the constitutional component derived from a polymerizable compound having a functional group selected from the Group (a) of functional groups is a constitutional component having the above-described functional group and is not particularly limited. For example, it may contain or not contain a fluorine atom, and examples thereof include a vinyl compound and a diene compound. Examples of the polymerizable compound having a functional group, from which this constitutional component is derived, include a polymerizable compound having the above-described functional group among the polymerizable compounds that are used in the chain polymerization, and the details thereof will be described later.

The VDF constitutional component and other constitutional component form the fluorine-based copolymer may each have a substituent. The substituent is not particularly limited as long as it does not deviate from the category of each constitutional component, and examples thereof include a group selected from the substituent Z described later and a functional group selected from the Group (a) of functional groups described later. In a case where the VDF constitutional component or the like has a functional group selected from the Group (a) of functional groups, it is classified into the above-described "constitutional component derived from a polymerizable compound having a functional group".

The fluorine-based copolymer that is used in the present invention may be any of the block copolymer, the alternating copolymer, and the random copolymer of each of the above constitutional components; however, it is preferably the random copolymer in terms of solubility.

Such a fluorine-based copolymer may be appropriately synthesized, or a commercially available product may be used.

The fluorine-based copolymer that forms the fluorine-containing binder may be one kind or two or more kinds.

In the fluorine-based copolymer, the content of the HFP constitutional component (also referred to as the HFP amount) is 21% to 65% by mole of all the constitutional components that constitute the fluorine-based copolymer. This makes it is possible to weaken the action of the fluorine-containing binder consisting of the fluorine-based copolymer on the inorganic solid electrolyte, which contributes to the improvement of dispersion stability and handleability. In addition, the adsorption rate can be reduced to less than 60%. The upper limit of the HFP amount is preferably 60% by mole or less, more preferably 50% by mole or less, still more preferably 45% by mole or less, and even still more preferably 40% by mole or less, in terms of improving dispersion stability and handleability, and furthermore, enhancing the adhesiveness of the collector. On the other hand, the lower limit of the HFP amount is preferably 25% by mole or more, more preferably 30% by mole or more, and still more preferably 35% by mole or more, in terms of improving dispersion stability and handleability, and furthermore, enhancing the adhesiveness of the collector. However, in a case where the mass average molecular weight of the fluorine-based copolymer is 400,000 or more, the lower limit of the HFP amount does not need to be 25% by mole or more or 30% by mole or more in a case where it is 21% by mole or more, and it is preferably 22% by mole or more. The HFP amount of the fluorine-based copolymer can be determined by measuring the nuclear magnetic resonance (NMR) spectrum of the copolymer (the NMR measurement method). The fluorine-based copolymer of the composition is measured using, for example, a fluorine-based copolymer extracted with tetrahydrofuran (THF). In addition, regarding the fluorine-based copolymer in the sheet for an all-solid state secondary battery or the constitutional layer of the all-solid state secondary battery, for example, the sheet or the battery is disassembled, the constitutional layer containing the polymer binder is peeled off to obtain a constitutional layer, and fluorine-based copolymer is extracted from the peeled constitutional layer with THF and measured.

In the fluorine-based copolymer, the content of the VDF constitutional component (also referred to as the VDF amount) is not particularly limited; however, it is preferably 30% to 90% by mole, more preferably 40% to 80% by mole, and still more preferably 50% to 75% by mole of all the constitutional components that constitute the fluorine-based copolymer, in terms of improving dispersion stability and handleability, and furthermore, enhancing the adhesiveness of the collector. The VDF amount can be measured according to the NMR measurement method using the fluorine-based copolymer extracted in the same manner as the measurement of the HFP amount.

In addition, in the fluorine-based copolymer, the ratio of the VDF amount to the HFP amount (the VDF amount/the HFP amount) is not particularly limited; however, it is preferably 0.5 to 5, more preferably 1 to 4, and still more preferably 1 to 3, in terms of improving dispersion stability and handleability, and furthermore, enhancing the adhesiveness of the collector.

In the fluorine-based copolymer, the total content of the constitutional component derived from the copolymerizable polymerizable compound is not particularly limited; however, it can be, for example, 50% by mole or less.

Among the copolymerizable polymerizable compounds, the content of each of the constitutional component derived from the fluorine-containing polymerizable compound or the polymerizable compound which contains no fluorine atom is appropriately set within the range in which excellent dispersion stability and handleability are not impaired, in consideration of the adsorption rate or tensile fracture strain of the fluorine-based binder, the binding force of the solid particles, and the like. The content of the constitutional components derived from the fluorine-containing polymerizable compound is, for example, preferably 0% to 45% by mole and more preferably 2% to 40% by mole of all the constitutional components that constitute the fluorine-based copolymer. The content of the constitutional components derived from the polymerizable compound which contains no fluorine atom is, for example, preferably 0% to 30% by mole and more preferably 1% to 25% by mole of all the constitutional components that constitute the fluorine-based copolymer.

The content of the constitutional component (the constitutional component having a functional group) derived from the polymerizable compound having a functional group selected from the Group (a) of functional groups is appropriately determined in consideration of the adsorption rate or tensile fracture strain of the fluorine-containing binder, the binding force of the solid particles, and the like. For example, the lower limit value thereof is preferably 0.01% to 10% by mole, more preferably 0.02% by mole or more, still more preferably 0.05% by mole or more, and particularly preferably 0.1% by mole or more of all the constitutional components that constitute the fluorine-based copolymer, in that the binding force of solid particles as well as the adhesiveness to the collector can be further strengthened while maintaining excellent dispersion stability and handleability. The upper limit is more preferably 8% by mole or less, still preferably 5% by mole or less, and particularly preferably 2% by mole or less.

In a case where the fluorine-based copolymer has a plurality of constitutional components having a functional group, the content of the constitutional components having a functional group is adopted as the total amount. In addition, the content of a constitutional component having a functional group generally means the content of the constitutional component in a case where one constitutional component has a plurality of functional groups or a plurality of kinds of functional groups; however, in the present invention, the total amount of contents in terms of the respective functional groups is used, for convenience, in relation to the adsorption rate of the binder consisting of the fluorine-based copolymer, the binding force of solid particles, and the like. In this case, the total of the contents of all the constitutional components that constitute the fluorine-based copolymer exceeds 100% by mole. However, in a case where a plurality of functional groups or a plurality of kinds of functional groups are present in one molecular chain (such as a linear molecular chain) (for example, in a case of being derived from a common raw material compound), the contents in terms of the respective functional groups are not included in the above total amount, and contents of a plurality of functional groups or a plurality of kinds of functional groups are collectively included in the total amount as one content in terms of one functional group. For example, in the case of the polymer S-21 synthesized in Example, one constitutional component has an ester group and a carboxy group, and thus each of the contents of the constitutional components having an ester group and a carboxy group is not set to 0.3% by mole (total: 0.6% by mole). However, the ester group and carboxy group are collectively regarded as one functional group, whereby the content of this constitutional component is set to 0.3% by mole.

The fluorine-based copolymer preferably contains a constitutional component having a functional group selected from the above-described Group (a) of functional groups as, for example, a substituent (a constitutional component having a functional group). The constitutional component having a functional group has a function of improving the adsorption rate of the low adsorption binder with respect to the inorganic solid electrolyte. This constitutional component having a functional group includes a constitutional component derived from a polymerizable compound that constitutes a functional group as a copolymerizable compound, in addition to the constitutional component derived from the polymerizable compound having a functional group. Examples of the constitutional component derived from a polymerizable compound that constitutes a functional group include a constitutional component derived from a polymerizable carboxylic acid anhydride such as maleic acid anhydride. Further, the constitutional component having a functional group also includes a constitutional component copolymerized with vinylidene fluoride and hexafluoropropylene and constitutional components (for example, the copolymerization components of polymers S-18 to S-24 synthesized in Examples) obtained by introducing a functional group selected from the Group (a) of functional groups described later or the like by various reactions into the constitutional component derived from ((for example, through the dehydrofluorination) the vinylidene fluoride constitutional component.

The above-described functional group may be contained in any one of the constitutional components that form the fluorine-based copolymer; however, it is preferably contained in the constitutional component other than the VDF constitutional component, the HFP constitutional component, and the constitutional component derived from the polymerizable compound which contains no fluorine atom. Examples of the preferred constitutional component having the above-described functional groups include a constitutional component derived from the fluorine-containing polymerizable compound. The functional group may be incorporated into the main chain or the side chain of the polymer. An aspect in which the incorporation into the side chain is made by being bonded directly or via a linking group to the atom that forms the main chain of the polymer and an aspect in which the above-described functional group is contained in the polymeric chain of the macromonomer that constitutes the side chain is included.

In the present invention, a main chain of the polymer refers to a linear molecular chain which all the molecular chains that constitute the polymer other than the main chain can be conceived as a branched chain or a pendant with respect to the main chain. Although it depends on the mass average molecular weight of the molecular chain regarded as a branched chain or pendant chain, the longest chain among the molecular chains constituting the polymer is typically the main chain. In this case, a terminal group at the polymer terminal is not included in the main chain. In addition, side chains of the polymer refer to molecular chains other than the main chain and include a short molecular chain and a long molecular chain.

<Group (a) of Functional Groups>

A hydroxy group, an amino group, a carboxy group, a sulfo group, a phosphate group, a phosphonate group, a sulfanyl group, an ether bond (—O—), an imino group (=NR, or —NR—), an ester bond (—CO—O—), an amide bond (—CO—NR—), a urethane bond (—NR—CO—O—), a urea bond (—NR—CO—NR—), a heterocyclic group, an aryl group, an anhydrous carboxylic acid group, an isocyanate group (—NCO), an alkoxysilyl group, a fluoroalkyl group, and a siloxane group Each of the amino group, the sulfo group, the phosphate group (the phosphoryl group), the heterocyclic group, the aryl group, and the alkoxysilyl group, which are included in the Group (a) of functional groups, is not particularly limited; however, it is synonymous with the corresponding group of the substituent Z described later. However, the amino group more preferably has 0 to 12 carbon atoms, still more preferably 0 to 6 carbon atoms, and particularly preferably 0 to 2 carbon atoms. The phosphonate group is not particularly limited; however, examples thereof include a phosphonate group having 0 to 20 carbon atoms. The hydroxy group, the amino group, the carboxy group, the sulfo group, the phosphate group, the phosphonate group, or the sulfanyl group may form a salt. The fluoroalkyl group is a group obtained by substituting at least one hydrogen atom of an alkyl group or cycloalkyl group with a fluorine atom, and it preferably has 1 to 20 carbon atoms, more preferably 2 to 15 carbon atoms, and still more preferably 3 to 10 carbon atoms. Regarding the number of fluorine atoms on the carbon atom, a part of the hydrogen atoms may be substituted, or all the hydrogen atoms may be substituted (a perfluoroalkyl group).

The siloxane group is not particularly limited, and it is preferably, for example, a group having a structure represented by —(SiR$_2$—O)$_n$—. The average repetition number n is preferably 1 to 100, more preferably 5 to 50, and still more preferably 10 to 30.

The constitutional component having an ester bond (excluding an ester bond that forms a carboxy group) or an amide bond as a functional group means a constitutional component in which an ester bond or an amide bond is not directly bonded to an atom that constitutes the main chain, and it does not include, for example, a constitutional component derived from a (meth)acrylic acid alkyl ester.

R in each bond represents a hydrogen atom or a substituent, and it is preferably a hydrogen atom. The substituent is not particularly limited. It is selected from a substituent Z described later, and an alkyl group is preferable.

The anhydrous carboxylic acid group is not particularly limited; however, it includes a group obtained by removing one or more hydrogen atoms from a carboxylic acid anhydride (for example, a group represented by Formula (2a)), as well as a constitutional component itself (for example, a constitutional component represented by Formula (2b)) obtained by copolymerizing a polymerizable carboxylic acid anhydride as a copolymerizable compound. The group obtained by removing one or more hydrogen atoms from a carboxylic acid anhydride is preferably a group obtained by removing one or more hydrogen atoms from a cyclic carboxylic acid anhydride. The anhydrous carboxylic acid group derived from a cyclic carboxylic acid anhydride also corresponds to a heterocyclic group; however, it is classified as an anhydrous carboxylic acid group as a functional group of the Group (a) of functional groups in the present invention. Examples thereof include acyclic carboxylic acid anhydrides such as acetic acid anhydride, propionic acid anhydride, and benzoic acid anhydride, and cyclic carboxylic acid anhydrides such as maleic acid anhydride, phthalic acid anhydride, fumaric acid anhydride, succinic acid anhydride, and itaconic acid anhydride. The polymerizable carboxylic acid anhydride is not particularly limited; however, examples thereof include a carboxylic acid anhydride having an unsaturated bond in the molecule, and a polymerizable cyclic carboxylic acid anhydride is preferable. Specific examples thereof include maleic acid anhydride.

Examples of the anhydrous carboxylic acid group include a group represented by Formula (2a) and a constitutional component represented by Formula (2b); however, the present invention is not limited thereto. In each of the formulae, * represents a bonding position.

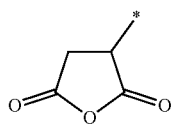

(2a)

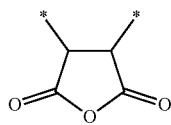

(2b)

The functional group selected from the Group (a) of functional groups is preferably a hydroxy group, a carboxy group, a phosphonate group, a heterocyclic group, or an anhydrous carboxylic acid group, and it is more preferably an anhydrous carboxylic acid group.

The method of incorporating a functional group into a polymer chain is not particularly limited, and examples thereof include a method of using a polymerizable compound having a functional group selected from the Group (a) of functional groups as a copolymerizable polymerizable compound (a polymerizable compound having a functional group), a method of using a polymerization initiator having (generating) the above-described functional group or a chain transfer agent, and a method of using a polymeric reaction, an ene reaction or ene-thiol reaction with a double bond which is generated by a dehydrofluorination reaction of a VDF constitutional component of a fluorine-based copolymer, and an atom transfer radical polymerization (ATRP) method using a copper catalyst.

The polymerizable compound having the above-described functional group is not particularly limited; however, examples thereof include a polymerizable compound having at least one carbon-carbon unsaturated bond and at least one functional group described above. For example, it includes a compound in which a carbon-carbon unsaturated bond and the above-described functional group are directly bonded, a compound in which a carbon-carbon unsaturated bond and the above-described functional group are bonded via a linking group, as well as a compound (for example, the polymerizable cyclic carboxylic acid anhydride) in which the functional group itself contains a carbon-carbon unsaturated bond. Further, the compound having the above-described functional group includes a compound capable of introducing a functional group by various reactions into a constitutional component copolymerized with VDF and HFP or a constitutional component derived from (for example, through the dehydrofluorination) the VDF constitutional component. Examples of such a compound include each of the alcohol, amino, mercapto, or epoxy compounds (including polymers), which is capable of being subjected to an addition reaction or a condensation reaction with a constitutional component derived from carboxylic acid anhydride, a constitutional component having a carbon-carbon unsaturated bond (for example, the VDF constitutional component subjected to the dehydrofluorination), or the like. Specific examples thereof include compounds A-32 to A-76 exemplified later and the following macromonomer. Further, examples of the compound having the above-described functional group also include a compound in which a carbon-carbon unsaturated bond is bonded directly or via a linking group to a macromonomer having a functional group incorporated as a substituent in the polymeric chain (for example, a compound A-31 or the like which will be exemplified later). Examples of the macromonomer from which the macromonomer constitutional component is derived include a macromonomer that is appropriately determined depending on the kind of the main chain of the binder-forming polymer, for example, a macromonomer having a polymeric chain of a chain polymerization polymer described later, although it is not unique.

Among the above, a polymeric chain or the like consisting of a (meth)acrylic polymer is preferable, and it preferably has a constitutional component derived from the (meth)acrylic compound (M1) described later or a constitutional component derived from the polymerizable compound (M2) described later. The (meth)acrylic compound (M1) is not particularly limited; however, examples thereof include a (meth)acrylic acid compound, a (meth)acrylic acid ester compound, a (meth)acrylamide compound, and a (meth)acrylonitrile compound. An aspect in which the (meth)acrylic acid alkyl ester compound that constitutes the polymeric chain has the above-described fluoroalkyl group as an alkyl group is also one of the preferred aspects. In addition, in a case where the polymeric chain having a (meth)acrylic acid alkyl ester compound has a plurality of (meth)acrylic acid ester compounds, at least one is a (meth)acrylic acid fluoroalkyl ester compound, and in at least another one of the (meth)acrylic acid alkyl ester compounds, the number of carbon atoms of the alkyl group is preferably 3 to 20, more preferably 4 to 16, and still more preferably 6 to 14. The content of the other polymerizable compound (M2) in the (meth)acrylic polymer is not particularly limited; however, it can be, for example, less than 50% by mole.

The number average molecular weight of the macromonomer is not particularly limited; however, it is preferably 500 to 100,000, more preferably 1,000 to 50,000, and still more preferably 2,000 to 20,000, in that the binding force of solid particles as well as the adhesiveness to the collector can be further strengthened while maintaining excellent dispersion stability and handleability. The content of the repeating unit having a functional group that is incorporated into the macromonomer is preferably 1% to 100% by mole, more preferably 3% to 80% by mole, and still more preferably 5% to 70% by mole. The content of the repeating unit having no functional group is preferably 0% to 90% by mole, more preferably 0 to 70% by mole, and still more preferably 0% to 50% by mole. Any component can be selected from the viewpoint of solubility.

The compound having a functional group is preferably a compound in which the functional group itself contains a carbon-carbon unsaturated bond and more preferably maleic acid anhydride.

The carbon-carbon unsaturated bond is not particularly limited, and examples thereof include a vinyl group and a (meth) acryloyl group.

The linking group that links a carbon-carbon unsaturated bond and the functional group is not particularly limited; however, examples thereof include an alkylene group (preferably having 1 to 12 carbon atoms, more preferably 1 to 6 carbon atoms, and still more preferably having 1 to 3 carbon atoms), an alkenylene group (preferably having 2 to 6 carbon atoms and more preferably having 2 or 3 carbon atoms), an arylene group (preferably having 6 to 24 carbon atoms and more preferably having 6 to 10 carbon atoms), an oxygen atom, a sulfur atom, an imino group (—$NR^N$—), a carbonyl group, a phosphate linking group (—O—P(OH)(O)—O—), a phosphonate linking group (—P(OH)(O)—O—), and a group involved in the combination thereof. It is also possible to form a polyalkyleneoxy chain by combining an alkylene group and an oxygen atom. The linking group is preferably a group composed of a combination of an alkylene group, an arylene group, a carbonyl group, an oxygen atom, a sulfur atom, and an imino group, more preferably a group composed of a combination of an alkylene group, an arylene group, a carbonyl group, an oxygen atom, and an imino group, still more preferably a group containing a —CO—O— group, a —CO—N($R^N$)— group (—$NR^N$—: $R^N$ represents a hydrogen atom, an alkyl group having 1 to 6 carbon atoms or an aryl group having 6 to 10 carbon atoms), and particularly preferably a group obtained by combining a —CO—O— group or —CO—N ($R^N$)— group with an alkylene group or polyalkyleneoxy chain. The linking group may have a group other than the functional group selected from the Group (a) of functional groups. The number of atoms that constitute the linking group and the number of linking atoms are as described later. However, the above does not apply to the polyalkyleneoxy chain that constitutes the linking group. Examples of the group other than the above-described functional group include a substituent Z described later, and examples thereof include an alkyl group and a halogen atom.

In the present invention, the number of atoms that constitute the linking group is preferably 1 to 36, more preferably 1 to 24, still more preferably 1 to 12, and particularly preferably 1 to 6. The number of linking atoms of the linking group is preferably 10 or less and more preferably 8 or less. The lower limit thereof is 1 or more. The number of linking atoms refers to the minimum number of atoms linking predetermined structural parts. For example, in a case of —$CH_2$—C(=O)—O—, the number of atoms that constitute the linking group is 6; however, the number of linking atoms is 3.

The functional group contained in one constitutional component may be one kind or two or more kinds, and in a case where two or more kinds are contained, they may be or may not be bonded to each other.

An aspect in which the compound having a functional group is a compound capable of introducing a functional group by various reactions into a constitutional component derived from the VDF constitutional component is also one of the preferred aspects.

Examples of the compound having a functional group include a (meth)acrylic compound (M1) such as a (meth) acrylic acid compound, a (meth)acrylic acid ester compound, or a (meth)acrylamide compound, which is a compound having the above-described functional group, and a polymerizable compound (M2) such as an aromatic vinyl compound including a vinyl naphthalene compound, a vinyl carbazole compound, or the like, an allyl compound, a vinyl ether compound, or a vinyl ester compound, which is a compound having the above-described functional group.

Specific examples of the polymerizable compound having a functional group and the compound that is capable of introducing a functional group are shown below, but the present invention is not limited thereto.

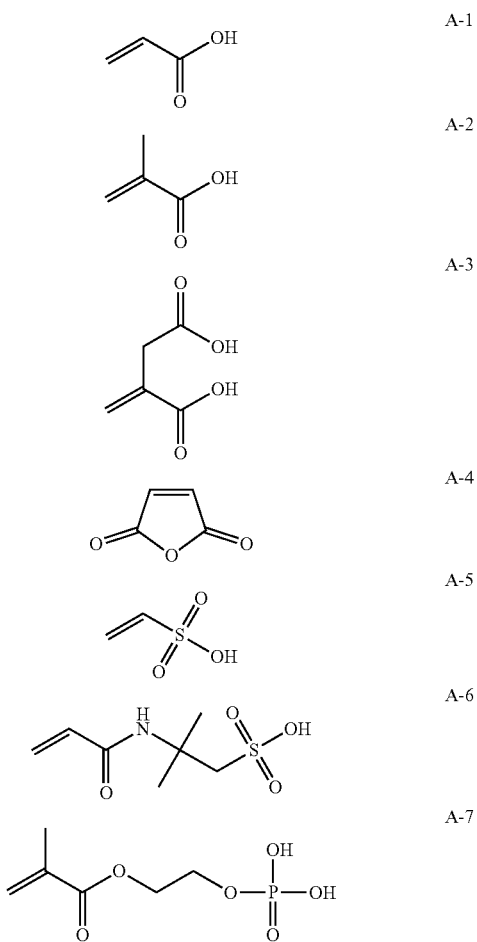

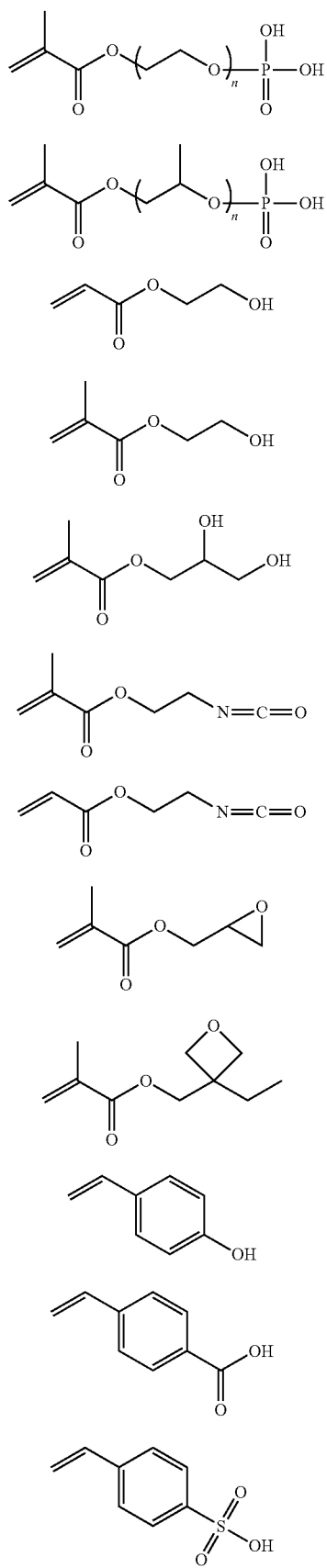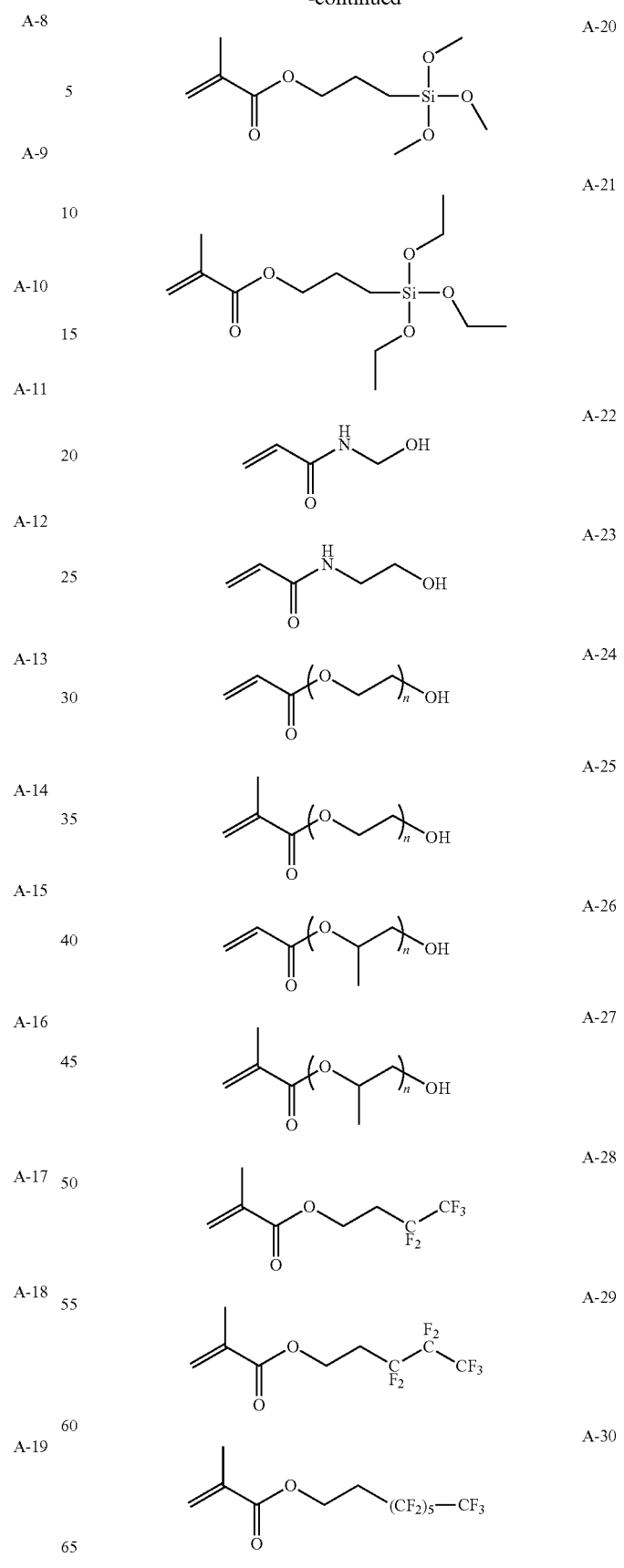

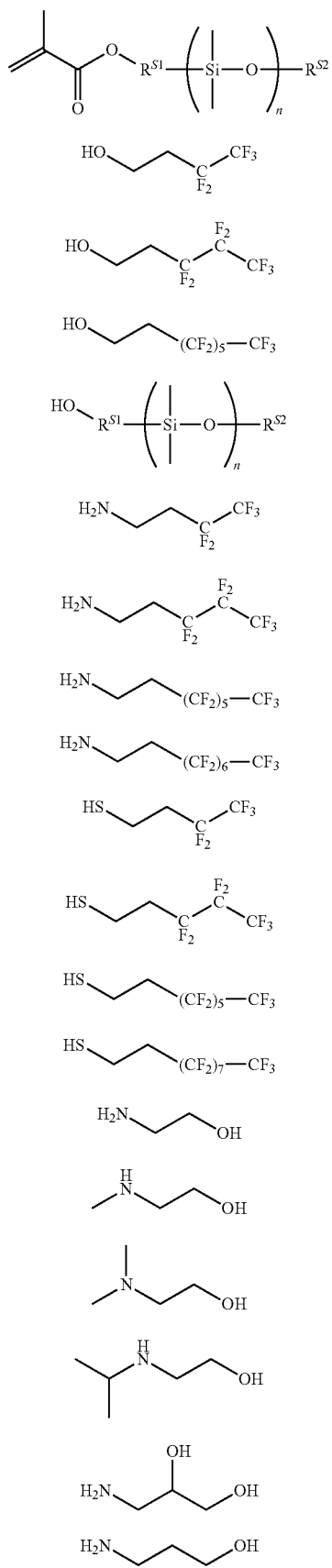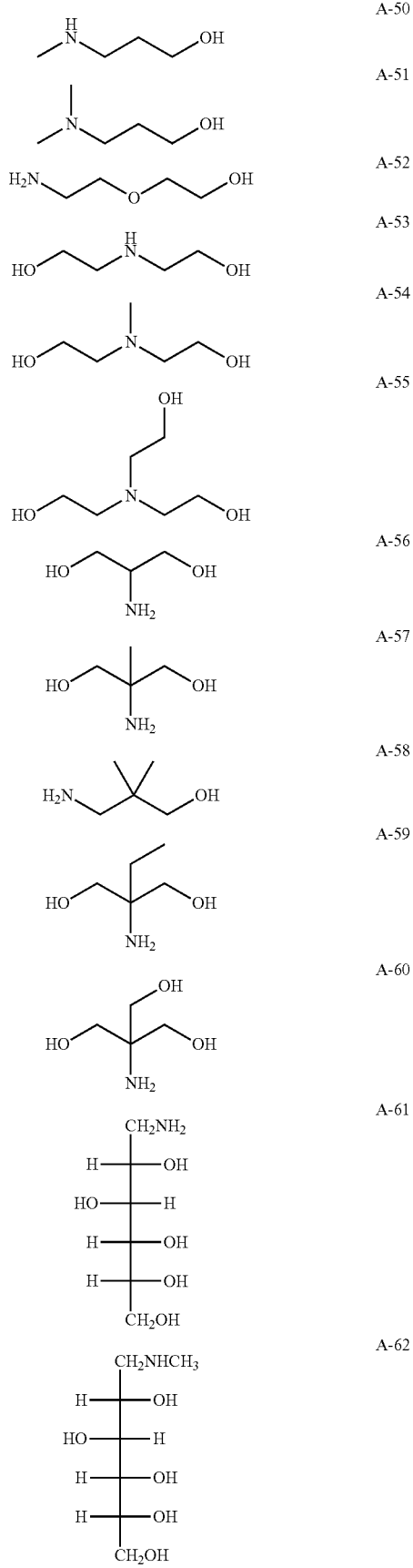

-continued

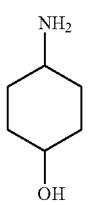
A-63

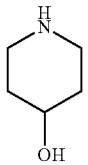
A-64

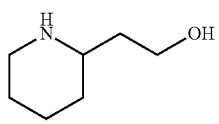
A-65

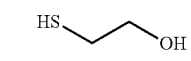
A-66

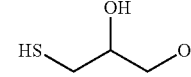
A-67

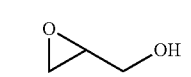
A-68

A-69

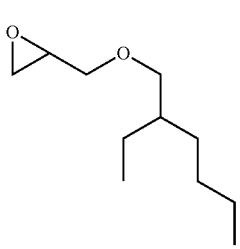
A-70

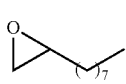
A-71

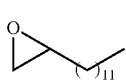
A-72

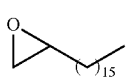
A-73

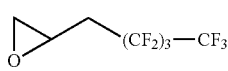
A-74

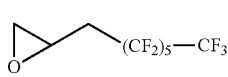
A-75

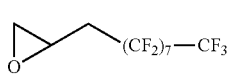
A-76

—Substituent Z—

The examples are an alkyl group (preferably an alkyl group having 1 to 20 carbon atoms, for example, methyl, ethyl, isopropyl, t-butyl, pentyl, heptyl, 1-ethylpentyl, benzyl, 2-ethoxyethyl, and 1-carboxymethyl), an alkenyl group (preferably an alkenyl group having 2 to 20 carbon atoms, such as vinyl, allyl, andoleyl), an alkynyl group (preferably an alkynyl group having 2 to 20 carbon atoms, for example, ethynyl, butadynyl, and phenylethynyl), a cycloalkyl group (preferably a cycloalkyl group having 3 to 20 carbon atoms, such as cyclopropyl, cyclopentyl, cyclohexyl, and 4-methylcyclohexyl; in the present specification, the alkyl group generally has a meaning including a cycloalkyl group therein when being referred to, however, it will be described separately here), an aryl group (preferably an aryl group having 6 to 26 carbon atoms, such as phenyl, 1-naphthyl, 4-methoxyphenyl, 2-chlorophenyl, and 3-methylphenyl), an aralkyl group (preferably an aralkyl group having 7 to 23 carbon atoms, for example, benzyl or phenethyl), and a heterocyclic group (preferably a heterocyclic group having 2 to 20 carbon atoms and more preferably a 5- or 6-membered heterocyclic group having at least one oxygen atom, one sulfur atom, or one nitrogen atom. The heterocyclic group includes an aromatic heterocyclic group and an aliphatic heterocyclic group. Examples thereof include a tetrahydropyran ring group, a tetrahydrofuran ring group, a 2-pyridyl group, a 4-pyridyl group, a 2-imidazolyl group, a 2-benzimidazolyl group, a 2-thiazolyl group, a 2-oxazolyl group, or a pyrrolidone group); an alkoxy group (preferably an alkoxy group having 1 to 20 carbon atoms, for example, a methoxy group, an ethoxy group, an isopropyloxy group, or a benzyloxy group); an aryloxy group (preferably an aryloxy group having 6 to 26 carbon atoms, for example, a phenoxy group, a 1-naphthyloxy group, a 3-methylphenoxy group, or a 4-methoxyphenoxy group; in the present specification, the aryloxy group has a meaning including an aryloyloxy group therein when being referred to); a heterocyclic oxy group (a group in which an —O— group is bonded to the above-described heterocyclic group), an alkoxycarbonyl group (preferably an alkoxycarbonyl group having 2 to 20 carbon atoms, for example, an ethoxycarbonyl group, a 2-ethylhexyloxycarbonyl group, or a dodecyloxycarbonyl group); an aryloxycarbonyl group (preferably an aryloxycarbonyl group having 6 to 26 carbon atoms, for example, a phenoxycarbonyl group, a 1-naphthyloxycarbonyl group, a 3-methylphenoxycarbonyl group, or a 4-methoxyphenoxycarbonyl group); a heterocyclic oxycarbonyl group (a group in which an —O—CO— group is bonded to the above heterocyclic group); an amino group (preferably an amino group having 0 to 20 carbon atoms, an alkylamino group, or an arylamino group, for example, an amino (—NH$_2$) group, an N,N-dimethylamino group, an N,N-diethylamino group, an N-ethylamino group, or an anilino group); a sulfamoyl group (preferably a sulfamoyl group having 0 to 20 carbon atoms, for example, an N,N-dimethylsulfamoyl group or an N-phenylsufamoyl group); an acyl group (an alkylcarbonyl group, an alkenylcarbonyl group, an alkynylcarbonyl group, an arylcarbonyl group, or a heterocyclic carbonyl group, preferably an acyl group having 1 to 20 carbon atoms, for example, an acetyl group, a propionyl group, a butyryl group, an octanoyl group, a hexadecanoyl group, an acryloyl group, a methacryloyl group, a crotonoyl group, a benzoyl group, a naphthoyl group, or a nicotinoyl group); an acyloxy group (an alkylcarbonyloxy group, an alkenylcarbonyloxy group, an alkynylcarbonyloxy group, an arylcarbonyloxy group, or a heterocyclic carbonyloxy group, preferably an acyloxy group having 1 to 20 carbon atoms, for example, an acetyloxy group, a propionyloxy group, a butyryloxy group, an octanoyloxy group, a hexadecanoyloxy group, an acryloyloxy group, a methacryloyloxy group, a crotonoyloxy group, a benzoyloxy group, a naphthoyloxy group, or a nicotinoyloxy group); an aryloyloxy group (preferably an aryloyloxy group having 7 to 23 carbon atoms, for example, a benzoyloxy group); a carbamoyl group (preferably a carbamoyl group having 1 to 20 carbon atoms, for example, an N,N-dimethylcarbamoyl group or an N-phenylcarbamoyl group); an acylamino group (preferably an acylamino group having 1 to 20 carbon atoms, for example, an acetylamino group or a benzoylamino group); an alkylthio group (preferably an alkylthio group having 1 to 20 carbon atoms, for example, a methylthio group, an ethylthio group, an isopropylthio group, or a benzylthio group); an arylthio group (preferably an arylthio group having 6 to 26 carbon atoms, for example, a phenylthio group, a 1-naphthylthio group, a 3-methylphenylthio group, or a 4-methoxyphenylthio group); a heterocyclic thio group (a group in which an —S— group is bonded to the above-described heterocyclic group), an alkylsulfonyl group (preferably an alkylsulfonyl group having 1 to 20 carbon atoms, for example, a methylsulfonyl group or an ethylsulfonyl group), an arylsulfonyl group (preferably an arylsulfonyl group having 6 to 22 carbon atoms, for example, a benzenesulfonyl group), an alkylsilyl group (preferably an alkylsilyl group having 1 to 20 carbon atoms, for example, a monomethylsilyl group, a dimethylsilyl group, a trimethylsilyl group, or a triethylsilyl group); an arylsilyl group (preferably an arylsilyl group having 6 to 42 carbon atoms, for example, a triphenylsilyl group), an alkoxysilyl group (preferably an alkoxysilyl group having 1 to 20 carbon atoms, for example, a monomethoxysilyl group, a dimethoxysilyl group, a trimethoxysilyl group, or a triethoxysilyl group), an aryloxysilyl group (preferably an aryloxy group having 6 to 42 carbon atoms, for example, a triphenyloxysilyl group), a phosphate group (preferably a phosphate group having 0 to 20 carbon atoms, for example, —OP(=O)($R^P$)$_2$), a phosphonyl group (preferably a phosphonyl group having 0 to 20 carbon atoms, for example, —P(=O)($R^P$)$_2$), a phosphinyl group (preferably a phosphinyl group having 0 to 20 carbon atoms, for example, —P($R^P$)$_2$), a phosphonate group (preferably a phosphonate group having 0 to 20 carbon atoms, for example, —PO(O$R^P$)$_2$) a sulfo group (a sulfonate group), a hydroxy group, a sulfanyl group, a carboxy group, a cyano group, and a halogen atom (for example, a fluorine atom, a chlorine atom, a bromine atom, or an iodine atom). $R^P$ represents a hydrogen atom or a substituent (preferably a group selected from the substituent Z).

In addition, each group exemplified in the substituent Z may be further substituted with the substituent Z.

The alkyl group, the alkylene group, the alkenyl group, the alkenylene group, the alkynyl group, the alkynylene group, and/or the like may be cyclic or chained, may be linear or branched.

In a case of synthesizing a fluorine-based copolymer, the polymerization method of the raw material compound (VDF, HFP, and the copolymerizable polymerizable compound) is not particularly limited, and thus a known method may be selected, and conditions may be set appropriately. (Physical Properties or Characteristics of Fluorine-Containing Binder or Fluorine-Based Copolymer that Forms Fluorine-Containing Binder)

The fluorine-containing binder (the fluorine-based copolymer) is not particularly limited; however, the peel strength thereof with respect to the aluminum foil is preferably 0.1 N/mm or more. This makes it is possible to impart strong adhesiveness of the collector to the active material layer, which contributes to further improvement of the cycle characteristics of the all-solid state secondary battery. The peel strength of the fluorine-based copolymer is more preferably 0.2 N/mm or more and still more preferably 0.3 N/mm or more in terms of f further improvement of the adhesiveness of the collector and the cycle characteristics. The upper limit thereof is not particularly limited; however, it is, for example, practically 10 N/mm or less, and it is preferably 2.0 N/mm or less. In the present invention, the peel strength can be appropriately set, for example, by changing the composition of the fluorine-based copolymer or changing the physical properties of the fluorine-containing binder.

A solution (solid content concentration: 10% by mass), in which the fluorine-containing binder has been dissolved in an organic solvent (butyl butyrate), is added dropwise onto an aluminum foil (product name: A1N30, manufactured by Hohsen Corp.) and then dried (temperature: 100° C., time: 180 minutes) to produce a dried film (width: 10 mm, length: 50 mm) having a thickness of 50 µm, and this dried film is used as a test piece to measure the peel strength. As for the measuring method and the measuring conditions, the peeling force is measured by using a tensile tester (ZTS-50N, manufactured by IMADA Co., Ltd.) when the obtained dried film is peeled off at a speed of 30 mm/s and an angle of 90° with respect to the coated surface of the aluminum foil, and the average value thereof is adopted as the peel strength (unit: N/mm).

The water concentration of the fluorine-containing binder (the fluorine-based copolymer) is preferably 100 ppm (mass basis) or less. In addition, as this fluorine-containing binder, the fluorine-based copolymer may be crystallized and dried, or a fluorine-containing binder dispersion liquid may be used as it is.

The fluorine-based copolymer is preferably amorphous. In the present invention, the description that a polymer is "noncrystalline" typically refers to that no endothermic peak due to crystal melting is observed when the measurement is carried out at the glass transition temperature.

In a case where the fluorine-containing binder is particulate, the shape thereof is not particularly limited and may be a flat shape, an amorphous shape, or the like; however, a spherical shape or a granular shape is preferable. The average primary particle diameter thereof is not particularly limited; however, it is preferably 0.1 nm or more, more preferably 1 nm or more, still more preferably 5 nm or more, particularly preferably 10 nm or more, and most preferably 50 nm or more. The upper limit thereof is preferably 5.0 µm or less, more preferably 1 µm or less, still more preferably 700 nm or less, and particularly preferably 500 nm or less.

The particle diameter of the fluorine-containing binder can be measured using the same method as that of the average particle diameter of the inorganic solid electrolyte.

The average particle diameter of the fluorine-containing binder in the constitutional layer of the all-solid state secondary battery is measured, for example, by disassembling the battery to peel off the constitutional layer containing the fluorine-containing binder, subsequently subjecting the constitutional layer to measurement, and excluding the measured value of the particle diameter of particles other than the fluorine-containing binder, which has been measured in advance.

The average particle diameter of the fluorine-containing binder can be adjusted, for example, with the kind of the organic dispersion medium and the content of the constitutional component in the polymer.

The tensile fracture strain of the fluorine-based copolymer that forms the fluorine-containing binder is 500% or more.

In a case where the specific fluorine-based copolymer exhibits a tensile fracture strain of 500% or more, in the inorganic solid electrolyte-containing composition, as described above, it is possible to effectively exhibit the maintenance of the interaction between the solid particles and the action of the repulsive force between fluorine atoms on the solid particles and thus it is possible to enhance dispersion stability or handleability. In addition, it is possible to strengthen the adhesiveness of the solid particles, and it is possible to further enhance the cycle characteristics. In the present invention, the tensile fracture strain is more preferably 600% or more, still more preferably 700% or more, particularly preferably 750% or more, and most preferably 2,500% or more. The upper limit of the tensile fracture strain is not particularly limited. However, it is practically 10,000%, and it is preferably 6,000% or less and more preferably 3,500% or less.

In the present invention, the tensile fracture strain can be appropriately set, for example, by changing the molecular weight of the fluorine-based copolymer.

The tensile fracture strain is measured by producing a test piece described in Japanese Industrial Standards (JIS) K 7161 (2014) "Plastics—Determination of tensile properties" and according to the method and conditions described in these standards. Specifically, a cast film having a thickness of about 200 µm is prepared by using a solution obtained by dissolving the fluorine-based copolymer in DIBK or the like. This cast film is cut to a size of 10 mm×20 mm, set in a tensile tester so that the distance between chucks (distance between grippers) is 10 mm, and the tensile test (the evaluation of the stress-strain curve) is carried out at a test speed of 30 mm/min, whereby the tensile fracture strain can be determined. The tensile fracture strain is a value (the amount extended at the time of breaking) obtained by subtracting 100% from the length of the test piece at the time of breaking, in a case where the length of the test piece before stretching is set to 100%.

The mass average molecular weight of the fluorine-based copolymer is not particularly limited; however, it is preferably 50,000 to 1,500,000. In a case where the fluorine-based copolymer has a mass average molecular weight in the above range, dispersion stability and handleability can be further improved, and furthermore, tensile fracture strain can also be increased. A larger mass average molecular weight is preferable in that dispersion stability and handleability are improved due to the fact that the main chain of the copolymer extends and thus tensile fracture strain increases, and for example, the mass average molecular weight is more preferably 70,000, still more preferably 80,000 or more, and particularly preferably 100,000. In a case where the mass average molecular weight of the fluorine-based copolymer is 400,000 or more, the cycle characteristics of the all-solid state secondary battery can be further improved. This is presumed to be because in a case where the copolymer has a high molecular weight, the steric repulsion effect increases, and thus it is possible to enhance the dispersion stability of the inorganic solid electrolyte-containing composition (the slurry) as well as the dispersion uniformity of the solid particles in the constitutional layer. The upper limit thereof is preferably 1,500,000 or less and more preferably 1,200,000 or less. In one aspect of the present invention, the mass average molecular weight of the fluorine-based copolymer can be set to 1,000,000 or less or also can be set to 900,000 or less.

—Measurement of Molecular Weight—

In the present invention, unless specified otherwise, the molecular weight of the polymeric chain refers to a mass average molecular weight or a number average molecular weight in terms of standard polystyrene equivalent, determined by gel permeation chromatography (GPC). Regarding the measurement method thereof, basically, a value measured using a method under Conditions 1 or Conditions 2 (preferable) described below is employed. However, depending on the kind of polymer a suitable eluent may be appropriately selected and used.

(Conditions 1)
- Column: Connect two TOSOH TSKgel Super AWM-H (product name, manufactured by Tosoh Co., Ltd.)
- Carrier: 10 mM LiBr/N-methylpyrrolidone
- Measurement temperature: 40° C.
- Carrier flow rate: 1.0 ml/min
- Sample concentration: 0.1% by mass
- Detector: refractive indicator (RI) detector (Conditions 2)
- Column: A column obtained by connecting TOSOH TSKgel Super HZM-H, TOSOH TSKgel Super HZ4000, and TOSOH TSKgel Super HZ2000 (all of which are product names, manufactured by Tosoh Corporation)
- Carrier: tetrahydrofuran
- Measurement temperature: 40° C.
- Carrier flow rate: 1.0 ml/min
- Sample concentration: 0.1% by mass
- Detector: refractive indicator (RI) detector In terms of the dispersion stability of the solid particles, for example, the fluorine-based copolymer preferably has an SP value of 9 to 23, more preferably an SP value of 10 to 18, and still more preferably an SP value of 11 to 15. The difference (in terms of absolute value) in SP value between the fluorine-based copolymer and the dispersion medium will be described later.

In the present invention, the SP value is determined according to the Hoy method unless otherwise specified (see H. L. Hoy JOURNAL OF PAINT TECHNOLOGY, Vol. 42, No. 541, 1970, 76-118, and POLYMER HANDBOOK $4^{th}$, Chapter 59, VII, page 686, Table 5, Table 6, and the following formula in Table 6). In addition, the SP value is shown with the unit being omitted; however, the unit thereof is $MPa^{1/2}$.

$$\delta_t = \frac{F_t + \frac{B}{n}}{V} : B = 277$$

In the expression, $\delta_t$ indicates an SP value. Ft is a molar attraction function $(J \times cm^3)^{1/2}/mol$ and represented by the following expression. V is a molar volume $(cm^3/mol)$ and represented by the following expression. $\bar{n}$ is represented by the following expression.

$$F_t = \sum n_i F_{t,i}$$
$$V = \sum n_i V_i$$
$$\bar{n} = \frac{0.5}{\Delta_T^{(P)}}$$
$$\Delta_T^{(P)} = \sum n_i \Delta_{T,i}^{(P)}$$

In the above formula, $F_{t,i}$ indicates a molar attraction function of each constitutional unit, $V_i$ indicates a molar volume of each constitutional unit, $\Delta^{(P)}_{T,i}$ indicates a correction value of each constitutional unit, and $n_i$ indicates the number of each constitutional unit.

The SP value of the polymer is calculated according to the following expression using the constitutional component (derived from the raw material compound) and the SP value thereof. It is noted that the SP value of the constitutional component obtained according to the above document is converted into an SP value ($MPa^{1/2}$) (for example, 1 $cal^{1/2}$ $cm^{-3/2} \approx 2.05$ $J^{1/2}$ $cm^{-3/2} \approx 2.05$ $MPa^{1/2}$) and used.

$$SP_p{}^2 = (SP_1{}^3 \times W_1) + (SP_2{}^2 \times W_2) + \ldots$$

In the expression, $SP_1$, $SP_2$ . . . indicates the SP values of the constitutional components, and $W_1$, $W_2$ . . . indicates the mass fractions of the constitutional components. The SP value of the VDF constitutional component is 13.1 and the SP value of the HFP constitutional component is 10.1.

In the present invention, the mass fraction of a constitutional component shall be a mass fraction of the constitutional component (the raw material compound from which this constitutional component is derived) in the polymer.

The SP value of the fluorine-containing copolymer can be adjusted by the composition (the kind and the content of the constitutional component) of the fluorine-based copolymer.

The fluorine-based copolymer preferably satisfies the above-described physical properties and the like; however, the following polymers (two aspects) are more preferable in terms of dispersion stability and handleability, as well as binding property, adhesiveness of collector, and suppression of resistance.

A fluorine-based copolymer having an HFP amount of 30% to 40% by mole and a tensile fracture strain of 2,500% to 3500%, into which a small amount (the above content) of an anhydrous carboxylic acid group (preferably, an anhydrous maleic acid group) is introduced as a functional group, where the adsorption rate of the fluorine-containing binder with respect to an inorganic solid electrolyte is more than 0% and less than 5%.

A fluorine-based copolymer having a mass average molecular weight of 400,000 or more and having an HFP amount of 21% to 40% by mole and a tensile fracture strain of 500% or more, into which preferably a small amount (the above content) of a functional group (a) is introduced, where the adsorption rate of the fluorine-containing binder with respect to an inorganic solid electrolyte is more than 0% and less than 10%.

The fluorine-based copolymer that forms the fluorine-containing binder may be a non-crosslinked polymer or a crosslinked polymer. Further, in a case where the crosslinking of the polymer proceeds by heating or application of a voltage, the molecular weight may be larger than the above molecular weight. Preferably, the polymer has a mass average molecular weight in the above-described range at the start of use of the all-solid state secondary battery.

The inorganic solid electrolyte-containing composition according to the embodiment of the present invention may contain one kind of fluorine-containing binder or a plurality of kinds thereof.

The content of the fluorine-containing binder in the inorganic solid electrolyte-containing composition is not particularly limited. However, it is preferably 0.1% to 10.0% by mass, more preferably 0.2% to 5.0% by mass, and still more preferably 0.3% to 4.0% by mass, in the solid content of 100% by mass, in that dispersion stability and handleability are improved and furthermore, the binding property is exhibited.

In a case where the inorganic solid electrolyte-containing composition contains a particulate binder described later, the content (the solid content) of the fluorine-containing binder may be lower than the content (the solid content) of the particulate binder; however, it is preferable to be equal to or higher than the content of the particulate binder. This makes it is possible to further enhance the binding property without impairing the excellent dispersion stability and handleability. The difference (in terms of absolute value) in content between the fluorine-containing binder and the particulate binder is not particularly limited, and it can be, for example, 0% to 8% by mass, more preferably 0% to 4% by mass, and still more preferably 0% to 2% by mass. In addition, the ratio of the content of the fluorine-containing binder to the content of the particulate binder (the content of the fluorine-containing binder/the content of the particulate binder) is not particularly limited; however, it is, for example, preferably 0.01 to 10 and more preferably 0.02 to 5.

In a case where the inorganic solid electrolyte-containing composition contains a chain polymerization polymer consisting of a chain polymerization polymer (the above-described fluorine-based copolymer is excluded) is contained, the content (the solid content) of the fluorine-containing binder may be lower than the content (the solid content) of the binder consisting of a chain polymerization polymer: however, it is preferably equal to or higher than the content thereof. This makes it possible to further enhance dispersion stability and cycle characteristics. The difference (in terms of absolute value) in content between the fluorine-containing binder and the polymer binder consisting of a chain polymerization polymer is not particularly limited, and it can be, for example, 0% to 8% by mass, more preferably 0% to 4% by mass, and still more preferably 0% to 2% by mass. In addition, the ratio of the content of the fluorine-containing binder to the content of the chain polymerization polymer binder (the content of the fluorine-containing binder/the content of the chain polymerization polymer binder) is not particularly limited; however, it is, for example, preferably 0.01 to 10 and more preferably 0.02 to 5.0.

In the present invention, the mass ratio [(the mass of the inorganic solid electrolyte+the mass of the active material)/ (the total mass of the binder)] of the total mass (the total amount) of the inorganic solid electrolyte and the active material to the total mass of the polymer binder in the solid content of 100% by mass is preferably in a range of 1,000 to 1. This ratio is more preferably 500 to 2 and still more preferably 100 to 10.

(Particulate Binder)

In addition to the above-described fluorine-containing binder, the inorganic solid electrolyte-containing composition according to the embodiment of the present invention preferably contains, as the polymer binder, one or more kinds of particulate polymer binders (particulate binders) that are insoluble in the dispersion medium in the composition. The shape of this particulate binder is not particularly limited and may be a flat shape, an amorphous shape, or the like; however, a spherical shape or a granular shape is preferable. The average particle diameter of the particulate binder is preferably 1 to 1,000 nm, more preferably 10 to 800 nm, still more preferably 20 to 500 nm, and particularly preferably 40 to 300 nm. The particle diameter can be measured using the same method as that of the average particle diameter of the inorganic solid electrolyte.

The particulate binder is preferably a particulate binder of which the adsorption rate is 60% or more with respect to the inorganic solid electrolyte. The adsorption rate with respect to the active material is appropriately determined. Each adsorption rate can be measured in the same manner as that of the fluorine-containing binder.

In a case where the inorganic solid electrolyte-containing composition contains a particulate binder, the binding property of the solid particles can be enhanced while an increase in interfacial resistance is suppressed, without impairing the effect of improving dispersion stability and handleability due to the fluorine-containing binder. This makes it is possible to further increase the cycle characteristics of the all-solid state secondary battery, and preferably it is possible to realize further reduction of resistance.

As the particulate binder, various particulate binders that are used in the manufacturing of an all-solid state secondary battery can be used without particular limitation. Examples thereof include a particulate binder consisting of the sequential polymerization polymer or the chain polymerization polymer, which are described later, and specific examples thereof include polymers A-1 and A-2, which are synthesized in Examples. In addition, other examples thereof include the binders disclosed in JP2015-088486A and WO2018/020827A.

The sequential polymerization polymer is not particularly limited; however, examples thereof include polyurethane, polyurea, polyamide, polyimide, polyester, and polycarbonate. The chain polymerization polymer is not particularly limited; however, examples thereof include chain polymerization polymers (examples thereof include those exemplified later) such as a fluorine-based polymer (a fluorine-based copolymer), a hydrocarbon-based polymer, a vinyl polymer, and a (meth)acrylic polymer.

The content of the particulate binder in the inorganic solid electrolyte-containing composition is not particularly limited. However, it is preferably 0.02% to 5.0% by mass, more preferably 0.05% to 3.0% by mass, and still more preferably 0.1% to 2.0% by mass, in the solid content of 100% by mass, in that dispersion stability and handleability are improved and furthermore, the binding property is exhibited. It is noted that the content of the particulate binder is appropriately set within the above range; however, it is preferably a content at which the particulate binder is not dissolved in the inorganic solid electrolyte-containing composition in consideration of the solubility of the particulate binder.

(Polymer Binder Consisting of Chain Polymerization Type Polymer)

The inorganic solid electrolyte-containing composition according to the embodiment of the present invention preferably contains, as the polymer binder, one or more kinds of polymer binders consisting of a chain polymerization type polymer in addition to the fluorine-containing binder described above. In a case where the inorganic solid electrolyte-containing composition contains a fluorine-containing binder, dispersion stability can be further improved without impairing handleability, and thus the cycle characteristics can be further improved.

The polymer binder (may be referred to as a chain polymerization type polymer) consisting of this chain polymerization type polymer binder may be insoluble in the dispersion medium in the composition; however, it is preferably a soluble type binder. In addition, the adsorption rate of the chain polymerization type polymer binder with respect to the inorganic solid electrolyte is preferably less than 60%, and the preferable range thereof is the same as that of the fluorine-containing binder. The adsorption rate with respect to the active material is appropriately determined. Each adsorption rate can be measured by the above method.

The chain polymerization type polymer that forms the chain polymerization type polymer binder is not particularly limited as long as it is a chain polymerization type polymer other than the fluorine-based copolymer that forms the fluorine binder; however, preferred examples thereof include a hydrocarbon-based polymer, a vinyl polymer, and a (meth)acrylic polymer. The polymerization mode of these chain polymerization-based polymers is not particularly limited, and the chain polymerization type polymer may be any one of a block copolymer, an alternating copolymer, or a random copolymer.

The chain polymerization type polymer may contain a constitutional component having a functional group selected from the above-described Group (a) of functional groups as, for example, a substituent (a constitutional component having a functional group). The constitutional component having a functional group has a function of improving the adsorption rate of the chain polymerization type polymer binder with respect to the inorganic solid electrolyte and may be any constitutional component that forms the chain polymerization type polymer. The functional group may be incorporated into the main chain or the side chain of the chain polymerization type polymer. In a case of being incorporated into the side chain, it has a linking group that bonds a functional group to the main chain. The linking group is not particularly limited; however, examples thereof include the above-described linking group that links a carbon-carbon unsaturated bond and the above functional group. The functional group contained in one constitutional component may be one kind or two or more kinds, and in a case where two or more kinds are contained, they may be or may not be bonded to each other.

The constitutional component having an ester bond (excluding an ester bond that forms a carboxy group) or an amide bond as a functional group means a constitutional component in which an ester bond or an amide bond is not directly bonded to an atom that constitutes the main chain, and it does not include, for example, a constitutional component derived from a (meth)acrylic acid alkyl ester.

The content of the constitutional component having the above functional group, in the polymer, is not particularly limited; however, it is preferably 0.01% to 70% by more, preferably 5% to 50% by mole, and still more preferably 20% to 50% by mole, in terms of the binding property of the solid particles.

Examples of the method of introducing a functional group include a method in which a compound from which a constitutional component is derived is reacted with a compound containing a functional group (a) to be copolymerized, at the time of polymerizing a chain polymerization type polymer. In addition, other examples thereof include a method of introducing a functional group into a polymer terminal by carrying out polymerization with an initiator or chain transfer agent containing a functional group as well as a method of introducing a functional group into a side chain or a terminal by a polymeric reaction. A commercially available chain polymerization type polymer having a functional group can also be used.

—Hydrocarbon-Based Polymer Binder Consisting of Hydrocarbon-Based Polymer—

Examples of the hydrocarbon-based polymer that forms the hydrocarbon-based polymer binder include polyethylene, polypropylene, natural rubber, polybutadiene, polyisoprene, polystyrene, a polystyrene butadiene copolymer, a styrene-based thermoplastic elastomer, polybutylene, an acrylonitrile butadiene copolymer, and hydrogen-added (hydrogenated) polymers thereof. The styrene-based thermoplastic elastomer or the hydride thereof is not particularly limited. However, examples thereof include a styrene-ethylene-butylene-styrene block copolymer (SEBS), a styrene-isoprene-styrene block copolymer (SIS), a hydrogenated SIS, a styrene-butadiene-styrene block copolymer (SBS), a hydrogenated SBS, a styrene-ethylene-ethylene-propylene-styrene block copolymer (SEEPS), a styrene-ethylene-propylene-styrene block copolymer (SEPS), a styrene-butadiene rubber (SBR), a hydrogenated a styrene-butadiene rubber (HSBR), and further more, a random copolymer corresponding to each of the above-described block copolymers such as SEBS. In the present invention, the hydrocarbon-based polymer preferably has no unsaturated group (for example, a 1,2-butadiene constitutional component) that is bonded to the main chain from the viewpoint that the formation of chemical crosslink can be suppressed.

Commercially available products can be used as the hydrocarbon-based polymer having the above functional groups. Examples thereof include Tuftec M1911, Tuftec M1913 (product name, manufactured by Asahi Kasei Corporation), SUMIFITT series (manufactured by Sumika Chemtex Co., Ltd.), DYNARON 4630P, DYNARON 8630P (product name, manufactured by JSR Corporation), and Nipol LX series (ZEON CORPORATION).

—Vinyl Polymer Binder Consisting of Vinyl Polymer—

Examples of the vinyl polymer binder that forms the vinyl polymer binder include a polymer containing a vinyl monomer other than the (meth)acrylic compound (M1), where the content of the vinyl polymer binder is, for example, 50% by mole or more. Examples of the vinyl monomer include vinyl compounds described later. Specific examples of the vinyl polymer include polyvinyl alcohol, polyvinyl acetal, polyvinyl acetate, and a copolymer containing these.

In addition to the constitutional component derived from the vinyl monomer, this vinyl polymer preferably has a constitutional component derived from the (meth)acrylic compound (M1) that forms a (meth)acrylic polymer described later. The content of the constitutional component derived from the vinyl monomer is preferably the same as the content of the constitutional component derived from the (meth)acrylic compound (M1) in the (meth)acrylic polymer. The content of the constitutional component derived from the (meth)acrylic compound (M1) in the polymer is not particularly limited as long as it is less than 50% by mass; however, it is preferably 0% to 30% by mass.

—(Meth)Acrylic Polymer Binder Consisting of (Meth)Acrylic Polymer—

The (meth)acrylic polymer binder is preferably a polymer obtained by (co)polymerizing at least one (meth)acrylic compound (M1) selected from a (meth)acrylic acid compound, a (meth)acrylic acid ester compound, a (meth)acrylamide compound, or a (meth)acrylonitrile compound. Further, a (meth)acrylic polymer consisting of a copolymer of the (meth)acrylic compound (M1) and another polymerizable compound (M2) is also preferable. Examples of the (meth)acrylic acid ester compound (M1) include a (meth)acrylic acid alkyl ester compound, and the carbon number of thereof is not particularly limited; however, it can be set to, for example, 1 to 24, and it is preferably 3 to 20, more preferably 4 to 16, and still more preferably 6 to 14.

The other polymerizable compound (M2) is not particularly limited, and examples thereof include vinyl compounds such as a styrene compound, a vinyl naphthalene compound, a vinyl carbazole compound, an allyl compound, a vinyl ether compound, a vinyl ester compound, a dialkyl itaconate compound, and an unsaturated carboxylic acid anhydride.

Examples of the vinyl compound include the "vinyl monomer" disclosed in JP2015-88486A.

The content of the other polymerizable compound (M2) in the (meth)acrylic polymer is not particularly limited; however, it can be, for example, less than 50% by mole.

The content of the chain polymerization type polymer binder in the inorganic solid electrolyte-containing composition is not particularly limited. However, it is preferably 0.02% to 5.0% by mass, more preferably 0.05% to 3.0% by mass, and still more preferably 0.1% to 2.0% by mass, in the solid content of 100% by mass, in that dispersion stability, handleability, and the adhesiveness of the collector can be improved in a well-balanced manner.

(Combination of Polymer Binder)

As described above, it suffices that the polymer binder contained in the inorganic solid electrolyte-containing composition according to the embodiment of the present invention contains at least one kind of fluorine-containing binder, and the polymer binder may contain two or more kinds thereof.

Examples of the aspect in which the polymer binder contains the fluorine-containing binder include an aspect in which the fluorine-containing binder is contained alone, an aspect in which two or more kinds of fluorine-containing binders are contained, an aspect in which one or more kinds of fluorine-containing binders and a particulate binder are contained, as well as an aspect in which a chain polymerization type polymer is further contained in each of the aspects.

In the present invention, it suffices that the chain polymerization type polymer binder contained in the polymer binder is at least one selected from the group consisting of a hydrocarbon-based polymer binder, a vinyl polymer binder, and a (meth)acrylic polymer binder.

The inorganic solid electrolyte-containing composition according to the embodiment of the present invention may contain a binder other than the above-described polymer binder and the particulate binder.

<Dispersion Medium>

The inorganic solid electrolyte-containing composition according to the embodiment of the present invention preferably contains a dispersion medium for dispersing each of the above components.

It suffices that the dispersion medium is an organic compound that is in a liquid state in the use environment, examples thereof include various organic solvents, and specific examples thereof include an alcohol compound, an ether compound, an amide compound, an amine compound, a ketone compound, an aromatic compound, an aliphatic compound, a nitrile compound, and an ester compound.

The dispersion medium may be a non-polar dispersion medium (a hydrophobic dispersion medium) or a polar dispersion medium (a hydrophilic dispersion medium); however, a non-polar dispersion medium is preferable from the viewpoint that excellent dispersibility can be exhibited. The non-polar dispersion medium generally refers to a dispersion medium having a property of a low affinity to water; however, in the present invention, examples thereof include an ester compound, a ketone compound, an ether compound, an aromatic compound, and an aliphatic compound.

Examples of the alcohol compound include methyl alcohol, ethyl alcohol, 1-propyl alcohol, 2-propyl alcohol, 2-butanol, ethylene glycol, propylene glycol, glycerin, 1,6-hexanediol, cyclohexanediol, sorbitol, xylitol, 2-methyl-2,4-pentanediol, 1,3-butanediol, and 1,4-butanediol.

Examples of the ether compound include an alkylene glycol (diethylene glycol, triethylene glycol, polyethylene glycol, dipropylene glycol, or the like), an alkylene glycol monoalkyl ether (ethylene glycol monomethyl ether, ethylene glycol monobutyl ether, propylene glycol monomethyl ether, diethylene glycol monomethyl ether, dipropylene glycol monomethyl ether, tripropylene glycol monomethyl ether, diethylene glycol monobutyl ether, or the like), alkylene glycol dialkyl ether (ethylene glycol dimethyl ether glycol or the like), a dialkyl ether (dimethyl ether, diethyl ether, diisopropyl ether, dibutyl ether, or the like), and a cyclic ether (tetrahydrofuran, dioxane (including 1,2-, 1,3- or 1,4-isomer), or the like).

Examples of the amide compound include N,N-dimethylformamide, N-methyl-2-pyrrolidone, 2-pyrrolidinone, 1,3-dimethyl-2-imidazolidinone, ε-caprolactam, formamide, N-methylformamide, acetamide, N-methylacetamide, N,N-dimethylacetamide, N-methylpropanamide, and hexamethylphosphoric amide.

Examples of the amine compound include triethylamine, diisopropylethylamine, and tributyl amine.

Examples of the ketone compound include acetone, methyl ethyl ketone, methyl isobutyl ketone (MIBK), cyclopentanone, cyclohexanone, cycloheptanone, dipropyl ketone, dibutyl ketone, diisopropyl ketone, diisobutyl ketone (DIBK), isobutyl propyl ketone, sec-butyl propyl ketone, pentyl propyl ketone, and butyl propyl ketone.

Examples of the aromatic compound include benzene, toluene, and xylene.

Examples of the aliphatic compound include hexane, heptane, octane, decane, cyclohexane, methylcyclohexane, ethylcyclohexane, cyclooctane, decalin, paraffin, gasoline, naphtha, kerosene, and light oil.

Examples of the nitrile compound include acetonitrile, propionitrile, and isobutyronitrile.

Examples of the ester compound include ethyl acetate, butyl acetate, propyl acetate, propyl butyrate, isopropyl butyrate, butyl butyrate, isobutyl butyrate, butyl pentanoate, ethyl isobutyrate, propyl isobutyrate, isopropyl isobutyrate, isobutyl isobutyrate, propyl pivalate, isopropyl pivalate, butyl pivalate, and isobutyl pivalate.

In the present invention, among them, an ether compound, a ketone compound, an aromatic compound, an aliphatic compound, or an ester compound is preferable, and an ester compound, a ketone compound, or an ether compound is more preferable.

The number of carbon atoms of the compound that constitutes the dispersion medium is not particularly limited, and it is preferably 2 to 30, more preferably 4 to 20, still more preferably 6 to 15, and particularly preferably 7 to 12.

In terms of the dispersion stability of the solid particles, the dispersion medium preferably has an SP value ($MPa^{1/2}$) of 9 to 21, more preferably 10 to 20, and still preferably 11 to 19. The difference (in terms of absolute value) in SP value between the dispersion medium and the fluorine-based copolymer is not particularly limited; however, it is preferably 8 or less, more preferably 3 to 7.5, and still more preferably 0 to 7.5, in that the molecular chain of the fluorine-based copolymer is extended in the dispersion medium to improve the dispersibility thereof, whereby the dispersion stability of the solid particles can be further improved.

The SP value of the dispersion medium is defined as a value obtained by converting the SP value calculated according to the Hoy method described above into the unit of $MPa^{1/2}$. In a case where the inorganic solid electrolyte-containing composition contains two or more kinds of dispersion media, the SP value of the dispersion medium means the SP value of the entire dispersion media, and it is the sum of the products of the SP values and the mass fractions of the respective dispersion media. Specifically, the calculation is carried out in the same manner as the above-described method of calculating the SP value of the polymer, except that the SP value of each of the dispersion media is used instead of the SP value of the constitutional component.

The dispersion media having an SP value ($MPa^{1/2}$) of 9 to 21 are shown below together with the SP value (the unit is omitted).

MIBK (18.4), diisopropyl ether (16.8), dibutyl ether (17.9), diisopropyl ketone (17.9), DIBK (17.9), butyl butyrate (18.6), butyl acetate (18.9), toluene (18.5), ethylcyclohexane (17.1), cyclooctane (18.8)

The dispersion medium preferably has a boiling point of 50° C. or higher, and more preferably 70° C. or higher at normal pressure (1 atm). The upper limit thereof is preferably 250° C. or lower and more preferably 220° C. or lower.

It suffices that the inorganic solid electrolyte-containing composition according to the embodiment of the present invention contains at least one kind of dispersion medium, and it may contain two or more kinds thereof.

In the present invention, the content of the dispersion medium in the inorganic solid electrolyte-containing composition is not particularly limited and can be appropriately set. For example, in the inorganic solid electrolyte-containing composition, it is preferably 20% to 80% by mass, more preferably 30% to 70% by mass, and particularly preferably 40% to 60% by mass.

<Active Material>

The inorganic solid electrolyte-containing composition according to the embodiment of the present invention can also contain an active material capable of intercalating and deintercalating an ion of a metal belonging to Group 1 or Group 2 of the periodic table. Examples of such active materials include a positive electrode active material and a negative electrode active material, which will be described later.

In the present invention, the inorganic solid electrolyte-containing composition containing an active material (a positive electrode active material or a negative electrode active material) may be referred to as a composition for an electrode (a composition for a positive electrode or a composition for a negative electrode).

(Positive Electrode Active Material)

The positive electrode active material is an active material capable of intercalating and deintercalating an ion of a metal belonging to Group 1 or Group 2 of the periodic table, and it is preferably one capable of reversibly intercalating and deintercalating a lithium ion. The above-described material is not particularly limited as long as the material has the above-described characteristics and may be a transition metal oxide, an organic substance, or an element, which is capable of being complexed with Li, such as sulfur or the like by disassembling the battery.

Among the above, as the positive electrode active material, transition metal oxides are preferably used, and transition metal oxides having a transition metal element $M^a$ (one or more elements selected from Co, Ni, Fe, Mn, Cu, and V) are more preferable. In addition, an element $M^b$ (an element of Group 1 (Ia) of the metal periodic table other than lithium, an element of Group 2 (IIa), or an element such as Al, Ga, In, Ge, Sn, Pb, Sb, Bi, Si, P, or B) may be mixed into this transition metal oxide. The amount of the element mixed is preferably 0% to 30% by mole of the amount (100% by mole) of the transition metal element $M^a$. It is more preferable that the transition metal oxide is synthesized by mixing the above components such that a molar ratio Li/M$^a$ is 0.3 to 2.2.

Specific examples of the transition metal oxides include transition metal oxides having a bedded salt-type structure (MA), transition metal oxides having a spinel-type structure (MB), lithium-containing transition metal phosphoric acid compounds (MC), lithium-containing transition metal halogenated phosphoric acid compounds (MD), and lithium-containing transition metal silicate compounds (ME).

Specific examples of the transition metal oxides having a bedded salt-type structure (MA) include $LiCoO_2$ (lithium cobalt oxide [LCO]), $LiNi_2O_2$ (lithium nickelate), $LiNi_{0.85}Co_{0.10}Al_{0.05}O_2$ (lithium nickel cobalt aluminum oxide [NCA]), $LiNi_{1/3}Co_{1/3}Mn_{1/3}O_2$ (lithium nickel manganese cobalt oxide [NMC]), and $LiNi_{0.5}Mn_{0.5}O_2$ (lithium manganese nickelate).

Specific examples of the transition metal oxides having a spinel-type structure (MB) include $LiMn_2O_4$ (LMO), $LiCoMnO_4$, $Li_2FeMn_3O_8$, $Li_2CuMn_3O_8$, $Li_2CrMn_3O_8$, and $Li_2NiMn_3O_8$.

Examples of the lithium-containing transition metal phosphoric acid compound (MC) include olivine-type iron phosphate salts such as $LiFePO_4$ and $Li_3Fe_2(PO_4)_3$, iron pyrophosphates such as $LiFeP_2O_7$, and cobalt phosphates such as $LiCoPO_4$, and a monoclinic NASICON type vanadium phosphate salt such as $Li_3V_2(PO_4)_3$ (lithium vanadium phosphate).

Examples of the lithium-containing transition metal halogenated phosphoric acid compound (MD) include iron fluorophosphates such as $Li_2FePO_4F$, manganese fluorophosphates such as $Li_2MnPO_4F$, cobalt fluorophosphates such as $Li_2CoPO_4F$.

Examples of the lithium-containing transition metal silicate compounds (ME) include $Li_2FeSiO_4$, $Li_2MnSiO_4$, and $Li_2CoSiO_4$.

In the present invention, the transition metal oxide having a bedded salt-type structure (MA) is preferable, and LCO or NMC is more preferable.

The shape of the positive electrode active material is not particularly limited but is preferably a particulate shape. The particle diameter (the volume average particle diameter) of the positive electrode active material particles is not particularly limited. For example, it can be set to 0.1 to 50 μm. The particle diameter of the positive electrode active material particle can be measured using the same method as that of the particle diameter of the inorganic solid electrolyte. In order to allow the positive electrode active material to have a predetermined particle diameter, an ordinary pulverizer or classifier is used. For example, a mortar, a ball mill, a sand mill, a vibration ball mill, a satellite ball mill, a planetary ball mill, a swirling air flow jet mill, or a sieve is preferably used. During crushing, it is also possible to carry out wet-type crushing in which water or a dispersion medium such as methanol is made to be present together. In order to provide the desired particle diameter, classification is preferably carried out. The classification is not particularly limited and can be carried out using a sieve, a wind power classifier, or the like. Both the dry-type classification and the wet-type classification can be carried out.

A positive electrode active material obtained using a baking method may be used after being washed with water, an acidic aqueous solution, an alkaline aqueous solution, or an organic solvent.

The positive electrode active material may be used singly, or two or more thereof may be used in combination.

In a case of forming a positive electrode active material layer, the mass (mg) (mass per unit area) of the positive electrode active material per unit area ($cm^2$) of the positive electrode active material layer is not particularly limited. It can be appropriately determined according to the designed battery capacity and can be set to, for example, 1 to 100 mg/$cm^2$.

The content of the positive electrode active material in the inorganic solid electrolyte-containing composition is not particularly limited; however, it is preferably 10% to 97% by mass, more preferably 30% to 95% by mass, still more preferably 40% to 93% mass, and particularly preferably 50% to 90% by mass, in the solid content of 100% by mass.

(Negative Electrode Active Material)

The negative electrode active material is an active material capable of intercalating and deintercalating an ion of a metal belonging to Group 1 or Group 2 of the periodic table, and it is preferably one capable of reversibly intercalating and deintercalating a lithium ion. The material is not particularly limited as long as it has the above-described properties, and examples thereof include a carbonaceous material, a metal oxide, a metal composite oxide, lithium, a lithium alloy, and a negative electrode active material that is capable of an alloy (capable of being alloyed) with lithium. Among the above, a carbonaceous material, a metal composite oxide, or lithium is preferably used from the viewpoint of reliability. An active material that is capable of being alloyed with lithium is preferable since the capacity of the all-solid state secondary battery can be increased. In the constitutional layer formed of the solid electrolyte composition according to the embodiment of the present invention, solid particles firmly bind to each other, and thus a negative electrode active material capable of forming an alloy with lithium can be used as the negative electrode active material. As a result, it is possible to increase the capacity of the all-solid state secondary battery and extend battery life.

The carbonaceous material that is used as the negative electrode active material is a material substantially consisting of carbon. Examples thereof include petroleum pitch, carbon black such as acetylene black (AB), graphite (natural graphite, artificial graphite such as vapor-grown graphite), and carbonaceous material obtained by firing a variety of synthetic resins such as polyacrylonitrile (PAN)-based resins or furfuryl alcohol resins. Furthermore, examples thereof also include a variety of carbon fibers such as PAN-based carbon fibers, cellulose-based carbon fibers, pitch-based carbon fibers, vapor-grown carbon fibers, dehydrated polyvinyl alcohol (PVA)-based carbon fibers, lignin carbon fibers, vitreous carbon fibers, and activated carbon fibers, mesophase microspheres, graphite whisker, and tabular graphite.

These carbonaceous materials can be classified into non-graphitizable carbonaceous materials (also referred to as "hard carbon") and graphitizable carbonaceous materials based on the graphitization degree. In addition, it is preferable that the carbonaceous material has the lattice spacing, density, and crystallite size described in JP1987-022066A (JP-S62-022066A), JP1990-006856A (JP-H2-006856A), and JP1991-045473A (JP-H3-045473A). The carbonaceous material is not necessarily a single material and, for example, may be a mixture of natural graphite and artificial graphite described in JP1993-090844A (JP-HS-090844A) or graphite having a coating layer described in JP1994-004516A (JP-H6-004516A).

As the carbonaceous material, hard carbon or graphite is preferably used, and graphite is more preferably used.

The oxide of a metal or a metalloid element that can be used as the negative electrode active material is not particularly limited as long as it is an oxide capable of intercalating and deintercalating lithium, and examples thereof include an oxide of a metal element (metal oxide), a composite oxide of a metal element or a composite oxide of a metal element and a metalloid element (collectively referred to as "metal composite oxide), and an oxide of a metalloid element (a metalloid oxide). The oxides are more preferably noncrystalline oxides, and preferred examples thereof include chalcogenides which are reaction products between metal elements and elements in Group 16 of the periodic table). In the present invention, the metalloid element refers to an element having intermediate properties between those of a metal element and a non-metal element. Typically, the metalloid elements include six elements including boron, silicon, germanium, arsenic, antimony, and tellurium, and further include three elements including selenium, polonium, and astatine. In addition, "amorphous" represents an oxide having a broad scattering band with a peak in a range of 20° to 40° in terms of 2θ in case of being measured by an X-ray diffraction method using CuKα rays, and the oxide may have a crystal diffraction line. The highest intensity in a crystal diffraction line observed in a range of 40° to 70° in terms of 2θ is preferably 100 times or less and more preferably 5 times or less relative to the intensity of a diffraction peak line in a broad scattering band observed in a range of 20° to 40° in terms of 2θ, and it is still more preferable that the oxide does not have a crystal diffraction line.

In the compound group consisting of the noncrystalline oxides and the chalcogenides, noncrystalline oxides of metalloid elements and chalcogenides are more preferable, and (composite) oxides consisting of one element or a combination of two or more elements selected from elements (for example, Al, Ga, Si, Sn, Ge, Pb, Sb, and Bi) belonging to Groups 13 (IIIB) to 15 (VB) in the periodic table or chalcogenides are more preferable. Specific examples of preferred noncrystalline oxides and chalcogenides include $Ga_2O_3$, $GeO$, $PbO$, $PbO_2$, $Pb_2O_3$, $Pb_2O_4$, $Pb_3O_4$, $Sb_2O_3$, $Sb_2O_4$, $Sb_2O_8Bi_2O_3$, $Sb_2O_8Bi_2O_3$, $Sb_2O_5$, $Bi_2O_3$, $Bi_2O_4$, $GeS$, $PbS$, $PbS_2$, $Sb_2S_3$, and $Sb_2S_5$.

Preferred examples of the negative electrode active material which can be used in combination with amorphous oxides containing Sn, Si, or Ge as a major component include a carbonaceous material capable of intercalating and/or deintercalating lithium ions or lithium metal, lithium, a lithium alloy, and a negative electrode active material that is capable of being alloyed with lithium.

It is preferable that an oxide of a metal or a metalloid element, in particular, a metal (composite) oxide and the chalcogenide contains at least one of titanium or lithium as the constitutional component from the viewpoint of high current density charging and discharging characteristics. Examples of the metal composite oxide (lithium composite metal oxide) including lithium include a composite oxide of lithium oxide and the above metal (composite) oxide or the above chalcogenide, and specifically, $Li_2SnO_2$.

As the negative electrode active material, for example, a metal oxide (titanium oxide) having a titanium element is also preferable. Specifically, $Li_4Ti_5O_{12}$ (lithium titanium oxide [LTO]) is preferable since the volume variation during the intercalation and deintercalation of lithium ions is small, and thus the high-speed charging and discharging characteristics are excellent, and the deterioration of electrodes is suppressed, whereby it becomes possible to improve the life of the lithium ion secondary battery.

The lithium alloy as the negative electrode active material is not particularly limited as long as it is typically used as a negative electrode active material for a secondary battery, and examples thereof include a lithium aluminum alloy.

The negative electrode active material that is capable of forming an alloy with lithium is not particularly limited as long as it is typically used as a negative electrode active material for a secondary battery. Such an active material has a large expansion and contraction due to charging and discharging of the all-solid state secondary battery and accelerates the deterioration of the cycle characteristics. However, since the inorganic solid electrolyte-containing composition according to the embodiment of the present invention contains the fluorine-containing binder described above, and thus it is possible to suppress the deterioration of the cycle characteristics. Examples of such an active material include a (negative electrode) active material (an alloy or the like) having a silicon element or a tin element and a metal such as Al or In, a negative electrode active material (a silicon-containing active material) having a silicon element capable of exhibiting high battery capacity is preferable, and a silicon-containing active material in which the content of the silicon element is 50% by mole or more with respect to all the constituent elements is more preferable.

In general, a negative electrode including the negative electrode active material (for example, a Si negative electrode including a silicon-containing active material or an Sn negative electrode containing an active material containing a tin element) can intercalate a larger amount of Li ions than a carbon negative electrode (for example, graphite or acetylene black). That is, the amount of Li ions intercalated per unit mass increases. As a result, the battery capacity (the energy density) can be increased. As a result, there is an advantage that the battery driving duration can be extended.

Examples of the silicon-containing active material include a silicon-containing alloy (for example, $LaSi_2$, $VSi_2$, La—Si, Gd—Si, or Ni—Si) including a silicon material such as Si or SiOx ($0<x\leq 1$) and titanium, vanadium, chromium, manganese, nickel, copper, lanthanum, or the like or a structured active material thereof (for example, $LaSi_2$/Si), and an active material such as $SnSiO_3$ or $SnSiS_3$ including silicon element and tin element. In addition, since SiOx itself can be used as a negative electrode active material (a metalloid oxide) and Si is produced along with the operation of an all-solid state secondary battery, SiOx can be used as a negative electrode active material (or a precursor material thereof) capable of forming an alloy with lithium.

Examples of the negative electrode active material including tin element include Sn, SnO, $SnO_2$, SnS, $SnS_2$, and the above-described active material including silicon element and tin element. In addition, a composite oxide with lithium oxide, for example, $Li_2SnO_2$ can also be used.

In the present invention, the above-described negative electrode active material can be used without any particular limitation. From the viewpoint of battery capacity, a preferred aspect as the negative electrode active material is a negative electrode active material that is capable of being alloyed with lithium. Among them, the silicon material or the silicon-containing alloy (the alloy containing a silicon element) described above is more preferable, and it is more preferable to include a negative electrode active material containing silicon (Si) or a silicon-containing alloy.

The chemical formulae of the compounds obtained by the above baking method can be calculated using an inductively coupled plasma (ICP) emission spectroscopy as a measuring method from the mass difference of powder before and after firing as a convenient method.

The shape of the negative electrode active material is not particularly limited but is preferably a particulate shape. The volume average particle diameter of the negative electrode active material is not particularly limited; however, it is preferably 0.1 to 60 μm. The volume average particle diameter of the negative electrode active material particles can be measured using the same method as that of the particle diameter of the inorganic solid electrolyte. In order to obtain the predetermined particle diameter, a typical crusher or classifier is used as in the case of the positive electrode active material.

The negative electrode active material may be used singly, or two or more negative electrode active materials may be used in combination.

In a case of forming a negative electrode active material layer, the mass (mg) (mass per unit area) of the negative electrode active material per unit area ($cm^2$) in the negative electrode active material layer is not particularly limited. It can be appropriately determined according to the designed battery capacity and can be set to, for example, 1 to 100 mg/$cm^2$.

The content of the negative electrode active material in the inorganic solid electrolyte-containing composition is not particularly limited, and it is preferably 10% to 90% by mass, more preferably 20% to 85% by mass, still more preferably 30% to 80% by mass, and even still more preferably 40% by mass to 75% by mass, in the solid content of 100% by mass.

In the present invention, in a case where a negative electrode active material layer is formed by charging a secondary battery, ions of a metal belonging to Group 1 or Group 2 in the periodic table, generated in the all-solid state secondary battery, can be used instead of the negative electrode active material. By bonding the ions to electrons and precipitating a metal, a negative electrode active material layer can be formed.

(Coating of Active Material)

The surfaces of the positive electrode active material and the negative electrode active material may be coated with a separate metal oxide. Examples of the surface coating agent include metal oxides and the like containing Ti, Nb, Ta, W, Zr, Al, Si, or Li. Specific examples thereof include titanium oxide spinel, tantalum-based oxides, niobium-based oxides, and lithium niobate-based compounds, and specific examples thereof include $Li_4Ti_5O_{12}$, $Li_2Ti_2O_5$, $LiTaO_3$, $LiNbO_3$, $LiAlO_2$, $Li_2ZrO_3$, $Li_2WO_4$, $Li_2TiO_3$, $Li_2B_4O_7$, $Li_3PO_4$, $Li_2MoO_4$, $Li_3BO_3$, $LiBO_2$, $Li_2CO_3$, $Li_2SiO_3$, $SiO_2$, $TiO_2$, $ZrO_2$, $Al_2O_3$, and $B_2O_3$.

In addition, a surface treatment may be carried out on the surfaces of electrodes including the positive electrode active material or the negative electrode active material using sulfur, phosphorous, or the like.

Furthermore, the particle surface of the positive electrode active material or the negative electrode active material may be treated with an active light ray or an active gas (plasma or the like) before or after the coating of the surfaces.

<Conductive Auxiliary Agent>

The inorganic solid electrolyte-containing composition according to the embodiment of the present invention preferably contains a conductive auxiliary agent, and for example, it is preferable that the silicon atom-containing active material as the negative electrode active material is used in combination with a conductive auxiliary agent.

The conductive auxiliary agent is not particularly limited, and conductive auxiliary agents that are known as ordinary conductive auxiliary agents can be used. The conductive auxiliary agent may be, for example, graphite such as natural graphite or artificial graphite, carbon black such as acetylene black, Ketjen black, or furnace black, amorphous carbon such as needle cokes, a carbon fiber such as a vapor-grown carbon fiber or a carbon nanotube, or a carbonaceous material such as graphene or fullerene which are electron-conductive materials and also may be a metal powder or a metal fiber of copper, nickel, or the like, and a conductive polymer such as polyaniline, polypyrrole, polythiophene, polyacetylene, or a polyphenylene derivative may also be used.

In the present invention, in a case where the active material is used in combination with the conductive auxiliary agent, among the above-described conductive auxiliary agents, a conductive auxiliary agent that does not intercalate and deintercalate ions (preferably Li ions) of a metal belonging to Group 1 or Group 2 in the periodic table and does not function as an active material at the time of charging and discharging of the battery is classified as the conductive auxiliary agent. Therefore, among the conductive auxiliary agents, a conductive auxiliary agent that can function as the active material in the active material layer at the time of charging and discharging of the battery is classified as an active material but not as a conductive auxiliary agent. Whether or not the conductive auxiliary agent functions as the active material at the time of charging and discharging of a battery is not unambiguously determined but is determined by the combination with the active material.

One kind of conductive auxiliary agent may be contained, or two or more kinds thereof may be contained.

The shape of the conductive auxiliary agent is not particularly limited but is preferably a particulate shape.

In a case where the inorganic solid electrolyte-containing composition according to the embodiment of the present invention contains a conductive auxiliary agent, the content of the conductive auxiliary agent in the inorganic solid electrolyte-containing composition is preferably 0% to 10% by mass in the solid content of 100% by mass.

<Lithium Salt>

The inorganic solid electrolyte-containing composition according to the embodiment of the present invention preferably contains a lithium salt (a supporting electrolyte) as well.

Generally, the lithium salt is preferably a lithium salt that is used for this kind of product and is not particularly limited. For example, lithium salts described in paragraphs 0082 to 0085 of JP2015-088486A are preferable.

In a case where the inorganic solid electrolyte-containing composition according to the embodiment of the present invention contains a lithium salt, the content of the lithium salt is preferably 0.1 part by mass or more and more preferably 5 parts by mass or more with respect to 100 parts by mass of the solid electrolyte. The upper limit thereof is preferably 50 parts by mass or less and more preferably 20 parts by mass or less.

<Dispersing Agent>

Since the above-described polymer binder functions as a dispersing agent as well, the inorganic solid electrolyte-containing composition according to the embodiment of the present invention may not contain a dispersing agent other than this polymer binder; however, it may contain a dispersing agent. As the dispersing agent, a dispersing agent that is generally used for an all-solid state secondary battery can be appropriately selected and used. Generally, a compound intended for particle adsorption and steric repulsion and/or electrostatic repulsion is suitably used.

<Other Additives>

As components other than the respective components described above, the inorganic solid electrolyte-containing composition according to the embodiment of the present invention may appropriately contain an ionic liquid, a thickener, a crosslinking agent (an agent causing a crosslinking reaction by radical polymerization, condensation polymerization, or ring-opening polymerization), a polymerization initiator (an agent that generates an acid or a radical by heat or light), an antifoaming agent, a leveling agent, a dehydrating agent, or an antioxidant. The ionic liquid is contained in order to further improve the ion conductivity, and the known one in the related art can be used without particular limitation. In addition, a polymer other than the polymer that forms the above-described polymer binder, a typically used binder, or the like may be contained.

(Preparation of Inorganic Solid Electrolyte-Containing Composition)

The inorganic solid electrolyte-containing composition according to the embodiment of the present invention can be prepared as a mixture and preferably as a slurry by mixing an inorganic solid electrolyte, the above fluorine-containing binder as a polymer binder, the above dispersion medium, preferably a particulate binder, a chain polymerization polymer binder, a conductive auxiliary agent, as well as appropriately a lithium salt and any other optionally components, by using, for example, various mixers that are used generally. In a case of a composition for an electrode, an active material is further mixed.

The mixing method is not particularly limited, and the components may be mixed at once or sequentially. A mixing environment is not particularly limited; however, examples thereof include a dry air environment and an inert gas environment.

[Sheet for an all-Solid State Secondary Battery]

A sheet for an all-solid state secondary battery according to the embodiment of the present invention is a sheet-shaped molded body with which a constitutional layer of an all-solid state secondary battery can be formed, and includes various aspects depending on uses thereof. Examples of thereof include a sheet that is preferably used in a solid electrolyte layer (also referred to as a solid electrolyte sheet for an all-solid state secondary battery), and a sheet that is preferably used in an electrode or a laminate of an electrode and a solid electrolyte layer (an electrode sheet for an all-solid state secondary battery). In the present invention, the variety of sheets described above will be collectively referred to as a sheet for an all-solid state secondary battery.

It suffices that the solid electrolyte sheet for an all-solid state secondary battery according to the embodiment of the present invention is a sheet having a solid electrolyte layer, and it may be a sheet in which a solid electrolyte layer is formed on a substrate or may be a sheet that is formed of a solid electrolyte layer without including a substrate. The solid electrolyte sheet for an all-solid state secondary battery may include another layer in addition to the solid electrolyte layer. Examples of the other layer include a protective layer (a stripping sheet), a collector, and a coating layer.

Examples of the solid electrolyte sheet for an all-solid state secondary battery according to the embodiment of the present invention include a sheet including a layer formed of the inorganic solid electrolyte-containing composition according to the embodiment of the present invention, a typical solid electrolyte layer, and a protective layer on a substrate in this order. The solid electrolyte layer included in the solid electrolyte sheet for an all-solid state secondary battery is preferably formed of the inorganic solid electrolyte-containing composition according to the embodiment of the present invention. The contents of the respective components in the solid electrolyte layer are not particularly limited; however, the contents are preferably the same as the contents of the respective components with respect to the solid content of the inorganic solid electrolyte-containing composition according to the embodiment of the present invention. The layer thickness of each layer that constitutes the solid electrolyte sheet for an all-solid state secondary battery is the same as the layer thickness of each layer described later in the all-solid state secondary battery.

The substrate is not particularly limited as long as it can support the solid electrolyte layer, and examples thereof include a sheet body (plate-shaped body) formed of materials described below regarding the collector, an organic material, an inorganic material, or the like. Examples of the organic materials include various polymers, and specific examples thereof include polyethylene terephthalate, polypropylene, polyethylene, and cellulose. Examples of the inorganic materials include glass and ceramic.

It suffices that an electrode sheet for an all-solid state secondary battery according to the embodiment of the present invention (simply also referred to as an "electrode sheet") is an electrode sheet including an active material layer, and it may be a sheet in which an active material layer is formed on a substrate (collector) or may be a sheet that is formed of an active material layer without including a substrate. The electrode sheet is typically a sheet including the collector and the active material layer, and examples of an aspect thereof include an aspect including the collector, the active material layer, and the solid electrolyte layer in this order and an aspect including the collector, the active material layer, the solid electrolyte layer, and the active material layer in this order. The solid electrolyte layer and the active material layer included in the electrode sheet are preferably formed of the inorganic solid electrolyte-containing composition according to the embodiment of the present invention. The contents of the respective components in this solid electrolyte layer or active material layer are not particularly limited; however, the contents are preferably the same as the contents of the respective components with respect to the solid content of the inorganic solid electrolyte-containing composition (the composition for an electrode) according to the embodiment of the present invention. The thickness of each of the layers forming the electrode sheet according to the embodiment of the present invention is the same as the layer thickness of each of the layers described below regarding the all-solid state secondary battery. The electrode sheet according to the embodiment of the present invention may include the above-described other layer.

The sheet for an all-solid state secondary battery sheet according to the embodiment of the present invention has a low-resistance constitutional layer the surface of which is flat, in which at least one layer of the solid electrolyte layer or the active material layer is formed of the inorganic solid electrolyte-containing composition according to the embodiment of the present invention. As a result, in a case where the sheet for an all-solid state secondary battery according to the embodiment of the present invention is used as a constitutional layer of the all-solid state secondary battery, it is possible to realize excellent cycle characteristics as well as low resistance of the all-solid state secondary battery. In particular, in the electrode sheet for an all-solid state secondary battery and the all-solid state secondary battery, in which the active material layer is formed of the inorganic solid electrolyte-containing composition according to the embodiment of the present invention, the active material layer and the collector exhibits strong adhesiveness, and thus it is possible to realize further improvement of the cycle characteristics. As a result, the sheet for an all-solid state secondary battery according to the embodiment of the present invention is suitably used as a sheet with which a constitutional layer of an all-solid state secondary battery can be formed.

[Manufacturing Method for Sheet for all-Solid State Secondary Battery]

The manufacturing method for a sheet for an all-solid state secondary battery according to the embodiment of the present invention is not particularly limited, and the sheet can be manufactured by forming each of the above layers using the inorganic solid electrolyte-containing composition according to the embodiment of the present invention. Examples thereof include a method in which the film formation (the coating and drying) is carried out preferably on a substrate or a collector (the other layer may be interposed) to form a layer (a coated and dried layer) consisting of an inorganic solid electrolyte-containing composition. This method makes it is possible to produce a sheet for an all-solid state secondary battery having a substrate or a collector and having a coated and dried layer. In particular, in a case where a film of the inorganic solid electrolyte-containing composition according to the embodiment of the present invention is formed on a collector to produce a sheet for an all-solid state secondary battery, it is possible to strengthen the adhesion between the collector and the active material layer. Here, the coated and dried layer refers to a layer formed by carrying out coating with the inorganic solid electrolyte-containing composition according to the embodiment of the present invention and drying the dispersion medium (that is, a layer formed using the inorganic solid electrolyte-containing composition according to the embodiment of the present invention and consisting of a composition obtained by removing the dispersion medium from the inorganic solid electrolyte-containing composition according to the embodiment of the present invention). In the active material layer and the coated and dried layer, the dispersion medium may remain within a range where the effects of the present invention do not deteriorate, and the residual amount thereof, for example, in each of the layers may be 3% by mass or lower.

In the manufacturing method for a sheet for an all-solid state secondary battery according to the embodiment of the present invention, each of the steps such as coating and drying will be described in the following manufacturing method for an all-solid state secondary battery.

In the manufacturing method for a sheet for an all-solid state secondary battery according to the embodiment of the present invention, the coated and dried layer obtained as described above can be pressurized. The pressurizing condition and the like will be described later in the section of the manufacturing method for an all-solid state secondary battery.

In addition, in the manufacturing method for a sheet for an all-solid state secondary battery according to the embodiment of the present invention, the substrate, the protective layer (particularly stripping sheet), or the like can also be stripped.

[All-Solid State Secondary Battery]

The all-solid state secondary battery according to the embodiment of the present invention includes a positive electrode active material layer, a negative electrode active material layer facing the positive electrode active material layer, and a solid electrolyte layer disposed between the positive electrode active material layer and the negative electrode active material layer. The positive electrode active material layer is preferably formed on a positive electrode collector to configure a positive electrode. The negative electrode active material layer is preferably formed on a negative electrode collector to configure a negative electrode.

An aspect in which at least one of the negative electrode active material layer, the positive electrode active material layer, or the solid electrolyte layer is formed of the inorganic solid electrolyte-containing composition according to the embodiment of the present invention or in which all the layers are formed of the inorganic solid electrolyte-containing composition according to the embodiment of the present invention is also one of the preferred aspects. In the active material layer or the solid electrolyte layer formed of the inorganic solid electrolyte-containing composition according to the embodiment of the present invention, the kinds of components to be contained and the content ratios thereof are preferably the same as the solid content of the inorganic solid electrolyte-containing composition according to the embodiment of the present invention. In a case where the active material layer or the solid electrolyte layer is not formed of the inorganic solid electrolyte-containing composition according to the embodiment of the present invention, a known material in the related art can be used.

The thickness of each of the negative electrode active material layer, the solid electrolyte layer, and the positive electrode active material layer is not particularly limited. In case of taking a dimension of an ordinary all-solid state secondary battery into account, the thickness of each of the layers is preferably 10 to 1,000 μm and more preferably 20 μm or more and less than 500 μm. In the all-solid state secondary battery according to the embodiment of the present invention, the thickness of at least one layer of the positive electrode active material layer or the negative electrode active material layer is still more preferably 50 μm or more and less than 500 μm.

Each of the positive electrode active material layer and the negative electrode active material layer may include a collector on the side opposite to the solid electrolyte layer.

<Housing>

Depending on the use application, the all-solid state secondary battery according to the embodiment of the present invention may be used as the all-solid state secondary battery having the above-described structure as it is but is preferably sealed in an appropriate housing to be used in the form of a dry cell. The housing may be a metallic housing or a resin (plastic) housing. In a case where a metallic housing is used, examples thereof include an aluminum alloy housing and a stainless steel housing. It is preferable that the metallic housing is classified into a positive electrode-side housing and a negative electrode-side housing and that the positive electrode-side housing and the negative electrode-side housing are electrically connected to the positive electrode collector and the negative electrode collector, respectively. The positive electrode-side housing and the negative electrode-side housing are preferably integrated by being joined together through a gasket for short circuit prevention.

Hereinafter, the all-solid state secondary battery of the preferred embodiments of the present invention will be described with reference to FIG. 1; however, the present invention is not limited thereto.

FIG. 1 is a cross-sectional view schematically illustrating an all-solid state secondary battery (a lithium ion secondary battery) according to a preferred embodiment of the present invention. In the case of being seen from the negative electrode side, an all-solid state secondary battery 10 of the present embodiment includes a negative electrode collector 1, a negative electrode active material layer 2, a solid electrolyte layer 3, a positive electrode active material layer 4, and a positive electrode collector 5 in this order. The respective layers are in contact with each other, and thus structures thereof are adjacent. In a case in which the above-described structure is employed, during charging, electrons (e) are supplied to the negative electrode side, and lithium ions ($Li^+$) are accumulated on the negative electrode side. On the other hand, during discharging, the lithium ions ($Li^+$) accumulated in the negative electrode side return to the positive electrode, and electrons are supplied to an operation portion 6. In an example illustrated in the drawing, an electric bulb is employed as a model at the operation portion 6 and is lit by discharging.

In a case where the all-solid state secondary battery having a layer configuration illustrated in FIG. 1 is put into a 2032-type coin case, the all-solid state secondary battery will be referred to as the "laminate for an all-solid state secondary battery", and a battery prepared by putting this laminate for an all-solid state secondary battery into a 2032-type coin case will be referred to as "all-solid state secondary battery", thereby referring to both batteries distinctively in some cases.

(Positive Electrode Active Material Layer, Solid Electrolyte Layer, and Negative Electrode Active Material Layer)

In the all-solid state secondary battery 10, all of the positive electrode active material layer, the solid electrolyte layer, and the negative electrode active material layer are formed of the inorganic solid electrolyte-containing composition of the embodiment of the present invention. This all-solid state secondary battery 10 exhibits excellent battery performance. The kinds of the inorganic solid electrolyte and the polymer binder (the fluorine-containing binder) which are contained in the positive electrode active material layer 4, the solid electrolyte layer 3, and the negative electrode active material layer 2 may be identical to or different from each other.

In the present invention, any one of the positive electrode active material layer and the negative electrode active material layer, or collectively both of them may be simply referred to as an active material layer or an electrode active material layer. In addition, in the present invention, any one of the positive electrode active material and the negative electrode active material, or collectively both of them may be simply referred to as an active material or an electrode active material.

In the present invention, in a case where the constitutional layer is formed of the inorganic solid electrolyte-containing composition according to the embodiment of the present invention, it is possible to realize an all-solid state secondary battery having excellent cycle characteristics as well as an all-solid state secondary battery having low resistance.

In the all-solid state secondary battery 10, the negative electrode active material layer can be a lithium metal layer. Examples of the lithium metal layer include a layer formed by depositing or molding a lithium metal powder, a lithium foil, and a lithium vapor deposition film. The thickness of the lithium metal layer can be, for example, 1 to 500 μm regardless of the above thickness of the above negative electrode active material layer.

The positive electrode collector 5 and the negative electrode collector 1 are preferably an electron conductor.

In the present invention, either or both of the positive electrode collector and the negative electrode collector will also be simply referred to as the collector.

As a material that forms the positive electrode collector, not only aluminum, an aluminum alloy, stainless steel, nickel, or titanium but also a material (a material on which a thin film is formed) obtained by treating the surface of aluminum or stainless steel with carbon, nickel, titanium, or silver is preferable. Among these, aluminum or an aluminum alloy is more preferable.

As a material which forms the negative electrode collector, aluminum, copper, a copper alloy, stainless steel, nickel, titanium, or the like, and further, a material obtained by treating the surface of aluminum, copper, a copper alloy, or stainless steel with carbon, nickel, titanium, or silver is preferable, and aluminum, copper, a copper alloy, or stainless steel is more preferable.

Regarding the shape of the collector, a film sheet shape is typically used; however, it is also possible to use shapes such as a net shape, a punched shape, a lath body, a porous body, a foaming body, and a molded body of fiber.

The thickness of the collector is not particularly limited; however, it is preferably 1 to 500 μm. In addition, protrusions and recesses are preferably provided on the surface of the collector by carrying out a surface treatment.

In the all-solid state secondary battery 10, a layer formed of a known constitutional layer forming material can be applied to the positive electrode active material layer.

In the present invention, a functional layer, a functional member, or the like may be appropriately interposed or disposed between each layer of the negative electrode collector, the negative electrode active material layer, the solid electrolyte layer, the positive electrode active material layer, and the positive electrode collector or on the outside thereof. In addition, each layer may be constituted of a single layer or multiple layers.

[Manufacture of all-Solid State Secondary Battery]

The all-solid state secondary battery can be manufactured by a conventional method. Specifically, the all-solid state secondary battery can be manufactured by forming each of the layers described above using the inorganic solid electrolyte-containing composition of the embodiment of the present invention or the like. Hereinafter, the manufacturing method therefor will be described in detail.

The all-solid state secondary battery according to the embodiment of the present invention can be manufactured by carrying out a method (a manufacturing method for a sheet for an all-solid state secondary battery according to the embodiment of the present invention) which includes (is carried out through) a step of coating an appropriate substrate (for example, a metal foil which serves as a collector) with the inorganic solid electrolyte-containing composition according to the embodiment of the present invention and forming a coating film (forming a film).

For example, an inorganic solid electrolyte-containing composition containing a positive electrode active material is applied as a material for a positive electrode (a composition for a positive electrode) onto a metal foil which is a positive electrode collector, to form a positive electrode active material layer, thereby producing a positive electrode sheet for an all-solid state secondary battery. Next, the inorganic solid electrolyte-containing composition for forming a solid electrolyte layer is applied onto the positive electrode active material layer to form the solid electrolyte layer. Furthermore, an inorganic solid electrolyte-containing composition containing a negative electrode active material is applied as a material for a negative electrode (a composition for a negative electrode) onto the solid electrolyte layer, to form a negative electrode active material layer. A negative electrode collector (a metal foil) is overlaid on the negative electrode active material layer, whereby it is possible to obtain an all-solid state secondary battery having a structure in which the solid electrolyte layer is sandwiched between the positive electrode active material layer and the negative electrode active material layer. A desired all-solid state secondary battery can also be manufactured by enclosing the all-solid state secondary battery in a housing.

In addition, it is also possible to manufacture an all-solid state secondary battery by carrying out the forming method for each layer in reverse order to form a negative electrode active material layer, a solid electrolyte layer, and a positive electrode active material layer on a negative electrode collector and overlaying a positive electrode collector thereon.

As another method, the following method can be exemplified. That is, the positive electrode sheet for an all-solid state secondary battery is produced as described above. In addition, an inorganic solid electrolyte-containing composition containing a negative electrode active material is applied as a material for a negative electrode (a composition for a negative electrode) onto a metal foil which is a negative electrode collector, to form a negative electrode active material layer, thereby producing a negative electrode sheet for an all-solid state secondary battery. Next, a solid electrolyte layer is formed on the active material layer in any one of these sheets as described above. Furthermore, the other one of the positive electrode sheet for an all-solid state secondary battery and the negative electrode sheet for an all-solid state secondary battery is laminated on the solid electrolyte layer such that the solid electrolyte layer and the active material layer come into contact with each other. In this manner, an all-solid state secondary battery can be manufactured.

As still another method, for example, the following method can be used. That is, a positive electrode sheet for an all-solid state secondary battery and a negative electrode sheet for an all-solid state secondary battery are produced as described above. In addition, separately from the positive electrode sheet for an all-solid state secondary battery and the negative electrode sheet for an all-solid state secondary battery, an inorganic solid electrolyte-containing composition is applied onto a substrate, thereby producing a solid electrolyte sheet for an all-solid state secondary battery consisting of a solid electrolyte layer. Furthermore, the positive electrode sheet for an all-solid state secondary battery and the negative electrode sheet for an all-solid state secondary battery are laminated with each other to sandwich the solid electrolyte layer that has been peeled off from the substrate. In this manner, an all-solid state secondary battery can be manufactured.

Further, a positive electrode sheet for an all-solid state secondary battery, a negative electrode sheet for an all-solid state secondary battery, and a solid electrolyte sheet for an all-solid state secondary battery are produced as described above. Next, the positive electrode sheet for an all-solid state secondary battery or negative electrode sheet for an all-solid state secondary battery, and the solid electrolyte sheet for an all-solid state secondary battery are overlaid and pressurized into a state where the positive electrode active material layer or the negative electrode active material layer is brought into contact with the solid electrolyte layer. In this manner, the solid electrolyte layer is transferred to the positive electrode sheet for an all-solid state secondary battery or the negative electrode sheet for an all-solid state secondary battery. Then, the solid electrolyte layer from which the substrate of the solid electrolyte sheet for an all-solid state secondary battery has been peeled off and the negative electrode sheet for an all-solid state secondary battery or positive electrode sheet for an all-solid state secondary battery are overlaid and pressurized (into a state where the negative electrode active material layer or positive electrode active material layer is brought into contact with the solid electrolyte layer). In this manner, an all-solid state secondary battery can be manufactured. The pressurizing method and the pressurizing conditions in this method are not particularly limited, and a method and pressurizing conditions described in the pressurization of the applied composition, which will be described later, can be applied.

The solid electrolyte layer or the like can also be formed by, for example, forming an inorganic solid electrolyte-containing composition or the like on a substrate or an active material layer by pressure molding under pressurizing conditions described later.

In the above production method, it suffices that the inorganic solid electrolyte-containing composition according to the embodiment of the present invention is used in any one of the positive composition for an electrode, the inorganic solid electrolyte-containing composition, or the composition for a negative electrode. The inorganic solid electrolyte-containing composition according to the embodiment of the present invention is preferably used in the inorganic solid electrolyte-containing composition, and the inorganic solid electrolyte-containing composition according to the embodiment of the present invention can be used in any of the compositions.

In a case where the solid electrolyte layer or the active material layer is formed of a composition other than the solid electrolyte composition according to the embodiment of the present invention, examples thereof include a typically used composition. In addition, the negative electrode active material layer can also be formed by binding ions of a metal belonging to Group 1 or Group 2 in the periodic table, which are accumulated on a negative electrode collector during initialization described below or during charging for use, without forming the negative electrode active material layer during the manufacturing of the all-solid state secondary battery to electrons and precipitating the ions on a negative electrode collector or the like as a metal.

The solid electrolyte layer or the like can also be formed on the substrate or the active material layer, for example, by pressure-molding the solid electrolyte composition or the like under a pressurizing condition described below, or the solid electrolyte or a sheet molded body of the active material.

<Formation of Individual Layer (Film Formation)>

The method for applying the inorganic solid electrolyte-containing composition is not particularly limited and can be appropriately selected. Examples thereof include coating (preferably wet-type coating), spray coating, spin coating, dip coating, slit coating, stripe coating, and bar coating.

In this case, the inorganic solid electrolyte-containing composition may be dried after being applied each time or may be dried after being applied multiple times. The drying temperature is not particularly limited. The lower limit is preferably 30° C. or higher, more preferably 60° C. or higher, and still more preferably 80° C. or higher. The upper limit thereof is preferably 300° C. or lower, more preferably 250° C. or lower, and still more preferably 200° C. or lower. In a case where the solid electrolyte composition is heated in the above-described temperature range, the dispersion medium can be removed to make the composition enter a solid state (coated and dried layer). This temperature range is preferable since the temperature is not excessively increased and each member of the all-solid state secondary battery is not impaired. As a result, excellent overall performance is exhibited in the all-solid state secondary battery, and it is possible to obtain a good binding property and a good ion conductivity even without pressurization.

In a case where the inorganic solid electrolyte-containing composition according to the embodiment of the present invention is applied and dried as described above, it is possible to suppress the variation in the contact state and to cause solid particles to bind, and furthermore, it is possible to form a coated and dried layer having a flat surface.

After applying the inorganic solid electrolyte-containing composition, it is preferable to pressurize each layer or the all-solid state secondary battery after superimposing the constitutional layers or producing the all-solid state secondary battery. Examples of the pressurizing methods include a method using a hydraulic cylinder pressing machine. The pressurizing force is not particularly limited; however, it is generally preferably in a range of 5 to 1,500 MPa.

In addition, the applied inorganic solid electrolyte-containing composition may be heated at the same time with the pressurization. The heating temperature is not particularly limited but is generally in a range of 30° C. to 300° C. The press can also be applied at a temperature higher than the glass transition temperature of the inorganic solid electrolyte. It is also possible to carry out press at a temperature higher than the glass transition temperature of the polymer contained in the polymer binder. However, in general, the temperature does not exceed the melting point of this polymer.

The pressurization may be carried out in a state in which the coating solvent or dispersion medium has been dried in advance or in a state in which the solvent or the dispersion medium remains.

The respective compositions may be applied at the same time, and the application, the drying, and the pressing may be carried out simultaneously and/or sequentially. Each of the compositions may be applied onto each of the separate substrates and then laminated by carrying out transfer.

The atmosphere during the manufacturing process, for example, heating or pressurization, is not particularly limited and may be any one of the atmospheres such as an atmosphere of dried air (the dew point: −20° C. or lower) and an atmosphere of inert gas (for example, an argon gas, a helium gas, or a nitrogen gas).

The pressurization time may be a short time (for example, within several hours) under the application of a high pressure or a long time (one day or longer) under the application of an intermediate pressure. In case of members other than the sheet for an all-solid state secondary battery, for example, the all-solid state secondary battery, it is also possible to use a restraining device (screw fastening pressure or the like) of the all-solid state secondary battery in order to continuously apply an intermediate pressure.

The pressing pressure may be a pressure that is constant or varies with respect to a portion under pressure such as a sheet surface.

The pressing pressure may be variable depending on the area or the film thickness of the portion under pressure. In addition, the pressure may also be variable stepwise for the same portion.

A pressing surface may be flat or roughened.

<Initialization>

The all-solid state secondary battery manufactured as described above is preferably initialized after the manufacturing or before use. The initialization is not particularly limited, and it is possible to initialize the all-solid state secondary battery by, for example, carrying out initial charging and discharging in a state in which the pressing pressure is increased and then releasing the pressure up to a pressure at which the all-solid state secondary battery is ordinarily used.

[Usages of all-Solid State Secondary Battery]

The all-solid state secondary battery according to the embodiment of the present invention can be applied to a variety of usages. The application aspect thereof is not particularly limited, and in a case of being mounted in an electronic apparatus, examples thereof include a notebook computer, a pen-based input personal computer, a mobile personal computer, an e-book player, a mobile phone, a cordless phone handset, a pager, a handy terminal, a portable fax, a mobile copier, a portable printer, a headphone stereo, a video movie, a liquid crystal television, a handy cleaner, a portable CD, a mini disc, an electric shaver, a transceiver, an electronic notebook, a calculator, a memory card, a portable tape recorder, a radio, and a backup power supply. Additionally, examples of the consumer usage thereof include an automobile, an electric vehicle, a motor, a lighting instrument, a toy, a game device, a road conditioner, a watch, a strobe, a camera, and a medical device (a pacemaker, a hearing aid, a shoulder massage device, and the like). Furthermore, the all-solid state secondary battery can be used for a variety of military usages and universe usages. In addition, the all-solid state secondary battery can also be combined with a solar battery.

EXAMPLES

Hereinafter, the present invention will be described in more detail based on Examples; however, the present invention is not limited thereto be interpreted. "Parts" and "%" that represent compositions in the following Examples are mass-based unless particularly otherwise described. In the present invention, "room temperature" means 25° C.

1. Synthesis of Fluorine-Based Copolymer and Preparation of Fluorine-Based Copolymer Solution Synthesis Example 1: Synthesis of Fluorine-Based Copolymer S-1 and Preparation of Binder Solution S-1

A fluorine-based copolymer S-1 was synthesized to prepare a binder solution S-1 (concentration: 10% by mass) consisting of this fluorine-based copolymer.

Specifically, 200 parts by mass of ion exchange water, 102 parts by mass of vinylidene fluoride, and 98 parts by mass of hexafluoropropylene were added to the autoclave, 2 parts by mass of diisopropyl peroxydicarbonate was added, and the mixture was stirred at 30° C. for 24 hours. After completion of the polymerization, the precipitate was filtered and dried at 100° C. for 10 hours to obtain a polymer (binder) S-1. The obtained polymer was a random copolymer, and its mass average molecular weight was 249,000. The obtained polymer was dissolved in butyl butyrate to obtain a binder solution.

Synthesis Examples 2 to 16: Synthesis of Fluorine-Based Copolymers S-2 to S-15 and S-26, and Preparation of Binder Solutions S-2 to S-15 and S-26

Polymers S-2 to S-15 and S-26 were synthesized in the same manner as in Synthesis Example 1 to obtain binder solutions S-2 to S-15 and a binder dispersion liquid S-26 (all having a concentration of 10% by mass) consisting of the respective fluorine-based copolymers, except that in Synthesis Example 1, compounds (polymerizable compounds having a functional group) from which the VDF constitutional component, the HFP constitutional component, and the compound having a functional group are derived, were used so that the fluorine-based copolymers S-2 to S-15 and S-26 had the composition (the kind and the content of the constitutional component) shown in Table 1.

It is noted that the polymer S-26 was synthesized by changing the amount of diisopropyl peroxydicarbonate to 0.2 parts by mass among the synthesis conditions of the polymer S-4. The average particle diameter of the polymer binder consisting of the polymer S-26 in the prepared binder dispersion liquid S-26 was 890 nm.

Synthesis Examples 17 to 19: Synthesis of Fluorine-Based Copolymers S-16, CS-1, and CS-2, and Preparation of Binder Solutions S-16, CS-1, and CS-2

Polymers S-16, CS-1, and CS-2 were synthesized in the same manner as in Synthesis Example 1 to obtain each of binder solutions S-16, CS-1, and CS-2 (all having a concentration of 10% by mass) consisting of the respective fluorine-based copolymers, except that in Synthesis Example 1, VDF, HFP, and tetrafluoroethylene (TFE) were used so that the fluorine-based copolymers S-16, CS-1, and CS-2 had the composition (the kind and the content of the constitutional component) shown in Table 1.

Synthesis Examples 20 and 21: Synthesis of Fluorine-Based Copolymers S-17 and S-25, and Preparation of Binder Solutions S-17 and S-25

Polymers S-17 and S-25 were synthesized in the same manner as in Synthesis Example 1 to obtain each of binder solutions S-17 and S-25 (all having a concentration of 10% by mass) consisting of the respective fluorine-based copolymers, except that in Synthesis Example 1, VDF and HFP, as well as tetrafluoroethylene were used so that the fluorine-based copolymers S-17 and S-25 had the composition (the kind and the content of the constitutional component) shown in Table 1 and the amount of the polymerization initiator was adjusted.

Fluorine-based copolymers S-18 to S-24 synthesized as follows are shown. The number at the bottom right of each constitutional component indicates the content (% by mole) of each constitutional component in the fluorine-based copolymer. * of the constitutional component indicates that each structural substitution position is a positional isomer mixture.

S-18
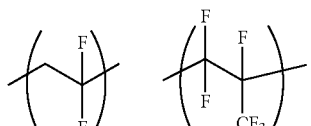
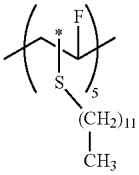

S-19
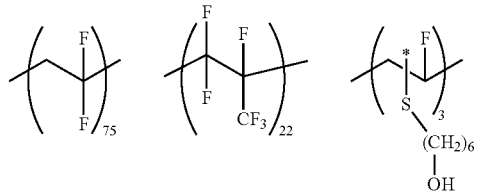

S-20
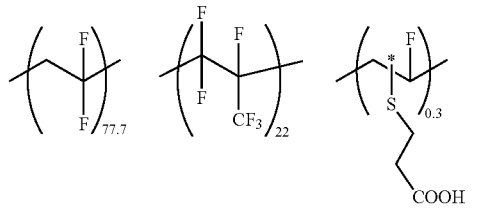

S-21
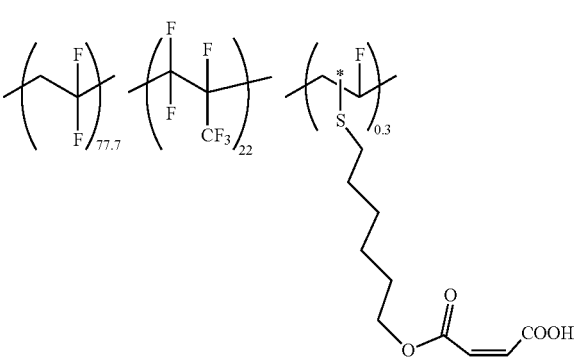

S-22
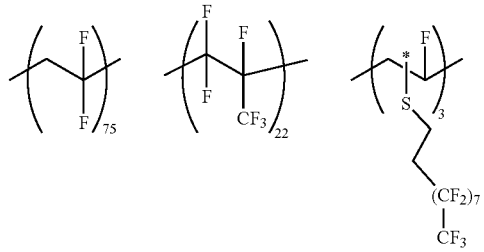

S-23
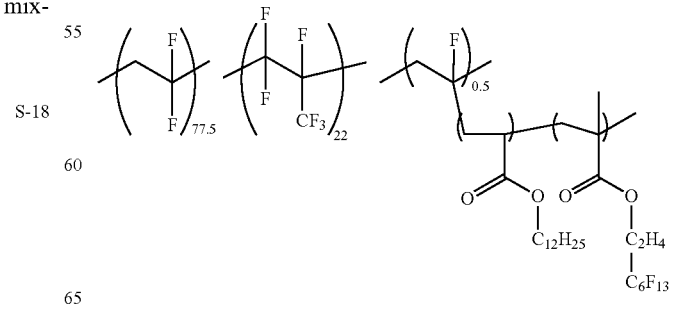

S-24

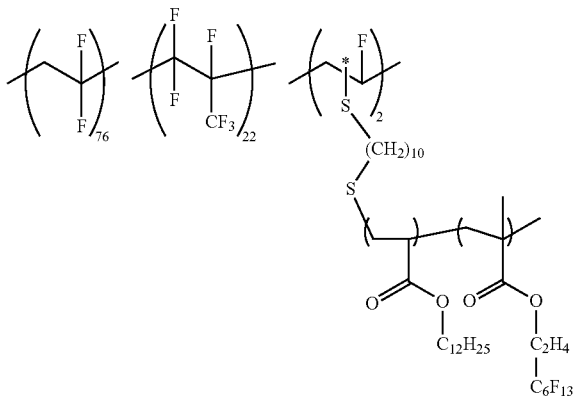

Synthesis Example 22: Synthesis of Fluorine-Based Copolymer S-18 and Preparation of Binder Solution S-18

A fluorine-based copolymer S-18 was synthesized to prepare a binder solution S-18 (concentration: 10% by mass) consisting of this fluorine-based copolymer.

Specifically, 180 parts by mass of tetrahydrofuran and 20 parts by mass of the fluorine-based copolymer S-17 synthesized in Synthesis Example 20 were added to a 500 mL three-necked flask equipped with a reflux condenser. After further adding thereto 0.28 g of lithium hydroxide and 40 g of methanol, stirring was carried out at 60° C. for 6 hours. Then, the mixture was added dropwise to water, the precipitate was filtered and subjected to vacuum drying to obtain a polymer precursor (S-18).

Next, 90 parts by mass of N-methylpyrrolidone and 10 parts by mass of the polymer precursor (S-18) were added to a 300 mL three-necked flask equipped with a reflux condenser and a gas introduction cock and dissolved. Then, nitrogen gas was introduced at a flow rate of 200 mL/min for 10 minutes, the temperature was subsequently raised to 75° C., and then 12 parts by mass of dodecanethiol and 0.6 parts by mass of azobisisobutyronitrile (manufactured by FUJIFILM Wako Pure Chemical Corporation) were added thereto, and stirring was continued for 5 hours. Then, the mixture was added dropwise to hexane to obtain a fluorine-based copolymer S-18 as a precipitate. After drying under reduced pressure at 60° C. for 5 hours, the precipitate was redissolved in any solvent. The obtained fluorine-based copolymer was dissolved in butyl butyrate to obtain a binder solution S-18 (concentration: 10% by mass).

Synthesis Example 23: Synthesis of Fluorine-Based Copolymer S-19 and Preparation of Binder Solution S-19

A fluorine-based copolymer S-19 was synthesized to prepare a binder solution S-19 (concentration: 10% by mass) consisting of this fluorine-based copolymer.

Specifically, 180 parts by mass of tetrahydrofuran and 20 parts by mass of the fluorine-based copolymer S-17 synthesized in Synthesis Example 20 were added to a 500 mL three-necked flask equipped with a reflux condenser. After further adding thereto 0.17 g of lithium hydroxide and 40 g of methanol, stirring was carried out at 60° C. for 6 hours. Then, the mixture was added dropwise to water, the precipitate was filtered and subjected to vacuum drying to obtain a polymer precursor (S-19).

Next, 90 parts by mass of N-methylpyrrolidone and 10 parts by mass of the polymer precursor (S-19) were added to a 300 mL three-necked flask equipped with a reflux condenser and a gas introduction cock and dissolved. Then, nitrogen gas was introduced at a flow rate of 200 mL/min for 10 minutes, the temperature was subsequently raised to 75° C., and then 8 parts by mass of 6-mercapto-1-hexanol and 0.6 parts by mass of azobisisobutyronitrile (manufactured by FUJIFILM Wako Pure Chemical Corporation) were added thereto, and stirring was continued for 5 hours. Then, the mixture was added dropwise to hexane to obtain a fluorine-based copolymer S-19 as a precipitate. After drying under reduced pressure at 60° C. for 5 hours, the precipitate was redissolved in any solvent. The obtained fluorine-based copolymer was dissolved in butyl butyrate to obtain a binder solution S-19 (concentration: 10% by mass).

Synthesis Example 24: Synthesis of Fluorine-Based Copolymer S-20 and Preparation of Binder Solution S-20

A fluorine-based copolymer S-20 was synthesized to prepare a binder solution S-20 (concentration: 10% by mass) consisting of this fluorine-based copolymer.

Specifically, 900 parts by mass of tetrahydrofuran and 100 parts by mass of the fluorine-based copolymer S-17 synthesized in Synthesis Example 20 were added to a 2 L three-necked flask equipped with a reflux condenser. After further adding thereto 0.09 g of lithium hydroxide and 200 g of methanol, stirring was carried out at 60° C. for 6 hours. Then, the mixture was added dropwise to water, the precipitate was filtered and subjected to vacuum drying to obtain a polymer precursor (S-20).

Next, 90 parts by mass of N-methylpyrrolidone and 10 parts by mass of the polymer precursor (S-20) were added to a 300 mL three-necked flask equipped with a reflux condenser and a gas introduction cock and dissolved. Then, nitrogen gas was introduced at a flow rate of 200 mL/min for 10 minutes, the temperature was subsequently raised to 75° C., and then 5 parts by mass of mercaptopropionic acid and 0.6 parts by mass of azobisisobutyronitrile (manufactured by FUJIFILM Wako Pure Chemical Corporation) were added thereto, and stirring was continued for 5 hours. Then, the mixture was added dropwise to hexane to obtain a fluorine-based copolymer S-20 as a precipitate. After drying under reduced pressure at 60° C. for 5 hours, the precipitate was redissolved in any solvent. The obtained fluorine-based copolymer was dissolved in butyl butyrate to obtain a binder solution S-20 (concentration: 10% by mass).

Synthesis Example 25: Synthesis of Fluorine-Based Copolymer S-21 and Preparation of Binder Solution S-21

A fluorine-based copolymer S-21 was synthesized to prepare a binder solution S-21 (concentration: 10% by mass) consisting of this fluorine-based copolymer.

Specifically, 90 parts by mass of N-methylpyrrolidone and 10 parts by mass of the polymer precursor (S-20) were added to a 300 mL three-necked flask equipped with a reflux condenser and a gas introduction cock and dissolved. Then, nitrogen gas was introduced at a flow rate of 200 mL/min for 10 minutes, the temperature was subsequently raised to 75° C., and then 3 parts by mass of 6-mercapto-1-hexanol and 0.6 parts by mass of azobisisobutyronitrile (manufactured by FUJIFILM Wako Pure Chemical Corporation) were added thereto, and stirring was continued for 5 hours. Then, 7 parts by mass of maleic acid anhydride was added, and stirring was further carried out for 2 hours. Then, the mixture was added dropwise to hexane to obtain a fluorine-based copolymer S-21 as a precipitate. After drying under reduced pressure at 60° C. for 5 hours, the precipitate was redissolved in any solvent. The obtained fluorine-based copolymer was dissolved in butyl butyrate to obtain a binder solution S-21 (concentration: 10% by mass).

In the fluorine-based copolymer (S-21), the content of the constitutional component having a functional group selected from the Group (a) of functional groups is 0.3% by mole for the ester bond and the carboxy group.

Synthesis Example 26: Synthesis of Fluorine-Based Copolymer S-22 and Preparation of Binder Solution S-22

A fluorine-based copolymer S-22 was synthesized to prepare a binder solution S-22 (concentration: 10% by mass) consisting of this fluorine-based copolymer.

Specifically, 90 parts by mass of N-methylpyrrolidone and 10 parts by mass of the polymer precursor (S-19) were added to a 300 mL three-necked flask equipped with a reflux condenser and a gas introduction cock and dissolved. Then, nitrogen gas was introduced at a flow rate of 200 mL/min for 10 minutes, the temperature was subsequently raised to 75° C., and then 25 parts by mass of 1H,1H,2H,2H-perfluorodecanethiol and 1 part by mass of azobisisobutyronitrile (manufactured by FUJIFILM Wako Pure Chemical Corporation) were added thereto, and stirring was continued for 5 hours. Then, the mixture was added dropwise to hexane to obtain a fluorine-based copolymer S-22 as a precipitate. After drying under reduced pressure at 60° C. for 5 hours, the precipitate was redissolved in any solvent. The obtained fluorine-based copolymer was dissolved in butyl butyrate to obtain a binder solution S-22 (concentration: 10% by mass).

Synthesis Example 27: Synthesis of Fluorine-Based Copolymer S-23 and Preparation of Binder Solution S-23

A fluorine-based copolymer S-23 was synthesized to prepare a binder solution S-23 (concentration: 10% by mass) consisting of this fluorine-based copolymer.

Specifically, 90 parts by mass of N-methylpyrrolidone and 10 parts by mass of the fluorine-based copolymer S-17 synthesized in Synthesis Example 20 were added to a 300 mL three-necked flask equipped with a reflux condenser and a gas introduction cock and dissolved. Then, 32.5 parts by mass of lauryl acrylate (manufactured by FUJIFILM Wako Pure Chemical Corporation), 17.5 parts by mass of 1H,1H, 2H,2H-tridecafluoro-n-octyl methacrylate (manufactured by Tokyo Chemical Industry Co., Ltd.), 0.1 parts by mass of copper chloride (manufactured by FUJIFILM Wako Pure Chemical Corporation), and 0.6 parts by mass of 4,4'-dimethyl-2,2'-bipyridyl were added to. After bubbling nitrogen gas for 10 minutes, nitrogen gas was introduced at a flow rate of 50 mL/min, the temperature was raised to 100° C., and stirring was continued for 10 hours. Then, the mixture was added dropwise to hexane to obtain a fluorine-based copolymer S-23 as a precipitate. After drying under reduced pressure at 60° C. for 5 hours, the precipitate was redissolved in any solvent. The obtained fluorine-based copolymer was dissolved in butyl butyrate to obtain a binder solution S-23 (concentration: 10% by mass).

Synthesis Example 28: Synthesis of Fluorine-Based Copolymer S-24 and Preparation of Binder Solution S-24

A fluorine-based copolymer S-24 was synthesized to prepare a binder solution S-24 (concentration: 10% by mass) consisting of this fluorine-based copolymer.

Specifically, 180 parts by mass of tetrahydrofuran and 20 parts by mass of the fluorine-based copolymer S-17 synthesized in Synthesis Example 20 were added to a 500 mL three-necked flask equipped with a reflux condenser. After further adding thereto 0.12 g of lithium hydroxide and 40 g of methanol, stirring was carried out at 60° C. for 6 hours. Then, the mixture was added dropwise to water, the precipitate was filtered and subjected to vacuum drying to obtain a polymer precursor A (S-24).

Next, 135 parts by mass of N-methylpyrrolidone and 15 parts by mass of the polymer precursor A (S-24) were added to a 300 mL three-necked flask equipped with a reflux condenser and a gas introduction cock and dissolved. Then, nitrogen gas was introduced at a flow rate of 200 mL/min for 10 minutes, the temperature was subsequently raised to 75° C., and then 18 parts by mass of decanedithiol and 0.9 parts by mass of azobisisobutyronitrile (manufactured by FUJIFILM Wako Pure Chemical Corporation) were added thereto, and stirring was continued for 5 hours. Then, the mixture was added dropwise to hexane to obtain a polymer precursor B (S-24) as a precipitate.

Next, 90 parts by mass of N-methylpyrrolidone and 10 parts by mass of the polymer precursor B (S-24) were added to a 300 mL three-necked flask equipped with a reflux condenser and a gas introduction cock and dissolved. Then, 2 parts by mass of lauryl acrylate (manufactured by FUJIFILM Wako Pure Chemical Corporation), 1 part by mass of 1H,1H,2H,2H-tridecafluoro-n-octyl methacrylate (manufactured by Tokyo Chemical Industry Co., Ltd.), and 0.1 parts by mass of azobisbutyronitrile (manufactured by FUJIFILM Wako Pure Chemical Corporation) were added thereto. After introducing nitrogen gas at a flow rate of 200 mL/min for 10 minutes, the temperature was raised to 75° C., and stirring was continued for 5 hours. Then, the mixture was added dropwise to hexane to obtain a fluorine-based copolymer S-24 as a precipitate. After drying under reduced pressure at 60° C. for 5 hours, the precipitate was redissolved in any solvent. The obtained fluorine-based copolymer was dissolved in butyl butyrate to obtain a binder solution S-24 (concentration: 10% by mass).

Regarding each of the synthesized polymers, the VDF amount (the content of the VDF constitutional component), the HFP amount (the content of the HFP constitutional component), the kind and the content of the other constitutional component, as well as the kind and the content of the constitutional component having a functional group are shown in Table 1. The tensile fracture strain, the mass average molecular weight, and the SP value were measured by each of the above-described methods. These results are shown in Table 1.

TABLE 1

| Co-polymer No. | VDF amount (% by mole) | HFP amount (% by mole) | Another constitutional component | | Constitutional component having functional group | | Tensile fracture strain (%) | Mass average molecular weight | SP value ($MP^{1/2}$) | Note |
|---|---|---|---|---|---|---|---|---|---|---|
| | | | | Content (% by mass) | Functional group | Content (% by mass) | | | | |
| CS-1 | 55 | 20 | TFE | 25 | — | — | 600 | 160,000 | 12.3 | Comparative Example |
| CS-2 | 94 | 6 | — | — | — | — | 400 | 180,000 | 12.6 | Comparative Example |
| S-1 | 71 | 29 | — | — | — | — | 3000 | 249,000 | 12.0 | Present invention |
| S-2 | 82 | 18 | — | — | — | — | 1200 | 220,000 | 12.4 | Comparative Example |
| S-3 | 78 | 22 | — | — | — | — | 3000 | 247,000 | 12.2 | Present invention |
| S-4 | 64 | 36 | — | — | — | — | 2700 | 372,000 | 11.4 | Present invention |
| 5-5 | 38 | 62 | — | — | — | — | 2200 | 351,000 | 11.2 | Present invention |
| S-6 | 31 | 69 | — | — | — | — | 2200 | 330,000 | 11.0 | Comparative Example |
| S-7 | 64 | 35.98 | — | — | A-2 | Carboxy group | 0.02 | 1200 | 190,000 | 11.5 | Present invention |
| S-8 | 64 | 29 | — | — | A-2 | Carboxy group | 7 | 700 | 192,000 | 12.4 | Present invention |
| S-9 | 64 | 26 | — | — | A-2 | Carboxy group | 10 | 400 | 190,000 | 13.2 | Comparative Example |
| S-10 | 64 | 16 | — | — | A-2 | Carboxy group | 20 | 320 | 180,000 | 13.6 | Comparative Example |
| S-11 | 64 | 35.98 | — | — | A-4 | Maleic acid anhydride group | 0.02 | 3100 | 299,000 | 11.5 | Present invention |
| S-12 | 64 | 35.98 | — | — | A-7 | Phosphate group | 0.02 | 2000 | 280,000 | 11.5 | Present invention |
| S-13 | 64 | 26 | — | — | A-7 | Phosphate group | 10 | 600 | 130,000 | 13.0 | Comparative Example |
| S-14 | 64 | 35.98 | — | — | A-11 | Hydroxy group | 0.02 | 1500 | 220,000 | 11.5 | Present invention |
| S-15 | 64 | 35.98 | — | — | A-15 | Heterocyclic group | 0.02 | 1800 | 240,000 | 11.5 | Present invention |
| S-16 | — | 36 | TFE | 64 | — | — | 400 | 160,000 | 12.3 | Comparative Example |
| S-17 | 78 | 22 | — | — | — | — | 3000 | 1,100,000 | 12.2 | Present invention |
| S-18 | 73 | 22 | * | 5 | — | — | 1200 | 1,050,000 | 13.4 | Present invention |
| S-19 | 75 | 22 | — | — | * | Hydroxy group | 3 | 2200 | 1,140,000 | 13.2 | Present invention |
| S-20 | 77.7 | 22 | — | — | * | Carboxy group | 0.3 | 3000 | 1,120,000 | 12.2 | Present invention |
| S-21 | 77.7 | 22 | — | — | * | Carboxy group | 0.3 | 3000 | 1.170,000 | 12.2 | Present invention |
| S-22 | 75 | 22 | — | — | * | Fluoroalkyl group | 3 | 1200 | 1,150,000 | 12.2 | Present invention |
| S-23 | 77.5 | 22 | — | — | * | Fluoroalkyl group | 0.5 | 1000 | 1,200,000 | 14.0 | Present invention |
| S-24 | 76 | 22 | — | — | * | Fluoroalkyl group | 2 | 600 | 1,180,000 | 14.0 | Present invention |
| S-25 | 68 | 22 | TFE | 10 | — | — | 2000 | 420,000 | 11.9 | Present invention |
| S-26 | 64 | 36 | — | — | — | — | 3700 | 1,720,000 | 11.4 | Present invention |

<Abbreviations in Table>

In the table, "-" in the column of the constitutional component indicates that the constitutional component does not have a corresponding constitutional component.

—Copolymerization Component—

The compound from which the copolymerization component (the other constitutional component or the constitutional component having a functional group) is derived is indicated by the number of the polymerizable compound having the above functional group.

A-2: Methacrylic acid (manufactured by Tokyo Chemical Industry Co., Ltd., SP value: 18.3)

A-4: Maleic acid anhydride (manufactured by Tokyo Chemical Industry Co., Ltd., SP value: 26.3)

A-7: 2-(methacryloyloxy)ethyl phosphate (SP value: 26.3)

A-11: 2-hydroxyethyl methacrylate (manufactured by Tokyo Chemical Industry Co., Ltd., SP value: 24.2)

A-15: Glycidyl methacrylate (manufactured by Tokyo Chemical Industry Co., Ltd., SP value: 22.2)

In the table, "*" in the column of "Constitutional component" of the copolymers S-18 to S-24 indicates the constitutional component corresponding to the one among the chemical structures of the respective copolymers. For example, in the polymer S-19, * represents a constitutional component having a hydroxyhexylthio group in the side chain.

In the column of "Functional group" of Table 1, in a case where one molecular chain (polymeric chain) has two or more kinds of functional groups, any one the functional groups thereof is described (the description of ester bond and the like are omitted).

Synthesis Example 29: Synthesis of Particulate Binder (A-1) and Preparation of Particulate Binder Dispersion Liquid A-1

In a 2 L three-necked flask equipped with a reflux condenser and a gas introduction cock, 7.2 g of a heptane solution of 40% by mass of the following macromonomer M-1, 12.4 g of methyl acrylate (MA), and 6.7 g of acrylic acid (AA), 207 g of heptane (manufactured by FUJIFILM Wako Pure Chemical Corporation), and 1.4 g of azoisobutyronitrile were added, nitrogen gas was introduced at a flow rate of 200 mL/min for 10 minutes, and then the temperature was raised to 100° C. A liquid (a liquid obtained by mixing 846 g of the heptane solution of 40% by mass of the macromonomer M-1, 222.8 g of methyl acrylate, 75.0 g of acrylic acid, 300.0 g of heptane, and 2.1 g of azoisobutyronitrile) prepared in a separate container was dropwise added thereto over 4 hours. After the dropwise addition was completed, 0.5 g of azoisobutyronitrile was added thereto. Then, the mixture was stirred at 100° C. for 2 hours, cooled to room temperature, and filtered to prepare a particulate binder dispersion liquid A-1 (concentration: 39.2% by mass) consisting of an acrylic polymer (A-1). The average particle diameter of the particulate binder in this dispersion liquid was 180 nm, and the adsorption rate $A_{SE}$ with respect to the inorganic solid electrolyte was 86%.

Synthesis Example of Macromonomer M-1

A self-condensate of 12-hydroxystearic acid (manufactured by FUJIFILM Wako Pure Chemical Corporation) (number average molecular weight in GPC polystyrene standard: 2,000) was reacted with glycidyl methacrylate (manufactured by Tokyo Chemical Industry Co., Ltd.) to form a macromonomer, which was subsequently polymerized with methyl methacrylate and glycidyl methacrylate (manufactured by Tokyo Chemical Industry Co., Ltd.) at a ratio of 1:0.99:0.01 (molar ratio) to obtain a polymer, with which acrylic acid (manufactured by FUJIFILM Wako Pure Chemical Corporation) was subsequently reacted to obtain a macromonomer M-1. The SP value of this macromonomer M-1 was 9.3, and the number average molecular weight thereof was 11,000. The SP value and the number average molecular weight of the macromonomer are values calculated according to the above methods.

Synthesis Example 30: Synthesis of Particulate Binder (A-2) and Preparation of Particulate Binder Dispersion Liquid A-2

In a 200 mL three-necked flask, 4.46 g of polyethylene glycol (product name: Polyethylene glycol 200, manufactured by FUJIFILM Wako Pure Chemical Corporation), 0.17 g of 2,2-bis (hydroxymethyl)butyric acid (manufactured by Tokyo Chemical Industry Co., Ltd.), 6.69 g of NISSO-PB GI-1000 (product name, manufactured by NIPPON SODA Co., Ltd.) was added, and the mixture was dissolved in 74 g of tetrahydrofuran (THF). To this solution, 6.98 g of diphenylmethane diisocyanate (manufactured by FUJIFILM Wako Pure Chemical Corporation) was added and stirred at 60° C. to be uniformly dissolved. To the obtained solution, 560 mg of Neostan U-600 (product name, manufactured by Nitto Kasei Co., Ltd.) was added and stirred at 60° C. for 5 hours to obtain a THF solution (a polymer solution) of 20% by mass of a polyurethane (A-2).

Next, 74 g of THF was added to a solution of the polymer solution obtained as described above to obtain a solution, to which 222 g of heptane was subsequently added dropwise over 10 minutes with stirring at 150 rpm to obtain an emulsified liquid of the polyurethane (A-2). This emulsified liquid was heated at 85° C. for 120 minutes while allowing nitrogen gas to flow. 50 g of heptane was added to the obtained residue, and further heated at 85° C. for 60 minutes. This operation was repeated 4 times to remove THF. In this manner, a heptane dispersion liquid A-2 (concentration: 3.3% by mass) of a particulate binder consisting of the polyurethane (A-2) was obtained. The average particle diameter of the particulate binder in this dispersion liquid was 90 nm, and the adsorption rate $A_{SE}$ with respect to the inorganic solid electrolyte was 50%.

Synthesis Example 31: Synthesis of Polymer S-A1 (Preparation of Binder Solution S-A1)

A polymer S-A1 was synthesized to prepare a butyl butyrate solution S-A1 of this polymer.

To a 100 mL volumetric flask, 11.9 g of styrene (manufactured by FUJIFILM Wako Pure Chemical Corporation), 17.9 g of dodecyl acrylate (manufactured by Tokyo Chemical Industry Co., Ltd.), 0.187 g of maleic acid anhydride (manufactured by FUJIFILM Wako Pure Chemical Corporation), and 0.36 g of a polymerization initiator V-601 (product name, manufactured by FUJIFILM Wako Pure Chemical Corporation) were added and dissolved in 36 g of butyl butyrate to prepare a monomer solution.

To a 300 mL three-necked flask, 18 g of butyl butyrate was added and stirred at 80° C., and then the above monomer solution was added dropwise thereto over 2 hours. After completion of the dropwise addition, the temperature was raised to 90° C., and stirring was further carried out for 2 hours to synthesize a polymer S-A1 (a vinyl polymer), whereby a binder solution S-A1 (concentration: 40% by mass) consisting of the polymer S-A1 was obtained.

The SP value of the polymer S-A1 was 19.2 $MPa^{1/2}$, the mass average molecular weight thereof was 67,000, and the adsorption rate $A_{SE}$ of this binder with respect to the inorganic solid electrolyte was 0%.

Synthesis Example 32: Synthesis of SEBS (S-A2) and Preparation of Binder Solution S-A2

SEBS (S-A2) was synthesized to prepare a binder solution S-A2 consisting of this SEBS.

Specifically, 150 parts by mass of toluene, 30 parts by mass of styrene, 24 parts by mass of ethylene, and 46 parts by mass of 1,3-butadiene were added, and 1 part by mass of a polymerization initiator V-601 (manufactured by FUJIFILM Wako Pure Chemical Corporation) was added to an autoclave. The temperature was raised to 80° C., and stirring was carried out for 3 hours. Then, the temperature was raised to 90° C., and the reaction was carried out until the addition conversion rate reached 100%. The obtained solution was reprecipitated in methanol, and the obtained solid was dried to obtain a target polymer. The mass average molecular weight of this polymer was 83,000. Then, 50 parts by mass of the polymer obtained above was dissolved in 50 parts by mass of cyclohexane and 150 parts by mass of tetrahydrofuran (THF), and then the solution was brought to 70° C. 3 parts by mass of n-butyl lithium, 3 parts by mass of 2,6-di-t-butyl-p-cresol, 1 part by mass of bis(cyclopentadienyltitanium dichloride, and 2 parts by mass of diethyl aluminum chloride were added thereto, and the resultant mixture was subjected to the reaction at a hydrogen pressure of 10 $kg/cm^2$ for 1 hour, distilled off, and dried to obtain SEBS (S-A2). The SEBS (S-A2) was a random copolymer, and the mass average molecular weight thereof was 83,000.

The obtained SEBS (S-A2) was dissolved in butyl butyrate to prepare a binder solution S-A2 having a concentration of 10% by mass.

The styrene amount of the polymer S-A2 was 23.8% by mole, the SP value thereof was 17.9 $MPa^{1/2}$, and the adsorption rate $A_{SE}$ of this binder with respect to the inorganic solid electrolyte was 0%.

Synthesis Example 33: Synthesis of SEBS (S-A3) and Preparation of Binder Solution S-A3

In Synthesis Example 31, 3 parts by mass of 2,6-di-t-butyl-p-cresol and 0.3 parts by mass of maleic acid anhydride were added with respect to 100 parts by mass of the polymer obtained by reprecipitation, and the resultant mixture was subjected to the reaction at 180° C. for 5 hours. The obtained solution was reprecipitated in methanol, and the obtained solid was dried to obtain a target polymer. The mass average molecular weight of this polymer was 89,000. Then, 50 parts by mass of the polymer obtained above was dissolved in 50 parts by mass of cyclohexane and 150 parts by mass of THF (tetrahydrofuran), and then the solution was brought to 70° C., and 3 parts by mass of n-butyl lithium, 2,6-di. 3 parts by mass of -t-butyl-p-cresol, 1 part by mass of bis (cyclopentadienyl) titanium dichloride, and 2 parts by mass of diethyl aluminum chloride were added, reacted at a hydrogen pressure of 10 $kg/cm^2$ for 1 hour, distilled off, and dried. SEBS (S-A3) was obtained. The SEBS (S-A3) was a random copolymer, and the mass average molecular weight thereof was 89,000.

The obtained SEBS (S-A3) was dissolved in butyl butyrate to prepare a binder solution S-A3 having a concentration of 10% by mass.

The styrene amount of the polymer S-A3 was 23.8% by mole, the SP value thereof was 17.9 MPa$^{1/2}$, and the adsorption rate $A_{SE}$ of this binder with respect to the inorganic solid electrolyte was 2%.

2. Synthesis of Sulfide-Based Inorganic Solid Electrolyte

Synthesis Example A

A sulfide-based inorganic solid electrolyte was synthesized with reference to a non-patent document of T. Ohtomo, A. Hayashi, M. Tatsumisago, Y. Tsuchida, S. Hama, K. Kawamoto, Journal of Power Sources, 233, (2013), pp. 231 to 235 and A. Hayashi, S. Hama, H. Morimoto, M. Tatsumisago, T. Minami, Chem. Lett., (2001), pp. 872 and 873.

Specifically, in a globe box under an argon atmosphere (dew point: −70° C.), lithium sulfide ($Li_2S$, manufactured by Sigma-Aldrich Co., LLC Co., LLC Co., LLC, purity: >99.98%) (2.42 g) and diphosphorus pentasulfide ($P_2S_5$, manufactured by Sigma-Aldrich Co., LLC Co., LLC Co., LLC, purity: >99%) (3.90 g) each were weighed, put into an agate mortar, and mixed using an agate muddler for five minutes. The mixing ratio between $Li_2S$ and $P_2S_5$ ($Li_2S$:$P_2S_5$) was set to 75:25 in terms of molar ratio.

Next, 66 g of zirconia beads having a diameter of 5 mm were put into a 45 mL container made of zirconia (manufactured by FRITSCH), the entire amount of the mixture of the above lithium sulfide and the diphosphorus pentasulfide was put thereinto, and the container was completely sealed in an argon atmosphere. The container was set in a planetary ball mill P-7 (product name, manufactured by FRITSCH), mechanical milling was carried out at a temperature of 25° C. and a rotation speed of 510 rpm for 20 hours, thereby obtaining yellow powder (6.20 g) of a sulfide-based inorganic solid electrolyte (Li—P—S-based glass, hereinafter, may be referred to as LPS). The particle diameter of the Li—P—S-based glass was 15 μm.

Example 1

<Preparation of Inorganic Solid Electrolyte-Containing Composition>

60 g of zirconia beads having a diameter of 5 mm was put into a 45 mL container made of zirconia (manufactured by FRITSCH), and 2.8 g of LPS synthesized in Synthesis Example A described above, 0.08 g or 0.04 g (in terms of solid content mass) of the fluorine-containing binder solution which satisfies the content shown in Table 2-2, and furthermore, in a case where 0.04 g of the fluorine-containing binder solution was used, 0.04 g (in terms of solid content mass) of the particulate binder dispersion liquid shown in Table 2-2 and butyl butyrate as a dispersion medium were further put thereinto so that the content of butyl butyrate in the composition was 50% by mass. Then, this container was set in a planetary ball mill P-7 (product name) manufactured by FRITSCH. The inorganic solid electrolyte-containing compositions (slurries) SE-1 to SE-4 were prepared by mixing at a temperature of 25° C. and a rotation speed of 150 rpm for 10 minutes.

<Preparation of Composition for Positive Electrode>

60 g of zirconia beads having a diameter of 5 mm were put into a 45 mL container made of zirconia (manufactured by FRITSCH), and 2.8 g of LPS synthesized in Synthesis Example A and the dispersion medium shown in Table 2-1 as a dispersion medium were put thereinto so that the content of the dispersion medium in the composition of was 50% by mass. The container was set in a planetary ball mill P-7 (product name, manufactured by FRITSCH) and the components were stirred for 30 minutes at 25° C. and a rotation speed of 200 rpm. Then, into this container, 13.2 g of NMC (manufactured by Sigma-Aldrich Co., LLC) as the positive electrode active material, 0.32 g of acetylene black (AB) as the conductive auxiliary agent, 0.16 g or 0.08 (in terms of solid content mass) of the fluorine-containing binder solution shown in Table 2-1, and in a case where 0.08 g of a chain polymerization polymer binder solution was used, 0.08 g (in terms of solid content mass) of the particulate binder dispersion liquid or the fluorine-containing binder solution shown in Table 2-1 were further put, the container was set in a planetary ball mill P-7, mixing was continued at a temperature of 25° C. and a rotation speed of 200 rpm for 30 minutes to prepare compositions P-1 to P-24 for a positive electrode (slurries).

In the composition for an electrode P-24 for a positive electrode, the average particle diameter of the polymer binder consisting of the polymer S-26 was 890 nm.

<Preparation of Composition for Negative Electrode>

60 g of zirconia beads having a diameter of 5 mm was put into a 45 mL container made of zirconia (manufactured by FRITSCH), and 2.8 g of LPS synthesized in Synthesis Example A, 0.067 g or 0.034 g (in terms of solid content mass) of the fluorine-containing binder solution shown in Table 2-2, and furthermore, in a case where 0.034 g of the fluorine-containing binder solution was used, 0.034 g (in terms of solid content mass) of the particulate binder dispersion liquid shown in Table 2-2 and the dispersion medium shown in Table 2-2 were further added to the container so that the content of the dispersion medium in the composition was 50% by mass. The container was set in a planetary ball mill P-7 (product name, manufactured by FRITSCH) and the components were mixed for 60 minutes at a temperature of 25° C. and a rotation speed of 300 rpm. Then, 3.53 g of silicon (Si, manufactured by Sigma-Aldrich Co., LLC) as the negative electrode active material and 0.27 g of VGCF (manufactured by Showa Denko K.K.) as the conductive auxiliary agent were put into the container. Similarly, the container was subsequently set in a planetary ball mill P-7, and mixing was carried out at 25° C. for 10 minutes at a rotation speed of 100 rpm to prepare each of compositions (slurries) N-1 to N-17 for a negative electrode.

Regarding each of the fluorine-containing binders prepared in Synthesis Examples, the adsorption rate $A_{SE}$ with respect to the inorganic solid electrolyte (the inorganic solid electrolyte used for the preparation of each of the compositions) shown in Table 2-1 and Table 2-2 (collectively referred to as Table 2), the adsorption rate $A_{AM}$ with respect to the active material (the active material used for the preparation of each of the compositions) shown in the same table, and the peel strength with respect to the aluminum foil were measured. Both adsorption rates were measured by the following method, and the peel strength was measured by the above method. In addition, regarding each of the compositions, the difference (in terms of absolute value) between the SP value of the fluorine-based copolymer that forms the fluorine-containing binder and the SP value of the dispersion medium was calculated. These results are shown in Table 2. Further, the form (dissolved or particulate) of the fluorine-containing binder in the composition is shown. It is noted that in the compositions P-21 to P-23 for a positive electrode, the chain polymerization polymer binder was dissolved in the dispersion medium.

In Table 2, the content of the dispersion medium indicates the content in the entire composition, and the content of another component (the solid particles) indicates the content in the solid content of 100% by mass in the composition. The unit is % by mass in any case: however, the description thereof is omitted in Table 2.

Table 2 shows the SP values of the fluorine-based copolymer and the dispersion medium that form the fluorine-containing binder. The units of the SP value and the difference (in terms of absolute value) in SP value are $MPa^{1/2}$: however, the description thereof is omitted in Table 2.

[Measurement of Adsorption Rate $A_{SE}$ of Polymer Binder with Respect to Inorganic Solid Electrolyte]

The adsorption rate $A_{SE}$ was measured using the inorganic solid electrolyte, the polymer binder, and the dispersion medium, which had been used in the preparation of each of the inorganic solid electrolyte-containing compositions shown in Table 2.

That is, the polymer binder was dissolved in a dispersion medium to prepare a binder solution having a concentration of 1% by mass. The binder solution and the inorganic solid electrolyte were put into a 15 ml of vial at a proportion such that the ratio of the polymer binder in this binder solution to the inorganic solid electrolyte was 42:1, and stirred for 1 hour with a mix rotor at room temperature and a rotation speed of 80 rpm, and then allowed to stand.

The supernatant obtained by solid-liquid separation was filtered through a filter having a pore diameter of 1 μm, and the entire amount of the obtained filtrate was dried to be solid, and then the mass of the polymer binder dissolved in the filtrate (the mass of the polymer binder that had not adsorbed to the inorganic solid electrolyte) $W_A$ was measured. From this mass $W_A$ and the mass $W_B$ of the polymer binder contained in the binder solution used for the measurement, the adsorption rate of the polymer binder with respect to the inorganic solid electrolyte was calculated according to the following expression.

The adsorption rate $A_{SE}$ of the polymer binder is the average value of the adsorption rates obtained by carrying out the above measurement twice.

Adsorption rate (%)=$[(W_B-W_A)/W_B]\times 100$

It is noted that as a result of measuring the adsorption rate $A_{SE}$ using the inorganic solid electrolyte and the polymer binder, which had been extracted from the inorganic solid electrolyte layer formed into a film, and the dispersion medium which had been used for the preparation of the inorganic solid electrolyte-containing composition, the same value was obtained.

[Measurement of Adsorption Rate $A_{AM}$ of Polymer Binder with Respect to Active Material]

The adsorption rate $A_{AM}$ was measured using the active material, the polymer binder, and the dispersion medium, which had been used in the preparation of each of the compositions for an electrode shown in Table 2.

The adsorption rate $A_{AM}$ was measured in the same manner as in "Measurement of adsorption rate $A_{SE}$" described above, except that in "Measurement of adsorption rate $A_{SE}$" described above, the active material was used instead of the inorganic solid electrolyte.

It is noted that as a result of measuring the adsorption rate $A_{AM}$ using the active material and the polymer binder, which had been extracted from the active material layer formed into a film, and the dispersion medium which had been used for the preparation of the electrode composition, the same value was obtained.

TABLE 2-1

| | Inorganic solid electrolyte | | Polymer binder | | | Particulate binder | | Chain polymerization type polymer | | Dispersion medium | | |
|---|---|---|---|---|---|---|---|---|---|---|---|---|
| No. | Kind | Content | Solution | SP value | Content | Dispersion liquid | Content | Solution | Content | Kind | SP value | Content |
| P-1 | LPS | 17 | CS-1 | 12.3 | 1 | — | — | — | — | Butyl butyrate | 18.6 | 50 |
| P-2 | LPS | 17 | CS-2 | 12.6 | 1 | — | — | — | — | Butyl butyrate | 18.6 | 50 |
| P-3 | LPS | 17 | S-1 | 12.0 | 1 | — | — | — | — | Butyl butyrate | 18.6 | 50 |
| P-4 | LPS | 17 | S-2 | 12.4 | 1 | — | — | — | — | Butyl butyrate | 18.6 | 50 |
| P-5 | LPS | 17 | S-3 | 12.2 | 1 | — | — | — | — | Butyl butyrate | 18.6 | 50 |
| P-6 | LPS | 17 | S-4 | 11.4 | 1 | — | — | — | — | Butyl butyrate | 18.6 | 50 |
| P-7 | LPS | 17 | S-5 | 11.2 | 1 | — | — | — | — | Butyl butyrate | 18.6 | 50 |
| P-8 | LPS | 17 | S-6 | 11.0 | 1 | — | — | — | — | Butyl butyrate | 18.6 | 50 |
| P-9 | LPS | 17 | S-7 | 11.5 | 1 | — | — | — | — | Butyl butyrate | 18.6 | 50 |
| P-10 | LPS | 17 | S-8 | 12.4 | 1 | — | — | — | — | Butyl butyrate | 18.6 | 50 |
| P-11 | LPS | 17 | S-9 | 13.2 | 1 | — | — | — | — | Butyl butyrate | 18.6 | 50 |
| P-12 | LPS | 17 | S-10 | 13.6 | 1 | — | — | — | — | Butyl butyrate | 18.6 | 50 |
| P-13 | LPS | 17 | S-11 | 11.5 | 1 | — | — | — | — | Butyl butyrate | 18.6 | 50 |
| P-14 | LPS | 17 | S-11 | 11.5 | 0.5 | A-1 | 0.5 | — | — | Butyl butyrate | 18.6 | 50 |
| P-15 | LPS | 17 | S-11 | 11.5 | 0.5 | A-2 | 0.5 | — | — | Butyl butyrate | 18.6 | 50 |

TABLE 2-1-continued

| P-16 | LPS | 17 | S-12 | 11.5 | 1 | — | — | — | — | Butyl butyrate | 18.6 | 50 |
| P-17 | LPS | 17 | S-13 | 13.0 | 1 | — | — | — | — | Butyl butyrate | 18.6 | 50 |
| P-18 | LPS | 17 | S-14 | 11.5 | 1 | — | — | — | — | Butyl butyrate | 18.6 | 50 |
| P-19 | LPS | 17 | S-15 | 11.5 | 1 | — | — | — | — | Butyl butyrate | 18.6 | 50 |
| P-20 | LPS | 17 | S-16 | 12.3 | 1 | — | — | — | — | Butyl butyrate | 18.6 | 50 |
| P-21 | LPS | 17 | S-11 | 11.5 | 0.5 | — | — | S-A1 | 0.5 | Butyl butyrate | 18.6 | 50 |
| P-22 | LPS | 17 | S-11 | 11.5 | 0.5 | — | — | S-A2 | 0.5 | Butyl butyrate | 18.6 | 50 |
| P-23 | LPS | 17 | S-11 | 11.5 | 0.5 | — | — | S-A3 | 0.5 | Butyl butyrate | 18.6 | 50 |
| P-24 | LPS | 17 | S-26 | 11.4 | 1 | — | — | — | — | Butyl butyrate | 18.6 | 50 |

| | Active material | | Conductive auxiliary agent | | Adsorption rate (%) | | SP value difference | Peel strength (N/mm) | Form | Composition | Note |
|---|---|---|---|---|---|---|---|---|---|---|---|
| No. | Kind | Content | Kind | Content | $A_{SE}$ | $A_{AM}$ | | | | | |
| P-1 | NMC | 80 | AB | 2 | 0 | 0 | 6.3 | 0.05 | Dissolved | For positive electrode | Comparative Example |
| P-2 | NMC | 80 | AB | 2 | 0 | 0 | 6.0 | 0.05 | Dissolved | For positive electrode | Comparative Example |
| P-3 | NMC | 80 | AB | 2 | 0 | 0 | 6.6 | 0.2 | Dissolved | For positive electrode | Present invention |
| P-4 | NMC | 80 | AB | 2 | 0 | 0 | 6.2 | 0.2 | Dissolved | For positive electrode | Comparative Example |
| P-5 | NMC | 80 | AB | 2 | 0 | 0 | 6.4 | 0.2 | Dissolved | For positive electrode | Present invention |
| P-6 | NMC | 80 | AB | 2 | 0 | 0 | 7.2 | 0.2 | Dissolved | For positive electrode | Present invention |
| P-7 | NMC | 80 | AB | 2 | 0 | 0 | 7.4 | 0.2 | Dissolved | For positive electrode | Present invention |
| P-8 | NMC | 80 | AB | 2 | 0 | 0 | 7.6 | 0.2 | Dissolved | For positive electrode | Comparative Example |
| P-9 | NMC | 80 | AB | 2 | 2 | 3 | 7.1 | 0.3 | Dissolved | For positive electrode | Present invention |
| P-10 | NMC | 80 | AB | 2 | 56 | 60 | 6.2 | 0.4 | Dissolved | For positive electrode | Present invention |
| P-11 | NMC | 80 | AB | 2 | 58 | 65 | 5.4 | 0.4 | Dissolved | For positive electrode | Comparative Example |
| P-12 | NMC | 80 | AB | 2 | 74 | 90 | 5.0 | 0.7 | Dissolved | For positive electrode | Comparative Example |
| P-13 | NMC | 80 | AB | 2 | 1 | 1 | 7.1 | 0.2 | Dissolved | For positive electrode | Present invention |
| P-14 | NMC | 80 | AB | 2 | 1 | 1 | 7.1 | 0.2 | Dissolved | For positive electrode | Present invention |
| P-15 | NMC | 80 | AB | 2 | 1 | 1 | 7.1 | 0.2 | Dissolved | For positive electrode | Present invention |
| P-16 | NMC | 80 | AB | 2 | 5 | 12 | 7.1 | 0.2 | Dissolved | For positive electrode | Present invention |
| P-17 | NMC | 80 | AB | 2 | 65 | 85 | 5.6 | 0.5 | Dissolved | For positive electrode | Comparative Example |
| P-18 | NMC | 80 | AB | 2 | 3 | 0 | 7.1 | 0.2 | Dissolved | For positive electrode | Present invention |
| P-19 | NMC | 80 | AB | 2 | 1 | 0 | 7.1 | 0.2 | Dissolved | For positive electrode | Present invention |
| P-20 | NMC | 80 | AB | 2 | 0 | 0 | 6.3 | 0.2 | Dissolved | For positive electrode | Comparative Example |
| P-21 | NMC | 80 | AB | 2 | 1 | 1 | 7.1 | 0.2 | Dissolved | For positive electrode | Present invention |
| P-22 | NMC | 80 | AB | 2 | 1 | 1 | 7.1 | 0.2 | Dissolved | For positive electrode | Present invention |
| P-23 | NMC | 80 | AB | 2 | 1 | 1 | 7.1 | 0.2 | Dissolved | For positive electrode | Present invention |
| P-24 | NMC | 80 | AB | 2 | 0 | 0 | 7.2 | 0.2 | Particulate | For positive electrode | Present invention |

TABLE 2-2

| No. | Inorganic solid electrolyte Kind | Inorganic solid electrolyte Content | Polymer binder Solution | Polymer binder SP value | Polymer binder Content | Particulate binder Dispersion liquid | Particulate binder Content | Dispersion medium Kind | Dispersion medium SP value | Dispersion medium Content | Active material Kind | Active material Content |
|---|---|---|---|---|---|---|---|---|---|---|---|---|
| N-1 | LPS | 42 | S-10 | 13.6 | 1 | — | — | Butyl butyrate | 18.6 | 50 | Si | 53 |
| N-2 | LPS | 42 | S-7 | 11.5 | 1 | — | — | Butyl butyrate | 18.6 | 50 | Si | 53 |
| N-3 | LPS | 42 | S-7 | 11.5 | 0.5 | A-1 | 0.5 | Butyl butyrate | 18.6 | 50 | Si | 53 |
| N-4 | LPS | 42 | S-7 | 11.5 | 0.5 | A-2 | 0.5 | Butyl butyrate | 18.6 | 50 | Si | 53 |
| N-5 | LPS | 42 | S-17 | 12.2 | 1 | — | — | Butyl butyrate | 18.6 | 50 | Si | 53 |
| N-6 | LPS | 42 | S-18 | 13.4 | 1 | — | — | Butyl butyrate | 18.6 | 50 | Si | 53 |
| N-7 | LPS | 42 | S-19 | 13.2 | 1 | — | — | Butyl butyrate | 18.6 | 50 | Si | 53 |
| N-8 | LPS | 42 | S-20 | 12.2 | 1 | — | — | Butyl butyrate | 18.6 | 50 | Si | 53 |
| N-9 | LPS | 42 | S-21 | 12.2 | 1 | — | — | Butyl butyrate | 18.6 | 50 | Si | 53 |
| N-10 | LPS | 42 | S-22 | 12.2 | 1 | — | — | Butyl butyrate | 18.6 | 50 | Si | 53 |
| N-11 | LPS | 42 | S-23 | 14.0 | 1 | — | — | Butyl butyrate | 18.6 | 50 | Si | 53 |
| N-12 | LPS | 42 | S-24 | 14.0 | 1 | — | — | Butyl butyrate | 18.6 | 50 | Si | 53 |
| N-13 | LPS | 35 | S-10 | 13.6 | 1 | — | — | Butyl butyrate | 18.6 | 55 | Gr | 64 |
| N-14 | LPS | 35 | S-17 | 12.2 | 1 | — | — | Butyl butyrate | 18.6 | 55 | Gr | 64 |
| N-15 | LPS | 35 | S-17 | 12.2 | 0.5 | A-1 | 0.5 | Butyl butyrate | 18.6 | 55 | Gr | 64 |
| N-16 | LPS | 35 | S-25 | 11.9 | 1 | — | — | Butyl butyrate | 18.6 | 55 | Gr | 64 |
| N-17 | LPS | 35 | S-25 | 11.9 | 0.5 | A-1 | 0.5 | Butyl butyrate | 18.6 | 55 | Gr | 64 |
| SE-1 | LPS | 97 | S-10 | 13.6 | 3 | — | — | Butyl butyrate | 18.6 | 50 | — | — |
| SE-2 | LPS | 97 | S-7 | 11.5 | 3 | — | — | Butyl butyrate | 18.6 | 50 | — | — |
| SE-3 | LPS | 97 | S-7 | 11.5 | 1.5 | A-1 | 1.5 | Butyl butyrate | 18.6 | 50 | — | — |
| SE-4 | LPS | 97 | S-7 | 11.5 | 1.5 | A-2 | 1.5 | Butyl butyrate | 18.6 | 50 | — | — |

| No. | Conductive auxiliary agent Kind | Conductive auxiliary agent Content | Adsorption rate (%) $A_{SE}$ | Adsorption rate (%) $A_{AM}$ | SP value difference | Peel strength (N/mm) | Form | Composition | Note |
|---|---|---|---|---|---|---|---|---|---|
| N-1 | VGCF | 4 | 74 | 90 | 5.0 | 0.7 | Dissolved | For negative electrode | Comparative Example |
| N-2 | VGCF | 4 | 2 | 3 | 7.1 | 0.2 | Dissolved | For negative electrode | Present invention |
| N-3 | VGCF | 4 | 2 | 3 | 7.1 | 0.2 | Dissolved | For negative electrode | Present invention |
| N-4 | VGCF | 4 | 2 | 3 | 7.1 | 0.2 | Dissolved | For negative electrode | Present invention |
| N-5 | VGCF | 4 | 0 | 0 | 6.4 | 0.5 | Dissolved | For negative electrode | Present invention |
| N-6 | VGCF | 4 | 0 | 0 | 5.2 | 0.4 | Dissolved | For negative electrode | Present invention |
| N-7 | VGCF | 4 | 9 | 4 | 5.4 | 0.7 | Dissolved | For negative electrode | Present invention |
| N-8 | VGCF | 4 | 3 | 5 | 6.4 | 0.5 | Dissolved | For negative electrode | Present invention |
| N-9 | VGCF | 4 | 5 | 8 | 6.4 | 0.5 | Dissolved | For negative electrode | Present invention |
| N-10 | VGCF | 4 | 0 | 0 | 6.4 | 0.4 | Dissolved | For negative electrode | Present invention |
| N-11 | VGCF | 4 | 0 | 0 | 4.6 | 0.4 | Dissolved | For negative electrode | Present invention |
| N-12 | VGCF | 4 | 0 | 0 | 4.6 | 0.4 | Dissolved | For negative electrode | Present invention |
| N-13 | — | — | 74 | 90 | 5.0 | 0.7 | Dissolved | For negative electrode | Comparative Example |
| N-14 | — | — | 0 | 0 | 6.4 | 0.5 | Dissolved | For negative electrode | Present invention |
| N-15 | — | — | 0 | 0 | 6.4 | 0.5 | Dissolved | For negative electrode | Present invention |
| N-16 | — | — | 0 | 0 | 6.7 | 0.5 | Dissolved | For negative electrode | Present invention |
| N-17 | — | — | 0 | 0 | 6.7 | 0.5 | Dissolved | For negative electrode | Present invention |
| SE-1 | — | — | 74 | — | 5.0 | 0.7 | Dissolved | For SES layer | Comparative Example |
| SE-2 | — | — | 2 | — | 7.1 | 0.2 | Dissolved | For SES layer | Present invention |
| SE-3 | — | — | 2 | — | 7.1 | 0.2 | Dissolved | For SES layer | Present invention |
| SE-4 | — | — | 2 | — | 7.1 | 0.2 | Dissolved | For SES layer | Present invention |

[]<Abbreviations or the like in Table>
The content in any case is in terms of the mass ratio (% by mass) of the composition in the solid content.
LPS: LPS synthesized in Synthesis Example A
NMC: $LiNi_{1/3}Co_{1/3}Mn_{1/3}O_2$
Si: Silicon
Gr: Graphite (CGB20, manufactured by Nippon Graphite Industries, Co., Ltd., average particle diameter: 20 μm)
AB: Acetylene black
VGCF: Carbon nanotube (manufactured by Showa Denko K.K.)
Composition for SE layer: Composition for solid electrolyte layer <Production of Solid Electrolyte Sheet for all-Solid State Secondary Battery>

Each of the above-described inorganic solid electrolyte-containing compositions SE-1 to SE-4 was applied onto an aluminum foil having a thickness of 20 μm using a baker type applicator (product name: SA-201, manufactured by Tester Sangyo Co., Ltd.), and heating was carried out at 80° C. for 2 hours to dry (remove the dispersion medium) the inorganic solid electrolyte-containing composition. Then, using a heat press machine, the inorganic solid electrolyte-containing composition dried at a temperature of 120° C. and a pressure of 40 MPa for 10 seconds was heated and pressurized to produce each of solid electrolyte sheets SE-1 to SE-4 for an all-solid state secondary battery. The film thickness of the solid electrolyte layer was 50 μm.

<Production of Positive Electrode Sheet for all-Solid State Secondary Battery>

Each of the obtained compositions P-1 to P-24 for a positive electrode was applied onto an aluminum foil having a thickness of 20 μm by using a baker type applicator (product name: SA-201), heating was carried out at 80° C. for 1 hour, and then heating was further carried out at 110° C. for 1 hour to dry (to remove the dispersion medium) the composition for a positive electrode. Then, using a heat press machine, the dried composition for a positive electrode was pressurized (10 MPa, 1 minute) at 25° C. to produce each of positive electrode sheets P-1 to P-24 for an all-solid state secondary battery, having a positive electrode active material layer having a film thickness of 100 µm.

<Production of Negative Electrode Sheet for all-Solid State Secondary Battery>

Each of the compositions N-1 to N-17 for a negative electrode was applied onto a copper foil having a thickness of 20 µm by using a baker type applicator (product name: SA-201), heating was carried out at 80° C. for 1 hour, and then heating was further carried out at 110° C. for 1 hour to dry (to remove the dispersion medium) the composition for a negative electrode. Then, using a heat press machine, the dried composition for a negative electrode was pressurized (10 MPa, 1 minute) at 25° C. to produce each of negative electrode sheets N-1 to N-17 for an all-solid state secondary battery, having a negative electrode active material layer having a film thickness of 70 µm.

<Evaluation 1: Dispersion Stability>

Each of the prepared compositions was placed in a glass test tube having a diameter of 10 mm and a height of 4 cm up to a height of 4 cm and allowed to stand at 25° C. for 24 hours. The solid content reduction rate for the upper 30% (height) of the slurry before and after standing was calculated from the following formula. The ease of sedimentation (precipitation) of the inorganic solid electrolyte and the active material was evaluated as the dispersion stability of the composition depending on which of the following evaluation standard the solid content reduction rate was included in. In this test, the smaller the solid content reduction rate, the better the dispersion stability, and the evaluation standard "F" or higher is the pass level. The results are shown in Table 3.

Solid content reduction rate (%)=[(solid content concentration of upper 30% before standing-solid content concentration of upper 30% after standing)/solid content concentration of upper 30% before standing]×100

—Evaluation Standards—
  A: Solid content reduction rate<1%
  B: 1%≤solid content reduction rate<10%
  C: 10%≤solid content reduction rate<20%
  D: 20%≤solid content reduction rate<30%
  E: 30%≤solid content reduction rate<40%
  F: 40%≤solid content reduction rate<50%
  G: 50%≤solid content reduction rate <Evaluation 2: Handleability>

In the same manner as each of the prepared compositions, the same mixing proportion was used except for the dispersion medium and the amount of the dispersion medium reduced, whereby a slurry having a solid content concentration of 75% by mass was prepared. A 2 mL poly dropper (manufactured by atect Corporation) was arranged vertically so that 10 mm of the tip thereof was positioned below the slurry interface, and the slurry was aspirated at 25° C. for 10 seconds, and the mass W of the poly dropper containing the aspirated slurry was measured. In a case where the tare weight (the empty weight) of the poly dropper is denoted by $W_0$, it was determined that the slurry can not be aspirated by the dropper in a case where the slurry mass $W-W_0$ is less than 0.1 g. In a case where the slurry could not be aspirated with a dropper, the upper limit solid content concentration at which the slurry can be aspirated with a dropper was estimated while gradually adding the dispersion medium. The handleability (the extent to which an appropriate viscosity suitable for forming a flat constitutional layer having a good surface property can be obtained) of the composition was evaluated by determining where the obtained upper limit solid content concentration is included in any of the following evaluation standards. 0.30 g of the prepared slurry was placed on an aluminum cup and heated at 120° C. for 2 hours to distill off the dispersion medium, and the solid content concentration was calculated.

In this test, it is indicated that the higher the upper limit solid content concentration is, the better the handleability is, and the evaluation standard "F" or higher is the pass level. The results are shown in Table 3.

—Evaluation Standards—
  A: Upper limit solid content concentration≥70% by mass
  B: 70% by mass>upper limit solid content concentration≥60% by mass
  C: 60% by mass>upper limit solid content concentration≥50% by mass
  D: 50% by mass>upper limit solid content concentration≥40% by mass
  E: 40% by mass>upper limit solid content concentration≥30% by mass
  F: 30% by mass>upper limit solid content concentration≥20% by mass
  G: 20% by mass>upper limit solid content concentration <Evaluation 3: Adhesiveness of Collector (Vibration Test)>

A disk-shaped test piece obtained by punching the prepared negative electrode sheet for an all-solid state secondary battery or a positive electrode sheet for an all-solid state secondary battery into a disk shape having a diameter of 10 mm was placed on the bottom surface of a 15 mL vial (inner diameter: 20 mm) without fixing the disk-shaped test piece so that the active material layer was on the upper side, and sealed. This vial was fixed in a test tube mixer (product name: Delta Mixer Se-40, TIETECH Co., Ltd.) and vibrated for 30 seconds (total number of vibrations: 1,400 vibrations) at an amplitude of 5 mm.

For the disk-shaped test piece taken out from the vial after this vibration test, the peeling rate of the active material layer (the chipped active material layer) peeled from the collector was calculated from the following formula. The adhesiveness of the collector was evaluated based on which of the following evaluation standard the obtained peeling rate was included. In this test, the smaller the peeling rate, the higher the adhesiveness between the collector and the active material, indicating that the adhesiveness to the collector is excellent, and the evaluation standard "F" or higher is the pass level. The results are shown in Table 3.

peeling rate (%)=[total area of peeled active material layer (projected area)/area before vibration test]×100

—Evaluation Standards—
  A: 0%=peeling rate
  B: 0%<peeling rate<10%
  C: 10%≤peeling rate<30%
  D: 30%≤peeling rate<50%
  E: 50%≤peeling rate<70%
  F: 70%≤peeling rate<90%
  G: 90%≤peeling rate

TABLE 3

| | No. | Dispersion stability | Handleability | Adhesiveness of collector | Note |
|---|---|---|---|---|---|
| Positive electrode | P-1 | G | G | G | Comparative Example |
| | P-2 | G | G | G | Comparative Example |
| | P-3 | E | E | D | Present invention |
| | P-4 | G | G | G | Comparative Example |
| | P-5 | F | F | F | Present invention |
| | P-6 | D | D | D | Present invention |
| | P-7 | C | C | C | Present invention |
| | P-8 | G | G | E | Comparative Example |
| | P-9 | B | A | A | Present invention |
| | P-10 | E | E | E | Present invention |
| | P-11 | G | G | F | Comparative Example |
| | P-12 | G | G | D | Comparative Example |
| | P-13 | B | A | A | Present invention |
| | P-14 | A | A | A | Present invention |
| | P-15 | A | A | A | Present invention |
| | P-16 | B | A | A | Present invention |
| | P-17 | G | G | E | Comparative Example |
| | P-18 | C | B | A | Present invention |
| | P-19 | C | A | A | Present invention |
| | P-20 | G | F | G | Comparative Example |
| | P-21 | A | A | A | Present invention |
| | P-22 | A | A | A | Present invention |
| | P-23 | A | A | A | Present invention |
| | P-24 | F | E | F | Present invention |
| Negative electrode | N-1 | G | G | G | Comparative Example |
| | N-2 | C | C | A | Present invention |
| | N-3 | A | A | A | Present invention |
| | N-4 | B | A | A | Present invention |
| | N-5 | D | D | C | Present invention |
| | N-6 | D | D | C | Present invention |
| | N-7 | A | A | A | Present invention |
| | N-8 | A | A | A | Present invention |
| | N-9 | A | A | A | Present invention |
| | N-10 | A | A | A | Present invention |
| | N-11 | A | A | A | Present invention |
| | N-12 | A | A | A | Present invention |
| | N-13 | G | G | G | Comparative Example |
| | N-14 | A | B | A | Present invention |
| | N-15 | A | A | A | Present invention |
| | N-16 | B | B | A | Present invention |
| | N-17 | B | A | A | Present invention |
| Solid electrolyte | SE-1 | G | G | — | Comparative Example |
| | SE-2 | B | B | — | Present invention |
| | SE-3 | A | A | — | Present invention |
| | SE-4 | B | A | — | Present invention |

<Manufacturing of all-Solid State Secondary Battery>
<Manufacturing of Batteries for Evaluation of Positive Electrode Sheets (Nos. P-1 to P-24) for an all-Solid State Secondary Battery>

Each of the produced positive electrode sheets for an all-solid state secondary battery was punched out into a disk shape having a diameter of 10 mm and was placed in a cylinder made of PET having an inner diameter of 10 mm. 30 mg of the LPS synthesized in Synthesis Example A was placed on the positive electrode active material layer side in the cylinder, and a SUS rod having a diameter of 10 mm was inserted from the openings at both ends of the cylinder. The collector side of the positive electrode sheet for an all-solid state secondary battery and the LPS were pressurized by applying a pressure of 350 MPa with a SUS rod. The SUS rod on the LPS side was once removed, and a disk-shaped In sheet having a diameter of 9 mm (thickness: 20 µm) and a disk-shaped Li sheet having a diameter of 9 mm (thickness: 20 µm) were inserted in this order onto the LPS in the cylinder. The removed SUS rod was inserted again into the cylinder and the sheets were fixed while applying a pressure of 50 MPa. In this manner, all-solid state secondary batteries (half cells) No. C-1 to C-23 and C-45 having a configuration of an aluminum foil (thickness: 20 µm)—positive electrode active material layer (thickness: 80 µm)—solid electrolyte layer (thickness: 200 µm)—negative electrode active material (counter electrode) layer (In/Li sheet, thickness: 30 µm) were obtained.

<Manufacturing of Batteries for Evaluation of Negative Electrode Sheets (Nos. N-1 to N-17) for an all-Solid State Secondary Battery>

Each of the produced negative electrode sheets for an all-solid state secondary battery was punched into a disk shape having a diameter of 10 mm and placed in a cylinder made of polyethylene terephthalate (PET) and having an inner diameter of 10 mm. 30 mg of the LPS synthesized in Synthesis Example A was placed on the negative electrode active material layer side in the cylinder, and a stainless steel (SUS) rod having a diameter of 10 mm was inserted from the openings at both ends of the cylinder. The collector side of the negative electrode sheet for an all-solid state secondary battery and the LPS were pressurized by applying a pressure of 350 MPa with a SUS rod. "The SUS rod on the LPS side was once removed, and a disk-shaped indium (In) sheet having a diameter of 9 mm (thickness: 20 µm) and a disk-shaped lithium (Li) sheet having a diameter of 9 mm (thickness: 20 µm) were inserted in this order onto the LPS in the cylinder. The removed SUS rod was inserted again into the cylinder and the sheets were fixed while applying a pressure of 50 MPa. In this manner, all-solid state secondary batteries (half cells) No. C-24 to C-27 having C-32 to C-44 having a configuration of a copper foil (thickness: 20 µm)—negative electrode active material layer (thickness: 60 µm)—solid electrolyte layer (thickness: 200 µm)—positive electrode active material (counter electrode) layer (In/Li sheet, thickness: 30 µm) were obtained.

(Manufacturing of Batteries for Evaluation of Solid Electrolyte Sheets (SE-1 to SE-4) for all-Solid State Secondary Battery)

The positive electrode sheet P-4 or P-14 for an all-solid state secondary battery was punched out into a disk shape having a diameter of 10 mm and was placed in a cylinder made of PET having an inner diameter of 10 mm. The solid electrolyte sheet for an all-solid state secondary battery, shown in Table 4, was punched on the positive electrode active material layer side in the cylinder into a disk shape having a diameter of 10 mm and placed in the cylinder, and a 10 mm SUS rod was inserted from the openings at both ends of the cylinder. The collector side of the positive electrode sheet for an all-solid state secondary battery and the aluminum foil side of the solid electrolyte sheet for an all-solid state secondary battery were pressurized by applying a pressure of 350 MPa with a SUS rod. The SUS rod on the side of the solid electrolyte sheet for an all-solid state secondary battery was once removed to gently peel off the aluminum foil of the solid electrolyte sheet for an all-solid state secondary battery, and then a disk-shaped In sheet (thickness: 20 µm) and a diameter of 9 mm and a disk-shaped Li sheet (thickness 20 µm) having a diameter of 9 mm were inserted in this order onto the solid electrolyte layer of the solid electrolyte sheet for an all-solid state secondary battery in the cylinder. The removed SUS rod was inserted again into the cylinder and the sheets were fixed while applying a pressure of 50 MPa. In this manner, all-solid state secondary batteries (half cells) No. C-28 to C-31 having a configuration of an aluminum foil (thickness: 20 µm)—positive electrode active material layer (thickness: 80 µm)—solid electrolyte layer (thickness: 45 µm)—negative electrode active material (counter electrode) layer (In/Li sheet, thickness: 30 µm) were obtained.

<Evaluation 4: Cycle Characteristics>

The discharge capacity retention rate of each of the all-solid state secondary batteries manufactured as described above was measured using a charging and discharging evaluation device TOSCAT-3000 (trade name, manufactured by Toyo System Corporation).

Specifically, each of the all-solid state secondary batteries was charged in an environment of 25° C. at a current density of 0.1 mA/cm$^2$ until the battery voltage reached 3.6 V. Then, the battery was discharged at a current density of 0.1 mA/cm$^2$ until the battery voltage reached 2.5 V. One charging operation and one discharging operation were set as one cycle of charging and discharging, and 3 cycles of charging and discharging were repeated under the same conditions to carry out initialization. Then, the above charging and discharging cycle was repeated, and the discharge capacity of each of the all-solid state secondary batteries was measured at each time after the charging and discharging cycle was carried out with a charging and discharging evaluation device: TOSCAT-3000 (product name).

In a case where the discharge capacity (the initial discharge capacity) of the first charging and discharging cycle after initialization is set to 100%, the battery performance (the cycle characteristics) was evaluated by determining where the number of charging and discharging cycles in a case where the discharge capacity retention rate (the discharge capacity with respect to the initial discharge capacity) reaches 80% is included in any of the following evaluation standards. In this test, the higher the evaluation standard is, the better the battery performance (the cycle characteristics) is, and the initial battery performance can be maintained even in a case where a plurality of times of charging and discharging are repeated (even in a case of the long-term use).

All of the all-solid state secondary batteries according to the embodiment of the present invention exhibited initial discharge capacity values sufficient for functioning as an all-solid state secondary battery.

—Evaluation Standards—

A: 500 cycles or more
B: 300 cycles or more and less than 500 cycles
C: 200 cycles or more and less than 300 cycles
D: 150 cycles or more and less than 200 cycles
E: 80 cycles or more and less than 150 cycles
F: 40 cycles or more and less than 80 cycles
G: Less than 40 cycles

TABLE 4

| Battery No. | Negative electrode active material layer | Solid electrolyte layer | Positive electrode active material layer | Cycle characteristics | Note |
|---|---|---|---|---|---|
| C-1 | In/Li sheet | LPS | P-1 | G | Comparative Example |
| C-2 | In/Li sheet | LPS | P-2 | G | Comparative Example |
| C-3 | In/Li sheet | LPS | P-3 | E | Present invention |
| C-4 | In/Li sheet | LPS | P-4 | G | Comparative Example |
| C-5 | In/Li sheet | LPS | P-5 | F | Present invention |
| C-6 | In/Li sheet | LPS | P-6 | D | Present invention |
| C-7 | In/Li sheet | LPS | P-7 | D | Present invention |
| C-8 | In/Li sheet | LPS | P-8 | G | Comparative Example |
| C-9 | In/Li sheet | LPS | P-9 | C | Present invention |
| C-10 | In/Li sheet | LPS | P-10 | D | Present invention |
| C-11 | In/Li sheet | LPS | P-11 | G | Comparative Example |
| C-12 | In/Li sheet | LPS | P-12 | G | Comparative Example |
| C-13 | In/Li sheet | LPS | P-13 | C | Present invention |
| C-14 | In/Li sheet | LPS | P-14 | A | Present invention |
| C-15 | In/Li sheet | LPS | P-15 | B | Present invention |
| C-16 | In/Li sheet | LPS | P-16 | C | Present invention |
| C-17 | In/Li sheet | LPS | P-17 | G | Comparative Example |
| C-18 | In/Li sheet | LPS | P-18 | D | Present invention |
| C-19 | In/Li sheet | LPS | P-19 | D | Present invention |
| C-20 | In/Li sheet | LPS | P-20 | G | Comparative Example |

TABLE 4-continued

| Battery No. | Negative electrode active material layer | Solid electrolyte layer | Positive electrode active material layer | Cycle characteristics | Note |
|---|---|---|---|---|---|
| C-21 | In/Li sheet | LPS | P-21 | A | Present invention |
| C-22 | In/Li sheet | LPS | P-22 | B | Present invention |
| C-23 | In/Li sheet | LPS | P-23 | A | Present invention |
| C-24 | N-1 | LPS | In/Li sheet | G | Comparative Example |
| C-25 | N-2 | LPS | In/Li sheet | D | Present invention |
| C-26 | N-3 | LPS | In/Li sheet | A | Present invention |
| C-27 | N-4 | LPS | In/Li sheet | B | Present invention |
| C-28 | In/Li sheet | SE-1 | P-4 | G | Comparative Example |
| C-29 | In/Li sheet | SE-2 | P-14 | E | Present invention |
| C-30 | In/Li sheet | SE-3 | P-14 | B | Present invention |
| C-31 | In/Li sheet | SE-4 | P-14 | C | Present invention |
| C-32 | N-5 | LPS | In/Li sheet | C | Present invention |
| C-33 | N-6 | LPS | In/Li sheet | C | Present invention |
| C-34 | N-7 | LPS | In/Li sheet | A | Present invention |
| C-35 | N-8 | LPS | In/Li sheet | A | Present invention |
| C-36 | N-9 | LPS | In/Li sheet | A | Present invention |
| C-37 | N-10 | LPS | In/Li sheet | A | Present invention |
| C-38 | N-11 | LPS | In/Li sheet | A | Present invention |
| C-39 | N-12 | LPS | In/Li sheet | A | Present invention |
| C-40 | N-13 | LPS | In/Li sheet | G | Comparative Example |
| C-41 | N-14 | LPS | In/Li sheet | A | Present invention |
| C-42 | N-15 | LPS | In/Li sheet | A | Present invention |
| C-43 | N-16 | LPS | In/Li sheet | A | Present invention |
| C-44 | N-17 | LPS | In/Li sheet | A | Present invention |
| C-45 | In/Li sheet | LPS | P-24 | E | Present invention |

The following findings can be seen from the results of Table 3 and Table 4.

All of the inorganic solid electrolyte-containing compositions of Comparative Example, which is formed of a specific fluorine-based copolymer and in which a fluorine-containing binder satisfying a specific adsorption rate is not used in combination with a dispersion medium are inferior in dispersion stability and handleability. Further, the electrode sheet having a constitutional layer formed of this composition is inferior in the adhesiveness to the collector, and thus the cycle characteristics of the all-solid state secondary battery are not sufficient.

On the other hand, the inorganic solid electrolyte-containing composition according to the embodiment of the present invention, which is formed of a specific fluorine-based copolymer and in which a fluorine-containing binder satisfying a specific adsorption rate, a dispersion medium, and an inorganic solid electrolyte are used in combination, has dispersion stability, has both dispersion stability and handleability at a high level. In a case where this inorganic solid electrolyte-containing composition is used for forming the constitutional layer of the all-solid state secondary battery, it is possible to strengthen the adhesiveness of the collector to the obtained electrode sheet, and it is possible to realize the improvement of cycle characteristics of the obtained all-solid state secondary battery.

The present invention has been described together with the embodiments of the present invention. However, the inventors of the present invention do not intend to limit the present invention in any part of the details of the description unless otherwise specified, and it is conceived that the present invention should be broadly construed without departing from the spirit and scope of the invention shown in the attached "WHAT IS CLAIMED IS".

This application claims priority based on JP2019-157944 filed in Japan on Aug. 30, 2019, JP2019-193350 filed in Japan on Oct. 24, 2019, and JP2020-088767 filed in Japan on May 21, 2020, all of which are incorporated herein by reference as a part of the description of the present specification.

EXPLANATION OF REFERENCES

1: negative electrode collector
2: negative electrode active material layer
3: solid electrolyte layer
4: positive electrode active material layer
5: positive electrode collector
6: operation portion
10: all-solid state secondary battery

What is claimed is:

1. An inorganic solid electrolyte-containing composition comprising:
    an inorganic solid electrolyte having an ion conductivity of a metal belonging to Group 1 or Group 2 in the periodic table;
    a polymer binder; and
    a dispersion medium,
    wherein the polymer binder includes a polymer binder consisting of a fluorine-based copolymer which contains a vinylidene fluoride constitutional component and a hexafluoropropylene constitutional component of more than 30% by mole and 65% by mole or less and in which a tensile fracture strain is 500% or more, and
    in the dispersion medium, an adsorption rate of the polymer binder consisting of the fluorine-based copolymer with respect to the inorganic solid electrolyte is less than 60%.

2. The inorganic solid electrolyte-containing composition according to claim 1,
    wherein the polymer binder consisting of the fluorine-based copolymer is dissolved in the dispersion medium.

3. The inorganic solid electrolyte-containing composition according to claim 1,
    wherein a content of the hexafluoropropylene constitutional component in the fluorine-based copolymer is more than 30% by mole and 50% by mole or less.

4. The inorganic solid electrolyte-containing composition according to claim 1,
    wherein the tensile fracture strain is 700% or more.

5. The inorganic solid electrolyte-containing composition according to claim 1,
wherein a peel strength of the polymer binder consisting of the fluorine-based copolymer with respect to aluminum foil is 0.1 N/mm or more.

6. The inorganic solid electrolyte-containing composition according to claim 1,
wherein a mass average molecular weight of the fluorine-based copolymer is 50,000 to 1,500,000.

7. The inorganic solid electrolyte-containing composition according to claim 1,
wherein the fluorine-based copolymer contains a constitutional component having a functional group selected from the following Group (a) of functional groups,
<Group (a) of functional groups>
a hydroxy group, an amino group, a carboxy group, a sulfo group, a phosphate group, a phosphonate group, a sulfanyl group, an ether bond, an imino group, an ester bond, an amide bond, a urethane bond, a urea bond, a heterocyclic group, an aryl group, an anhydrous carboxylic acid group, an isocyanate group, an alkoxysilyl group, a fluoroalkyl group, and a siloxane group.

8. The inorganic solid electrolyte-containing composition according to claim 7,
wherein in the fluorine-based copolymer, a content of the constitutional component having the functional group selected from the Group (a) of functional groups is 0.01% to 10% by mole.

9. The inorganic solid electrolyte-containing composition according to claim 1,
wherein the polymer binder includes a particulate binder having an average particle diameter of 1 to 1,000 nm.

10. The inorganic solid electrolyte-containing composition according to claim 1,
wherein the polymer binder includes a binder consisting of a hydrocarbon-based polymer, a binder consisting of a (meth)acrylic polymer, or a polymer binder consisting of a vinyl polymer.

11. The inorganic solid electrolyte-containing composition according to claim 1, further comprising an active material.

12. The inorganic solid electrolyte-containing composition according to claim 11,
wherein an adsorption rate of the polymer binder consisting of the fluorine-based copolymer with respect to the active material is 90% or less.

13. The inorganic solid electrolyte-containing composition according to claim 1, further comprising a conductive auxiliary agent.

14. The inorganic solid electrolyte-containing composition according to claim 1,
wherein the inorganic solid electrolyte is a sulfide-based inorganic solid electrolyte.

15. A sheet for an all-solid state secondary battery, comprising a layer formed of the inorganic solid electrolyte-containing composition according to claim 1.

16. An all-solid state secondary battery comprising, in the following order:
a positive electrode active material layer;
a solid electrolyte layer; and
a negative electrode active material layer,
wherein at least one of the positive electrode active material layer, the solid electrolyte layer, or the negative electrode active material layer is a layer formed of the inorganic solid electrolyte-containing composition according to claim 1.

17. A manufacturing method for a sheet for an all-solid state secondary battery, the manufacturing method comprising forming a film of the inorganic solid electrolyte-containing composition according to claim 1.

18. A manufacturing method for an all-solid state secondary battery, the manufacturing method comprising manufacturing an all-solid state secondary battery through the manufacturing method according to claim 17.

19. The inorganic solid electrolyte-containing composition according to claim 1,
wherein the polymer binder consisting of the fluorine-based copolymer is dissolved in the dispersion medium, and
the fluorine-based copolymer contains a constitutional component having a functional group selected from the following Group (a) of functional groups,
<Group (a) of functional groups>
a hydroxy group, an amino group, a carboxy group, a sulfo group, a phosphate group, a phosphonate group, a sulfanyl group, an ether bond, an imino group, an ester bond, an amide bond, a urethane bond, a urea bond, a heterocyclic group, an aryl group, an anhydrous carboxylic acid group, an isocyanate group, an alkoxysilyl group, a fluoroalkyl group, and a siloxane group.

20. The inorganic solid electrolyte-containing composition according to claim 1,
wherein the polymer binder consisting of the fluorine-based copolymer is dissolved in the dispersion medium,
the fluorine-based copolymer contains a constitutional component having a functional group selected from the following Group (a) of functional groups, and
in the fluorine-based copolymer, a content of the constitutional component having the functional group selected from the Group (a) of functional groups is 0.01% to 10% by mole,
<Group (a) of functional groups>
a hydroxy group, an amino group, a carboxy group, a sulfo group, a phosphate group, a phosphonate group, a sulfanyl group, an ether bond, an imino group, an ester bond, an amide bond, a urethane bond, a urea bond, a heterocyclic group, an aryl group, an anhydrous carboxylic acid group, an isocyanate group, an alkoxysilyl group, a fluoroalkyl group, and a siloxane group.

21. The inorganic solid electrolyte-containing composition according to claim 1,
wherein the polymer binder consisting of the fluorine-based copolymer is dissolved in the dispersion medium, and
a content of the hexafluoropropylene constitutional component in the fluorine-based copolymer is more than 30% by mole and 50% by mole or less.

22. The inorganic solid electrolyte-containing composition according to claim 1,
wherein a content of the hexafluoropropylene constitutional component in the fluorine-based copolymer is more than 30% by mole and 50% by mole or less, and
a peel strength of the polymer binder consisting of the fluorine-based copolymer with respect to aluminum foil is 0.1 N/mm or more.

* * * * *